(12) United States Patent
Chowdhury et al.

(10) Patent No.: US 12,476,490 B2
(45) Date of Patent: Nov. 18, 2025

(54) DEVICE SENSING AND CHARGING USING NETWORKED COILS

(71) Applicant: Northeastern University, Boston, MA (US)

(72) Inventors: Kaushik Chowdhury, Needham, MA (US); Yousof Naderi, Brookline, MA (US)

(73) Assignee: Northeastern University, Boston, MA (US)

(*) Notice: Subject to any disclaimer, the term of this patent is extended or adjusted under 35 U.S.C. 154(b) by 376 days.

(21) Appl. No.: 17/766,325

(22) PCT Filed: Oct. 2, 2020

(86) PCT No.: PCT/US2020/053937
§ 371 (c)(1),
(2) Date: Apr. 4, 2022

(87) PCT Pub. No.: WO2021/067692
PCT Pub. Date: Apr. 8, 2021

(65) Prior Publication Data
US 2024/0063665 A1 Feb. 22, 2024

Related U.S. Application Data

(60) Provisional application No. 62/943,870, filed on Dec. 5, 2019, provisional application No. 62/910,613, filed on Oct. 4, 2019.

(51) Int. Cl.
*H02J 50/12* (2016.01)
*B64U 50/35* (2023.01)
(Continued)

(52) U.S. Cl.
CPC .............. *H02J 50/12* (2016.02); *B64U 50/35* (2023.01); *H02J 50/10* (2016.02); *H02J 50/402* (2020.01);
(Continued)

(58) Field of Classification Search
CPC .......... H02J 50/12; H02J 50/10; H02J 50/402; H02J 50/90; H02J 2310/44; B64U 50/35;
(Continued)

(56) References Cited

U.S. PATENT DOCUMENTS

| 2010/0164296 A1 | 7/2010 | Kurs et al. |
| 2011/0074349 A1 | 3/2011 | Ghovanloo |

(Continued)

FOREIGN PATENT DOCUMENTS

WO    2018229494 A1    12/2018

*Primary Examiner* — Paul Dinh
(74) *Attorney, Agent, or Firm* — Verrill Dana, LLP

(57) ABSTRACT

Sensing and charging of electronic devices using coils. A software-defined collaborative sensing approach can allow detection and location of multiple electronic devices with respect to a charging surface to allow for wireless charging thereof. Systems and methods can measure the interaction of devices with a generated magnetic field through a network of nested sensing coils that can sense the location of devices located around the network of coils based on their interaction with magnetic fields. Once the location of a device to be charged is determined, charging energy can be directed to the device based on its location on the charging surface. The charging surface can include one or more sensing nodes having a combination of nested active, or driven, and passive coils. These coils can be configured to transform existing two-dimensional (2D) surfaces or three-dimensional (3D) areas into a multi-device contactless wireless charger.

20 Claims, 43 Drawing Sheets

(51) Int. Cl.
*H02J 50/10* (2016.01)
*H02J 50/40* (2016.01)
*H02J 50/90* (2016.01)
*B64U 50/37* (2023.01)

(52) U.S. Cl.
CPC .............. *H02J 50/90* (2016.02); *B64U 50/37* (2023.01); *B64U 2201/10* (2023.01); *H02J 2310/44* (2020.01)

(58) Field of Classification Search
CPC ..... B64U 50/37; B64U 2201/10; Y02T 10/70; Y02T 10/7072; Y02T 90/14
USPC ........................................................ 320/108
See application file for complete search history.

(56) References Cited

U.S. PATENT DOCUMENTS

| | | | |
|---|---|---|---|
| 2012/0126745 A1* | 5/2012 | Partovi | H02J 50/12 320/108 |
| 2012/0313577 A1 | 12/2012 | Moes et al. | |
| 2015/0115728 A1 | 4/2015 | Yamamoto et al. | |
| 2016/0134154 A1 | 5/2016 | Baarman et al. | |
| 2016/0336803 A1 | 11/2016 | Kurs et al. | |
| 2016/0336809 A1 | 11/2016 | Gluzman et al. | |
| 2018/0219421 A1 | 8/2018 | Yang et al. | |
| 2018/0366994 A1 | 12/2018 | Meichle | |

* cited by examiner

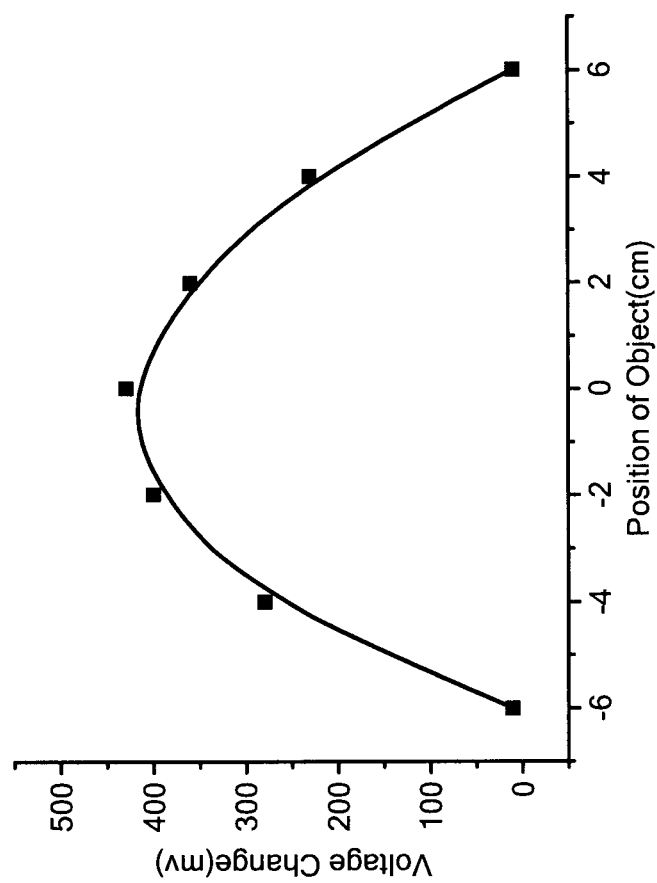
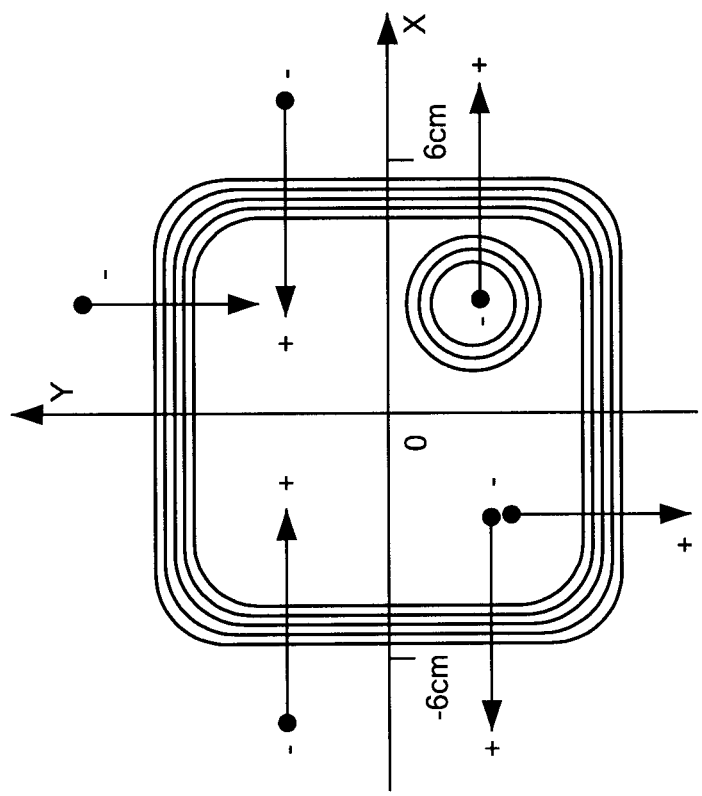
FIG. 8(b)
FIG. 8(a)

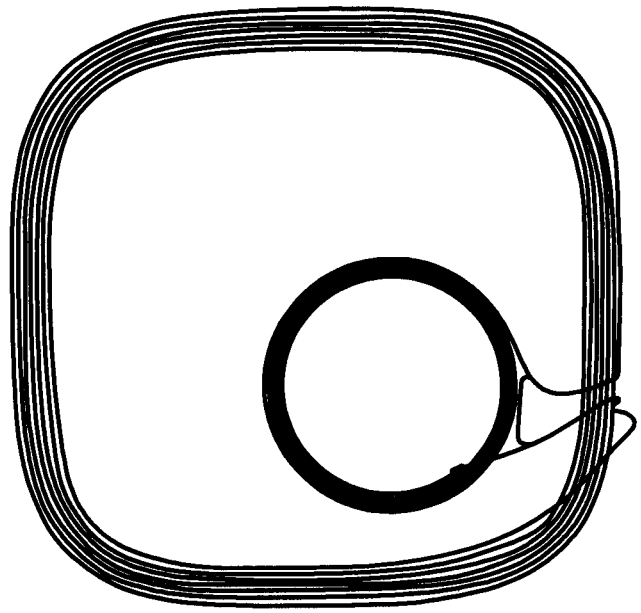
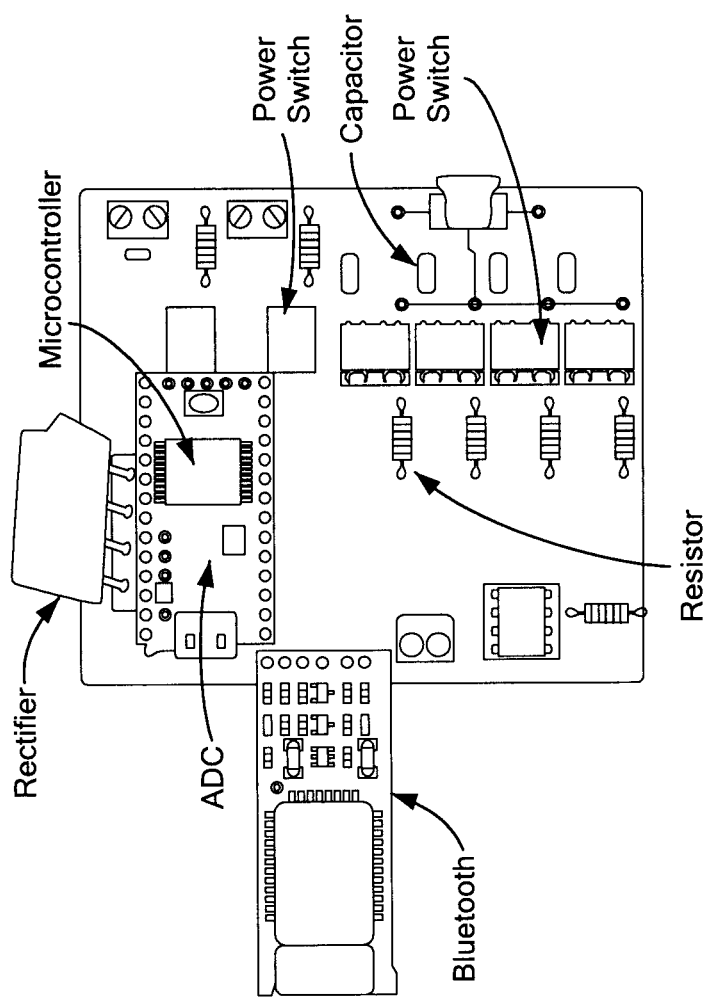
FIG. 9(b)
FIG. 9(a)

DEVICE SENSING AND CHARGING USING NETWORKED COILS

RELATED APPLICATIONS

This application claims priority to and the benefit of U.S. Provisional Application No. 62/910,613, filed on Oct. 4, 2019, titled "Method and Apparatus for Software-Defined Cognitive Wireless Charging Network," and naming Kaushik Chowdhury and Yousof Naderi as inventors, and U.S. Provisional Application No. 62/943,870, filed on Dec. 5, 2019, titled "Method and Apparatus for Collaborative Device Sensing and Charging Using Networked Coils," and naming Kaushik Chowdhury and Yousof Naderi as inventors, the content of each of which is hereby incorporated by reference in its entirety.

FEDERALLY SPONSORED RESEARCH OR DEVELOPMENT

This invention was made with government support under Grant Number 1701041 and Grant Number 1452628 awarded by the National Science Foundation. The government has certain rights in the invention.

FIELD OF THE INVENTION

The presently disclosed technology generally relates to sensing and charging of electronic devices using coils.

BACKGROUND

Wireless energy transfer to charge electronic devices has gained meaningful advancements over the last decade from efficiency improvements in radio frequency-based harvesting circuits, to more efficient gallium nitride (GaN)-based power amplifier, to standardization of inductive-based wireless charging technology (called "Qi") in smart phones, and to advanced beamforming energy transfer techniques. These advancements span from low power energy transfer capable of charging wearable devices and sensors, to medium-power for charging phones, tablets and laptops, and to high-power for charging electrical cars.

Wireless charging performance depends on multiple factors including technology (RF-based, magnetic induction, magnetic resonance, etc.) and frequency of energy transfer (KHz, MHz, GHz) which determine the maximum charging distance, efficiency of transfer, and maximum deliverable power. While RF-based energy transfer provides flexibility to transfer power over longer distances toward multiple receivers, the significant path loss and limitation of non-exceeding allowable power density in the environment make them most suitable for low-power charging scenarios such as sensors and wearables. On the other hand, magnetic induction and magnetic resonance-based energy transfer technologies provide shorter charging distances but higher deliverable power that make them suitable for medium and high-power charging scenarios such as phones and laptops.

Despite all the progress on the magnetic induction and resonance based wireless energy transfer, the existing charging solutions based on these two technologies are limited to (i) isolated coil-based transmitters that individually sense and charge devices that come over their charging range, and (ii) a group of few coils that are pre-connected and synchronized with each other in operation (e.g. three coil Qi-based inductive charging, synchronized multi-coils multi-amplifier magnetic resonance transfer over surface, vertical and horizontal synchronized coils inside one transmitter using magnetic resonance technology).

Localization and tracking solutions based on the reflected RF signals from technologies such as WiFi, Bluetooth, ZigBee, LoRa, and RFID have been extensively studied. However (i) multi-path reflections from the environment, (ii) need for a receiver device and/or additional signal reflectors, and (iii) complex and power consuming algorithms at the transmitter are the main shortcomings of these works.

Current technologies, including Qi-based magnetic induction, permit only few mm of alignment mismatch between the transmitter-receiver coils, and are effective at less than 5 mm gap between the transmitter-receiver coil. Moreover, to cover a large surface, hundreds of coils are needed, each with its own power management circuit per coil. This dramatically increases the cost and complexity of existing charging systems.

Additionally, this requires specialized power sockets to ensure that the hundreds of coils are continuously sensing, even when there are no devices to be charged.

Using classical strongly coupled magnetic resonance energy transfer overcomes the requirement of direct contact, although each coil now must have its own separate power amplifier, explicit receiver-generated feedback, phase adjustment circuits and inter-coil synchronization. Prior research has shown that such coupling can deliver power over 2 m distance with more than 40% efficiency.

A seminal advancement in this area leveraged the principle of MIMO-beamforming commonly used in classical RF communication to constructively combine magnetic field energy supplied by multiple resonance transmitters. Magnetic MIMO, analogous to the concept of MIMO in RF signals, uses six power amplifiers to deliver power to a phone through a table. This uses current change from each coil as the feedback to localize the position of a given phone and then controls the current of each amplifier to beamform the power to the receiver. While the receiver does not need perfect alignment with the transmitter, each coil needs one amplifier, which drives up cost. Second, the current feedback induced from the mutual coupling between transmitter and receiver prolongs sensing time. To ensure robustness in the feedback, the transmitter needs to be large and the mutual coupling strong enough to induce clear impedance change.

A potential solution to reduce the number of costly amplifiers, which tends to be the single most expensive part of the design, relies on the so-called domino coil concept. This concept is based on Tesla's Resonator, where each passive resonant coil acts as a relay and extends the reach of the magnetic field to a longer distance, e.g., lighting a 14 W lamp 3 m away from the source coil.

Additionally, regardless of the design and sensing technology, the dimensions of the coils negatively influence sensing performance. For sensing with low-power consumption (in range of mW), both inductive and magnetic resonance-based approaches provide only mm-scale sensing distance. Additionally, to cover a large area, solutions such as increasing the size of the sensing coil, using 1-1 proportion of coils per charging location increase system cost and overall power consumption exponentially. Further, measurements by a given coil can result in missed detection.

For example, consider the two device placement scenarios below that excite the coil to similar extents: (i) a device with a size bigger than a sensing coil that is positioned to partially cover the sensing coil and (ii) a smaller object that covers the same area of the sensing coil. Both situations give rise to similar voltage changes even though the size and most likely the charging needs may be different.

SUMMARY

To be able to charge a device, it is important to know the location of the device. In the Qi standard, this is performed by the user placing the device accurately on the charger. But to understand where multiple devices are located when they are arbitrarily placed within a charging space, a technological solution is required. While one solution might be to embed a beacon of some sort in each device, this method cannot be applied to existing Qi-enabled devices that were built without such a beacon. However, because devices can interact with a magnetic field, this interaction can be used to detect the location of a device.

Systems and methods of the technology measure the interaction of devices with a generated magnetic field through a network of nested sensing coils that can sense the location of devices located around the network of coils based on their interaction with magnetic fields. Specifically, multiple sensing nodes are used to detect the presence of the devices. Each sensing node can include an active coil nested inside of a larger passive coil. A controller is coupled to both coils and can drive an AC signal [with a frequency in the kHz range (between 1 kHz and 999 kHz) or in the MHz range (at least 1000 kHz)] into the active coil. The controller then measures the voltage from the passive coil which is magnetically coupled to the active coil.

The controllers of the modules are in communication with a central system controller and report the detected voltage to the central system controller which then analyzes the measurement data to determine where the device, or devices, are located. The analyzing can be done by comparing the set of voltages received from the modules to known signatures of different devices in different locations to determine where the device(s) are located. This may be done using machine learning-based algorithms such as Support Vector Machine (SVM) classifier which is trained using test data collected or obtained from known configurations and orientations of devices and module networks. A multi-layer artificial neural network or other algorithm may be used for the device identification, localization and tracking. Generative models such as Kernel Density Estimation (KDE) and Generative Adversarial Networks (GAN) can be used to create synthetic data and train for unknown and new devices and locations.

The nested coils may overlap with each other and/or one controller may be coupled to more than one set of nested coils. Systems and methods are primarily described with respect to two-dimensional implementation allowing a large surface to act as a charger. However, as described herein, the same principles can be applied to three-dimensions to locate devices in 3D space by positioning the sensing modules around and/or in the 3D space. For example, a second sensor array can include a second plurality of tiles, the second sensor array being disposed to define, with the first sensor array, a three-dimensional volume. The first sensor array, the second sensor array, and the software controller 150 can cooperate to locate the device within the three-dimensional volume.

The presently disclosed systems and methods may be operable to locate and identify devices at 3 centimeter (cm) away from the sensing surface. Different devices interact with the magnetic field coupling between the active coil and the passive coil in different ways, which manifests as different voltages at the output of the passive coil. By using the outputs from multiple passive coils, a device can be effectively located between the various coils and tracked as it moves over the charging surface.

Once the location of a device to be charged is determined, charging energy is directed to the device based on its location on the charging surface. Systems and methods can provide a software-defined cognitive wireless charging network based on modular tiles that can be configured to cover a charging surface with a wide range of sizes and having different aspect ratios. Software-defined inductive charging is discussed in greater detail in FIG. 5.

The present disclosure can include magnetic inductive charging, in which each tile includes at least one charging coil and hardware components for reconfiguring the impedance and resonance of the charging coil(s), as shown in FIG. 13. A network controller is coupled to the tiles and manages the impedance/resonance of the coils to direct charging energy from an amplifier module to a coil that is positioned to charge the device. The energy may hop from coil to coil, based on their impendence and resonance, from the amplifier module to the selected coil.

A network controller can be used to determine which coil, or coils, should be configured to provide charging power to a device. The determination may be done using the sensing technology described above based on the use of nested coils. The charging coils may be separate from the nested coils or at least one coil of the nested coils may be used as a charging coil. The network controller can determine a path from the AC power source to the selected tile and configures the capacitance ("C") and/or impedance ("Z") of each tile to allow the charging energy from the AC power source to hop between tiles along the desired path to the selected tile.

To direct energy along a path in the network, those tiles not in the desired path can be set to block energy flowing through that tile's circuit by increasing the capacitance, C, for that tile over a certain amount that depends upon the current being provided, the frequency of the power signal, the impedance of the circuit, and an amount of acceptable loss of energy when blocking energy flow. Coils that are blocking energy transfer cannot charge a device positioned above that coil.

Wave reflection may also be used to manage which tiles are configured to charge a device. The reflection of an energy wave at the last energy tile of an energy flow path creates a negative energy flow that acts as a reflected power traveling in the opposite direction of the main energy flow and can cancel power over tiles within that energy flow path. Additionally, the wave reflection cancellation may happen in the case of multiple concurrent active and partially overlapping energy flows in same frequency, where multiple reflections come from a reflection of the energy wave at the last energy tile of an energy flow path. The summation of positive/main energy flows and negative energy flows (reflected flows) determine the amount of cancellation at each energy tile.

In certain cases, multiple devices may be simultaneously charged. The path(s) selected can lead to very different efficiencies in transmitted power. Systems and methods may analyze the available paths to provide power to multiple devices and, in certain scenarios, may use a single path to provide energy to both devices.

Each tile can include a microcontroller that communicates with the microcontrollers in other tiles in a data network. One of the microcontrollers may act as the overall network controller which manages the tile network. An external processor may act as the network controller and communicate with the microcontrollers in each tile. The data network may utilize any type of communication, but in some cases, the data network may be modulated on the AC power signal sent between tiles. In other cases, a mesh network may be created using, for example, available networking standards such as Zigbee or Bluetooth or a customized mesh network.

To address the challenges described above, systems and methods can take into consideration input data from multiple coils at the same time, and provide systematic experimental measurements to learn voltage changes associated with different types of objects at different positions relative to the multi-coil surface. Multi-coil contactless sensing systems described herein are motivated by the benefit of simplifying a sensing system, and/or increasing the sensing distance and area, and/or facilitating flexibility, while avoiding the need for extra coils or circuits in the target device or devices. Furthermore, existing approaches and architectures result in solutions that are extremely limited in scale of charging, limited in supporting multiple types of devices, limited in support of multiple number of devices, costly, require multiple amplifiers or complex synchronizations, limited in backward compatibility with new charging standards, lack of easy and remote software and protocol upgradability, and limited adaptability, service personalization, and learning as system being used.

The networks, systems, and methods for "software-defined wireless charging" provided herein can transform existing two-dimensional (2D) surfaces or three-dimensional (3D) areas into a multi-device contactless wireless charger. In particular, a software-defined and programmable wireless charging network and system are provided that include hardware and software architecture, operation, and distributed algorithms that address several shortcomings of the existing charging solutions in a fundamentally different way.

Hardware platforms discussed herein can be modular, plug-and-play, and programmable (e.g. energy transmitters as "cognitive energy tiles" and reconfigurable multi-layer energy receivers). Distributed operating systems (software controller) as described herein can create software-defined multihop energy flows and power routing networks where the network software controller can reconfigure the cognitive energy transmitter modules and shape the energy fields on-the-fly and over the space. This coupled software and hardware integration allows the cognitive energy tiles to be re-configured collaboratively and cooperatively based on type, number, and location of detected devices that are to be charged.

The energy-receiving device, such as phones, laptops, tablets, drones, headphones, smart watches, speakers, etc., may include an energy receiver to utilize the power from energy tiles and charge. The present technology is a "software-defined wireless charging network," a network of inter-connected and multi-hop cognitive charging transmitters (called cognitive energy tiles), that creates arbitrary and customizable 2D and 3D over-distance wireless charging areas, and capable of charging multiple heterogenous types of devices. The technology may include:

I. A distributed network process running within a microcontroller of each energy tile (at least one memory component encoded with computer executable modules) operable to run various operations such as distributed resonance sensing, reconfigurable energy hopping, and data/control communication, and switch between different operational states;

II. A plurality of hardware components within each energy tile for out-of-band KHz resonance sensing, coupled to the at least one dual-coil sensing architecture coil;

III. At least one cognitive energy tile leader that includes:
  a. A reconfigurable amplifier module that can create frequency, phase, and amplitude modulated energy signals,
  b. At least one charging coil,
  c. At least one microcontroller and memory component encoded with computer executable modules including one or more modules of the software controller, and
  d. A plurality of hardware components for reconfiguring the impedance and resonance of the charging coil;

IV. Programmable in-band and modulated energy flows via multi-hop network of cognitive energy tiles through strongly coupled MHz magnetic resonance energy hopping. Modulated energy flows may carry overlaid data or control information through their modulations between two or more energy tiles as well as energy tiles and the energy receiver unit/s.

V. Out-of-band un-coupled radio frequency modules within each energy tile that create a mesh network for data and control message exchanges between energy tiles as well as between energy tiles and the energy receiver unit/s VI. Network software controller that—based on the various sensing inputs from energy tiles and energy receivers—manages and adjusts at least one of (not limited): software-defined charging network, energy tiles, energy flows, charging capacity and load of the system, charging QoS, charging policy, device localization, authentication, profiling, and tracking, as well as mobile device charging management, safety analysis, and hardware diagnosis analysis.

VII. At least one energy receiver unit, comprising:
  a. At least one charging coil,
  b. A plurality of hardware components to harvest resonance energy at MHz and enable/disable coil in energy reception chain,
  c. May have microcontroller and memory component encoded with computer executable modules or instructions to enable a set of active coils as well as measure and monitor the connected receiver device load, and harvested power voltages.

Software-defined architecture and operation may include cognitive energy tiles managed by a distributed operating system and network process within each energy tiles. Out-of-band distributed and collaborative multi-tiles sensing and tracking approach can be provided without need of any direct feedback. The operating system can predict the velocity and/or acceleration of a moving object relative to the sensing array or another landmark.

Systems and methods can include programmable and modulated in-band energy flows with software-defined power routing mechanism that can also carry overlaid control and data information within energy flows. Network software controllers can be provided for distributed resource management and power load balancing within energy tiles and energy network, as well as device authentication and identification protocol.

Systems and methods can include a reconfigurable multi-layer receiver architecture that provides high-power delivery in small size receiver as well as adaptive and adjustable power reception based on the receiver load. The technology can provide a cost-effective wireless charging solution over large surfaces and areas, through (i) use of modular, plug-and-play, non-invasive, and cost-effective hardware units termed cognitive energy tiles that do not need an amplifier per transmitter and do not need complex synchronization between different transmitters, (ii) integration of a software controller and network-level distributed operation, instead of individual chargers and (iii) support of multiple types of devices charging through software reconfigurability instead of separate hardware.

The technology can provide (i) multi-device charging, from low-power devices such as phone to high-power devices such as UAV, (ii) customizable area charging, from a small area to large area charging, and (iii) agile, adaptable, and intelligent operations through distributed and collaborative sensing. Additional advantages include providing cost-effective and scalable wireless charging solution through low-cost programmable energy relaying; upgradable software enables support and addition of new standards; support of multi-types of device charging from phone to laptop to UAVs; allows for the transformation of arbitrary and customizable areas into wireless chargers; and provides extremely low-power contactless device sensing over large areas through unique sensing architecture design and distributed sensing.

With the technology described herein, energy tiles as transmitters can be installed in an easy, modular, and plug and play manner on existing surfaces at restaurants, hotels, coffee shops, offices, commercial buildings, libraries, universities, public places, and homes to enable infrastructure-based charging. Additionally, the technology can be integrated in forms of charging pads for portable personal charging solutions. Furthermore, receivers can be integrated into tablets and laptops in computing industry segments; smart watches, wireless earphones, fitness trackers, smartphones, integrated furniture, and power banks in mobile ecosystem industry segments; drones and robotics applications in robotics industry segments; smart speakers, cameras, door-locks, IoT sensors in smart home industry segments; car interior and electric vehicles in automotive industry segments; in kitchen appliances, robotic vacuums, electric toothbrushes, and power tools for appliance industry segments; and in smart glasses, earphones, hearing aids for wearables industry segments.

In certain aspects, each sensing node might include a combination nested active and passive coil. The active coils might be connected to the continuous wave generator, and the passive coils might resonate with active coils and extend the sensing area. The nested coils are so designed such that they are in resonance with each other, when there is active current in the active coils, the passive coils act a resonator relay that extend the magnetic flux generated by the current with extremely low power consumption. Each such multi-nested coils sensing element (henceforth called as a node) might operate in the kHz or MHz bands.

Each nested sensing coil might be connected to individual sensing circuit or a group/network of sensing coils might be connected to one or more central sensing circuits. One or more sensing circuits might be connected to a microcontroller that has executable codes in memory. A network controller can act as central unit that collects all the sensing readings from multiple sensing coils and runs algorithms including classification, identification, and tracking of electronic devices over 2D and 3D areas. The sensing nodes can be networked together and might exchange control messages with the network controller.

Multiple sensing nodes might be attached to the underside of a large surface such as a charging pad and desk. Multiple sensing nodes might be placed in a mixture of vertical and horizontal directions close to each other to create a customized 3D sensing area. Multiple layers of nested sensing coils might be used to cover an area with high accuracy. Each layer or group of nested coils might operate at one or more different frequencies.

When a device is within the networked coils coverage sensing area, each node may measure the induced voltage in its outer coils and report back these measurements, along with its ID, to the central network controller. Similarly, if the device moves, the nodes may detect similar changes and transmit update messages to the controller. The output of each sensing node can be measured through induced voltages in the outer coils over the time to form a time-series. The central network controller can use simultaneous time-series from multiple sensing nodes in form of multi-voltage time-series to classify, identity, localize, and track devices over 2D and 3D areas.

The controller may run machine learning-based algorithms or fuse all the measurement data reported by the entire node array (networked coils) and match the voltage patterns with a priori stored signatures to determine the device and its location with respect to the sensing surface. The input of each passive coil in a nested sensing node might process in forms of frequency filtering, smoothing, and averaging over customized input windows to eliminate various noises.

The multiple simultaneous streams of voltage time-series from networked coils might be normalized and fed to a machine learning-based program in microcontroller. The program might use models such as multi-layered neural networks for device identification, localization, and tracking.

Software-defined inductive charging can include an additional layer of networked charging coils that may operate on top of networked nested sensing coils and together create a cognitive inductive charging network. This system, which can make up software-defined inductive charging technology, may multiplex one or more wireless charging power managements to one or more charging coils within the networked charging coils layer, based on the location and type of the detected device/s that would be identified at the network controller (based on collaborative and networked sensing coils measurement).

An apparatus for sensing a location of a device can include a controller circuit; and a sensor array having a plurality of sensing tiles. Each tile can include one or more driven coils to produce magnetic signals in response to drive signals; one or more sense coils disposed to: (a) magnetically couple to the one or more driven coils to receive the magnetic signal produced by the driven coils, and (b) produce a sense voltage as a function of its proximity to the device. The controller circuit can be coupled to each sensing tile of the plurality of tiles to receive a corresponding plurality of sense voltages, and is configured to determine the location of the device based on a pattern of the plurality of sense voltages, wherein the device is either fixed or movable relative to the apparatus.

A drive circuit can produce the drive signals. The controller circuit configures the drive signals of each tile of the plurality of tiles, the drive signals being configured with respect to one or more of shape, duty-cycle, or power. The plurality of tiles can include a first tile having a sense coil of a first size and a second tile, adjacent to the first tile, having a sense coil of a second size that is different from the first size to reduce coupling interference between first tile and the second tile. The controller circuit can be configured to determine a change in location, relative to the sensor array, of the device by determining the change ($\Delta P$) over time between the pattern of the plurality of sense voltages at a sensing time (t) and a corresponding previous pattern of the plurality of sense voltages from an earlier time (t-1). The controller circuit can be configured to determine proximity of the device to the apparatus based on the plurality of sense voltages. The device can be an electronic device. The controller circuit can also be configured to predict the velocity of a moving object. The controller circuit can also be configured to determine a device type, from a plurality of device types, for the device.

Each tile can include a sensing circuit coupled to the sense coil to receive the sense voltage from the sense coil; and the controller circuit can be coupled to the sensing circuit of each tile of the plurality of tiles to receive the corresponding plurality of sense voltages via their respective sensing circuits, the plurality of sense voltages forming the pattern within the sensor array. The sense coil can define a two-dimensional interior aperture and a three-dimensional interior volume extending normal to the interior aperture, the driven coil being disposed within the interior volume of the sense coil.

The apparatus can include a multi-layer printed circuit board, and the driven coil can be disposed on a first set of layers of the multi-layer printed circuit board; and the sense coil can be disposed on a second set of layers of the multi-layer printed circuit board, the second set being selected from one of: (a) a first subset of layers of the multi-layer printed circuit board, which is not co-extensive with the first set of layers; and (b) a second subset of layers of the multi-layer printed circuit board, which does not share any layer with the first set of layers. The one or more driven coils can include one or more active driven coils, and the one or more sense coils can include one or more passive sense coils. Additional layers of multi-layer coils can be disposed on top of the first and second set of layers of the multi-layer printed circuit board, the additional layers being wireless charging coils that are configured for wirelessly charging electronic devices.

The device can be devoid of a customized circuit or additional coil for sensing or detection. Each sensing tile of the plurality of sensing tiles can be nested in one of the plurality of sensing tiles.

The plurality of sense voltages can be processed in one or more of frequency filtering, signal harmonics filtering, smoothing, and averaging over customized input windows to eliminate various noises. The sensor array can generate a plurality of simultaneous streams of voltage readings, the voltage readings being normalized and fed to a machine learning-based program in a microcontroller for device identification, localization, and tracking.

The apparatus can further include an artificial intelligence engine operating in the controller circuit, the artificial intelligence engine being trained to determine the location of the device, and a corresponding device type of the device from a plurality of device types based on the plurality of sense voltages. The sensor array can be a first sensor array; and the apparatus can further include a second sensor array having a second plurality of tiles, the second sensor array being disposed to define, with the first sensor array, a three-dimensional volume, wherein the first sensor array, the second sensor array, and the controller circuit cooperate to locate the device within the three-dimensional volume.

A dynamically configurable wireless charging system can include a one or more master transmitter tiles, each master tile comprising a coil and configured to couple to a power source; a plurality of slave transmitter tiles respectively comprising coils coupled to configurable impedance-matching circuits and respectively positioned to magnetically couple to at least one other slave transmitter tile of the plurality of slave transmitter tiles, with at least one slave transmitter tile positioned to magnetically couple to one of the master transmitter tiles; a controller, communicatively coupled to master and slave transmitter tiles of the plurality of slave transmitter tiles, and configured to: select a subset of the plurality of slave transmitter tiles, optionally excluding some of the plurality of slave transmitter tiles, to define a path from the master transmitter tile to a chargeable device in proximity to a cluster of one or more slave transmitter tiles of the plurality of slave transmitter tiles; and control the power source configurations in each master tile and respective impedance-matching circuits of the subset of slave transmitter tiles to form a chain of wireless magnetic resonance power transmission from the master transmitter tile to the chargeable device.

Each master tile can include a transmitter coil that is coupled with a reconfigurable amplifier circuit. One or more configurable variables of each reconfigurable amplifier circuit can be coupled, and configured with, a microcontroller. For example, the one or more configurable variables can include frequency, impedance of amplifier, peak-to-peak voltage, load, resistance, or output power. The control commands can be sent to the plurality of transmitter tiles, each transmitter tile having a radio frequency transceiver to receive and send control messages to make a control wireless mesh network. The slave transmitter tiles can define a pattern corresponding to the chargeable device. Each transmitter tile includes an array of sensing tiles, with each sensing tile including one or more driven coils to produce magnetic signals in response to drive signals; and one or more sense coils disposed to: (a) magnetically couple to the one or more driven coils to receive the magnetic signal produced by the driven coils, and (b) produce a sense voltage as a function of its proximity to the device. Within each transmitter tile, a device location circuit is disposed to detect a set of patterns, each pattern comprising a subset of slave transmitters corresponding to a location of a corresponding device of a set of devices, each such device having a device shape that defines its corresponding pattern. Each pattern can be in the shape of its corresponding device.

The controller can be configured to selectively control transmitters to refrain from transmitting power, the transmitters not being a part of a transmission path from the set of transmission paths.

Each transmitter tile has a memory for storing executable instructions, the controller being in communication with the memory and the transmitter array, with the controller configured to execute the instructions. The array of sensing tiles can be in communication with the controller, and the controller can further include executable instructions, where execution of the executable instructions causes the controller to: use the array of sensing tiles to detect the presence of at least one device adjacent to the transmitter array, each such device being a detected device. The controller can execute the instructions, where execution of the instructions causes the controller to: determine, for each device of a set of devices proximate to the transmitter array, a device location relative to the transmitter array; and selectively cause a subset of transmitters to transmit power, the subset comprising fewer than all of the plurality of transmitters of the transmitter array, the subset including, for each detected device, transmitters at the device location. Execution of the instructions can further cause the controller to determine, for each detected device, a corresponding device type from a plurality of device types.

The system can further include an artificial intelligence engine in communication with one or more of the sensing array and the sense voltage, the artificial intelligence engine being trained to determine the location of devices and, for each detected device, a corresponding device type from a plurality of device types; and execution of the instructions further causes the controller, for each detected device, to configure the transmitter tiles according to the detected device types. The plurality of device types has a corresponding charging specification, and causing the controller to configure the transmitter tiles according to the detected devices location and types and their charging specifications.

Each device type of the plurality of device types has a quality of service ("QoS") specification, and the controller configures the transmitter tiles according to its QoS specification. The controller can be configured to reduce power transmission by at least one transmitter in at least one power path by tuning the impedance of such transmitter.

The controller can be configured to cancel power transmission by at least one transmitter in at least one power path by configuring at least one transmitter of the array of transmitters to reflect a power signal from the master transmitter back along said at least one power path. The controller can be further configured to establish a revised power path in response to a change of device position of a device from an initial device position to a subsequent device position. Moreover, the controller is further configured to modulate the power signal of master transmitter tiles over one or more power paths to encode and overlay data and control information, with the modulation being one or more of frequency, amplitude, or phase modulations. The controller is configured to create customizable energy shapes in 2D/surface and 3D through collaborative operation of transmitter tiles that charge at the same time. The controller is configured to execute one or more of charging hypervisor, multi-tiles sensing, device identification, device localization, multi-receiver power routing and scheduling, selective power blocking, power spots forming, energy field shaping, location-aware load balancing, charging policy assignment and management, energy tile role assignment, QoS management, charging capacity management, multi-frequency transfer management, power demand classification, interference management, device polling, device authentication, charging handoff and management, mobility/device tracking and management, diagnosis analysis, global energy maps, safety analysis and guarantee, usage profiling, and dashboard/notification.

The system can further include at least one energy receiver unit that includes at least one charging coil; a plurality of hardware components to harvest resonance magnetic energy and enable/disable coil in energy reception chain, and optionally, a microcontroller and memory component encoded with computer executable modules to enable a set of active coils, and measure and monitor the connected receiver device load or power voltages. The microcontroller of each transmitter file includes a distributed network process running thereon, the distributed network process being configured to run various operations such as distributed resonance sensing, reconfigurable energy hopping, data/control communication, and switching between different operational states.

Each transmitter tile can include a radio frequency signal and create a mesh network for data and control message exchanges between transmitter tiles. The modules of the controller are deployed fully or selectively on the transmitter tiles or on remote energy edge nodes based on the available resources of the transmitter tiles or the remote energy edge nodes. The remote energy edge node and the master transmitter tiles dynamically change the transmitter tiles configurations and run control plane functionalities.

The controller runs an energy shaping algorithm that finds one or more optimal energy flow paths that deliver power to the devices detected within the charging range. The energy flows are configured to create power spots over a large area to charge multiple electronic devices and null energy at other selected areas. The one or more energy flows deliver power to multiple devices over their energy paths.

The system can further include a multi-layer reconfigurable energy receiver having a multi-layer of coils, the receiver being configured to activate a specific number of coils based on receiver load, amount of required power, or location of device.

The controller can re-use the same charging frequencies on each tile of the plurality of tiles to increase system charging capacity, and can use different frequencies on each tile of the plurality of tiles to decrease interferences. Moreover, the controller can change the power by re-configuring the transmitter tiles. The controller can further include add-on software that enables additional monitoring, management, maintenance, and optimization tools. The add-on applications can be configured to learn usage patterns including common detected locations of charging, common charging requirements and types of devices, and common mobility patterns.

A software-defined cognitive wireless charging system can include a transmitter array comprising a plurality of transmitters; a memory storing executable instructions; a controller in communication with the memory and the transmitter array, the controller configured to execute the instructions, execution of the instructions causing the controller to: determine, for each detected device of a set of devices proximate to the transmitter array, a device location relative to the transmitter array; and selectively cause a subset of transmitters to wirelessly transmit power, the subset comprising fewer than all of the plurality of transmitters of the transmitter array, the subset including, for each detected device, at least one transmitter proximate to its respective device location.

The system can further include a sensing array comprising a plurality of sensing tiles, the sensing array in communication with the controller; and wherein execution of the instructions causes the controller to: use the sensing array to detect the presence of at least one chargeable device adjacent to the transmitter array, the at least one chargeable device being a detected device. Execution of the instructions can further cause the controller to: determine, for each detected device, a corresponding device type from a plurality of device types.

The system can further include an artificial intelligence engine in communication with the sensing array, the artificial intelligence engine trained to determine, for each detected device, a corresponding device type from a plurality of device types; and execution of the instructions further causing the controller, for each detected device, to transmit power to said device according to its device type determined by the artificial intelligence engine. Each device type of the plurality of device types has a corresponding charging specification, and the artificial intelligence engine can be trained to determine, for each detected device, a corresponding charging specification from a plurality of charging specifications, and cause the controller to transmit power to said device according to its device type comprises causing the controller to transmit power to said device according to its corresponding charging specification determined by the artificial intelligence engine. Each device type of the plurality of device types can have a quality of service ("QoS") specification, and wherein: the artificial intelligence engine is trained to determine, for each detected device, a corresponding QoS from a plurality of QoSs, and cause the controller to transmit power to said device according to its device type comprises causing the controller to transmit power to said device according to its QoS specification determined by the artificial intelligence engine.

BRIEF DESCRIPTION OF THE DRAWINGS

FIG. 8 shows positive and negative voltage changes of a moving device (a) along the x and y axes of sensing coil, and (b) as function of distance from coil center.

FIG. 9 shows a node having (a) fabricated PCB board, and (b) fabricated dual coil.

DETAILED DESCRIPTION

Figure 1C:
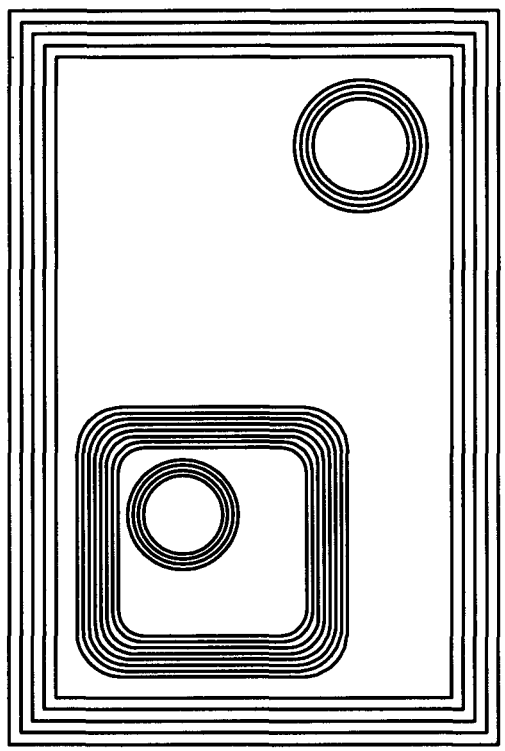
FIG. 1C illustrates yet another layout of nested sensing coils, where each sensing node includes a combination nested active and passive coils that includes multi-nested coils, two passive and two active coils.
Figure 1B:
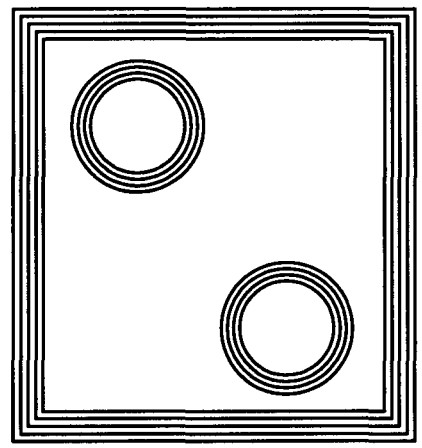
FIG. 1B illustrates another layout of nested sensing coils, where each sensing node includes a combination nested active and passive coils that includes two inner active coils and one outer passive coil.
Figure 1A:
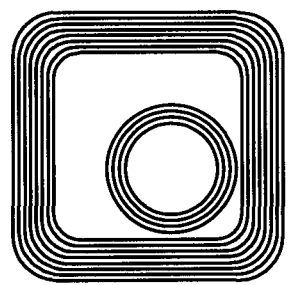
FIG. 1A illustrates a layout of nested sensing coils, where each sensing node includes a combination nested active and passive coils that includes a dual-coil architecture with one inner-active coil and one-outer passive coil.
Figure 2:
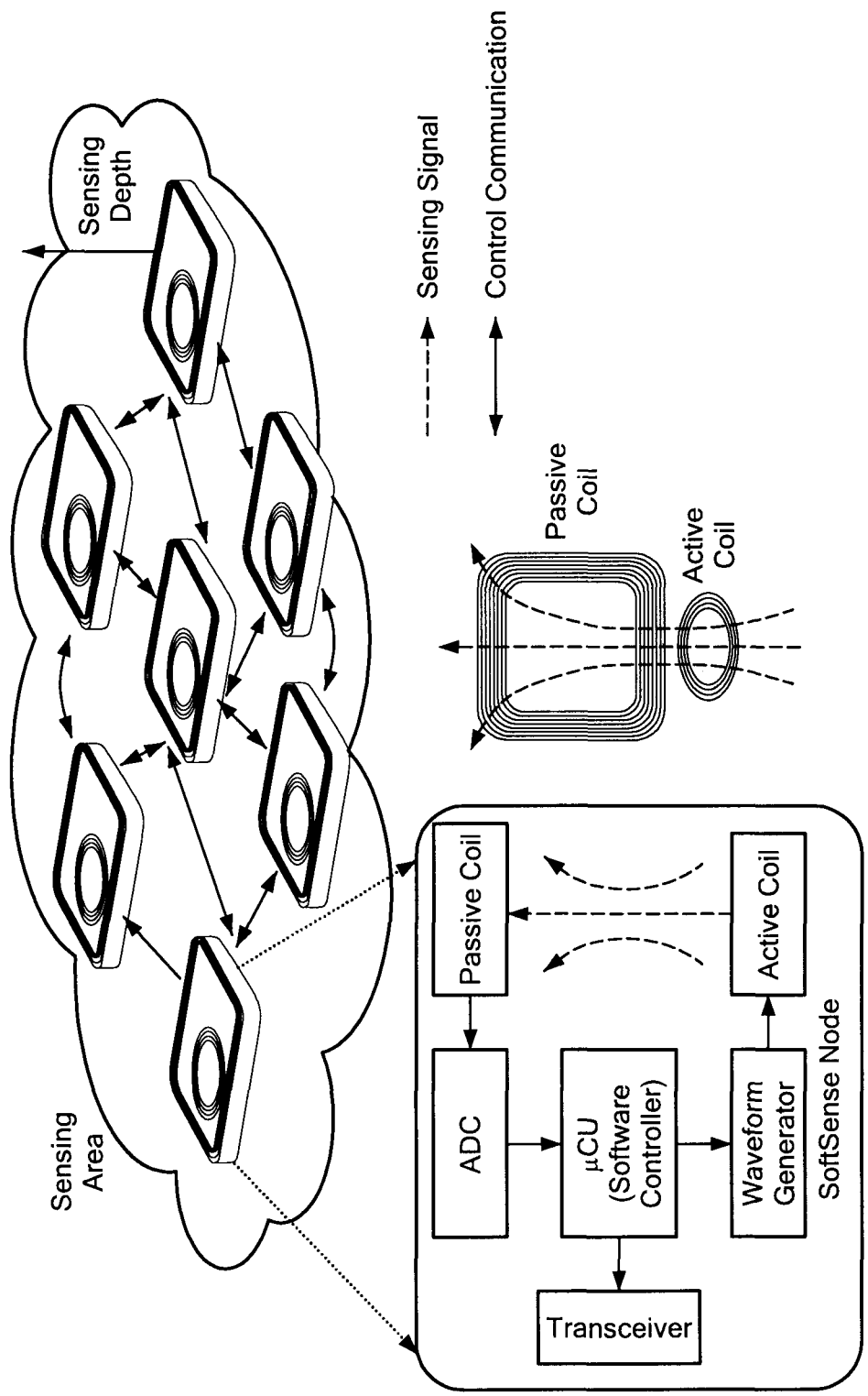
FIG. 2 shows a system overview of collaborative networked coils with individual sensing unit per nested coils.

Systems and methods described herein provide a software-defined, collaborative, multi-coil, contactless sensing system including networked and multi-layer inter-connected sensing coils that work on one or multiple sensing frequencies and are capable of detecting as well as tracking the type and location of multiple different electronic devices over 2D and 3D areas based on simultaneous real-time voltage time-series reported from the sensing coils.

The networks, systems, and methods for "software-defined wireless charging" provided herein can transform existing two-dimensional (2D) surfaces or three-dimensional (3D) areas into a multi-device contactless wireless charger. In particular, a software-defined and programmable wireless charging network and system are provided that include hardware and software architecture, operation, and distributed algorithms that address several shortcomings of the existing charging solutions in a fundamentally different way.

Sensor Array

FIGS. 1-4 depict an overview of system architecture and components. For example, as shown in FIGS. 1A-1C, each sensing node can include a combination of nested active, or driven, and passive coils, with exemplary configurations including: (a) dual-coil architecture 100 with one inner-active coil 102 and one-outer passive coil 104, (b) two inner active coils 102' and one outer passive coil 104' in the sensing node 100', and (c) multi-nested coils in the sensing node 100" having two passive 104" and two active coils 102". The active coils 102, 102', 102" might be connected to a continuous wave generator, and the passive coils 104, 104', 104" might resonate with active coils and extend the sensing area. The nested coils are so designed such that they are in resonance with each other, when there is active current in the active coils 102, 102', 102", the passive coils 104, 104', 104" act a resonator relay that extend the magnetic flux generated by the current with extremely low power consumption. Each such multi-nested coil sensing element 100 (henceforth called as a node) might operate in the kHz or MHz bands and is configured to produce a drive signal.

Figure 3:
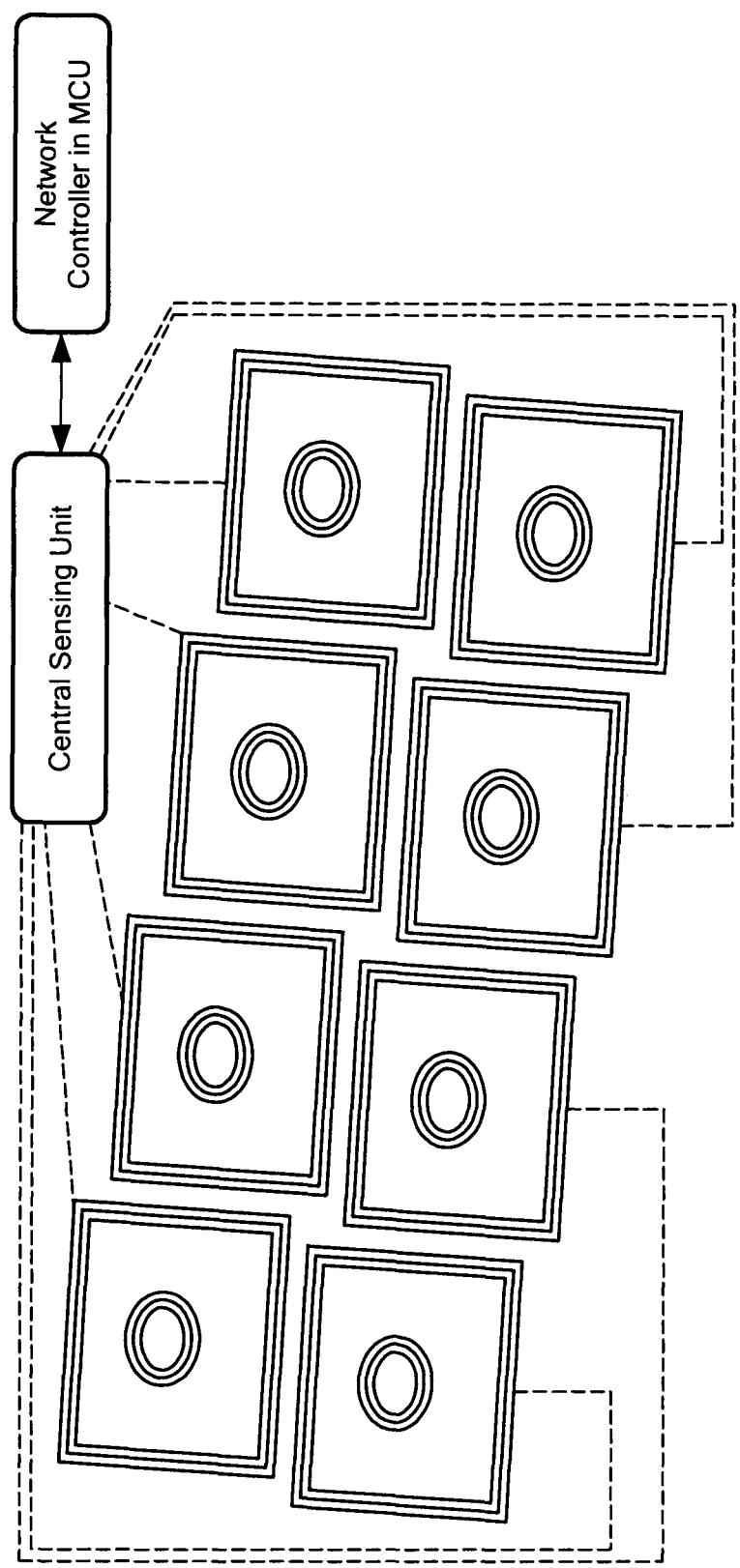
FIG. 3 depicts a system overview of collaborative networked nested coils with one central sensing unit.

Each nested sensing coil 100 might be connected to an individual sensing circuit 106 (FIG. 2) or a group/network of sensing coils 100 might be connected to one or more central sensing circuits 108 (FIG. 3).

One or more sensing circuits 106 might be connected to a microcontroller that has executable codes in memory.

A network controller can act as central unit that collects all the sensing readings from multiple sensing coils and run algorithms including classification, identification, and tracking of electronic devices over 2D and 3D areas. The sensing nodes can be networked together and might exchange control messages with the network controller.

Multiple sensing nodes 100 might be attached to the underside of a large surface such as a charging pad and desk.

Multiple sensing nodes 100 might be placed in a mixture of vertical and horizontal directions close to each other to create a customized 3D sensing area.

Figure 4:
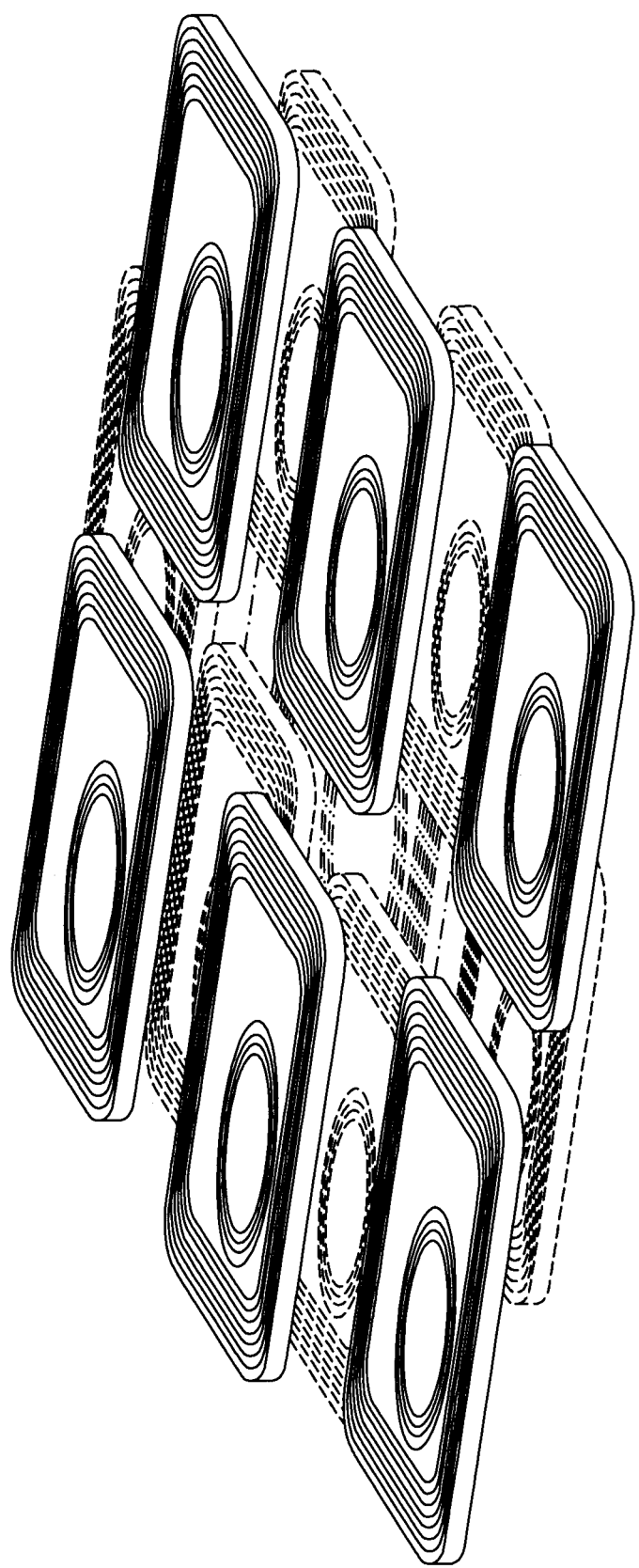
FIG. 4 shows multi-layer nested sensing coils that operate at multiple frequencies.

As shown in FIG. 4, multiple layers of nested sensing coils 100 might be used to cover an area with high accuracy. Each layer or groups of nested coils might operate at one or more different frequencies.

When a device is within the networked coils coverage sensing area, each node can measure the induced voltage in its outer coils and report back these measurements, along with its ID, to the central network controller. Similarly, if the device moves, the nodes can detect similar changes and transmit update messages to the controller. The output of each sensing node can be measured induced voltages in the outer coils over the time and forms a time-series. The central network controller can use simultaneous time-series from multiple sensing nodes in form of multi-voltage time-series to classify, identity, localize, and track devices over 2D and 3D areas. The controller might run machine learning-based algorithms or fuses all the measurement data reported by the entire node array (networked coils) and matches the voltage patterns with a priori stored signatures.

The input of each passive coil in a nested sensing node might process in forms of frequency filtering, smoothing, and averaging over customized input windows to eliminate various noises.

The multiple simultaneous streams of voltage time-series from networked coils, might be normalized and feed to a machine learning-based program in microcontroller. The program might use models such as random forest, supper vector machine, and multi-layered neural network for device identification, localization, and tracking.

Figure 5:
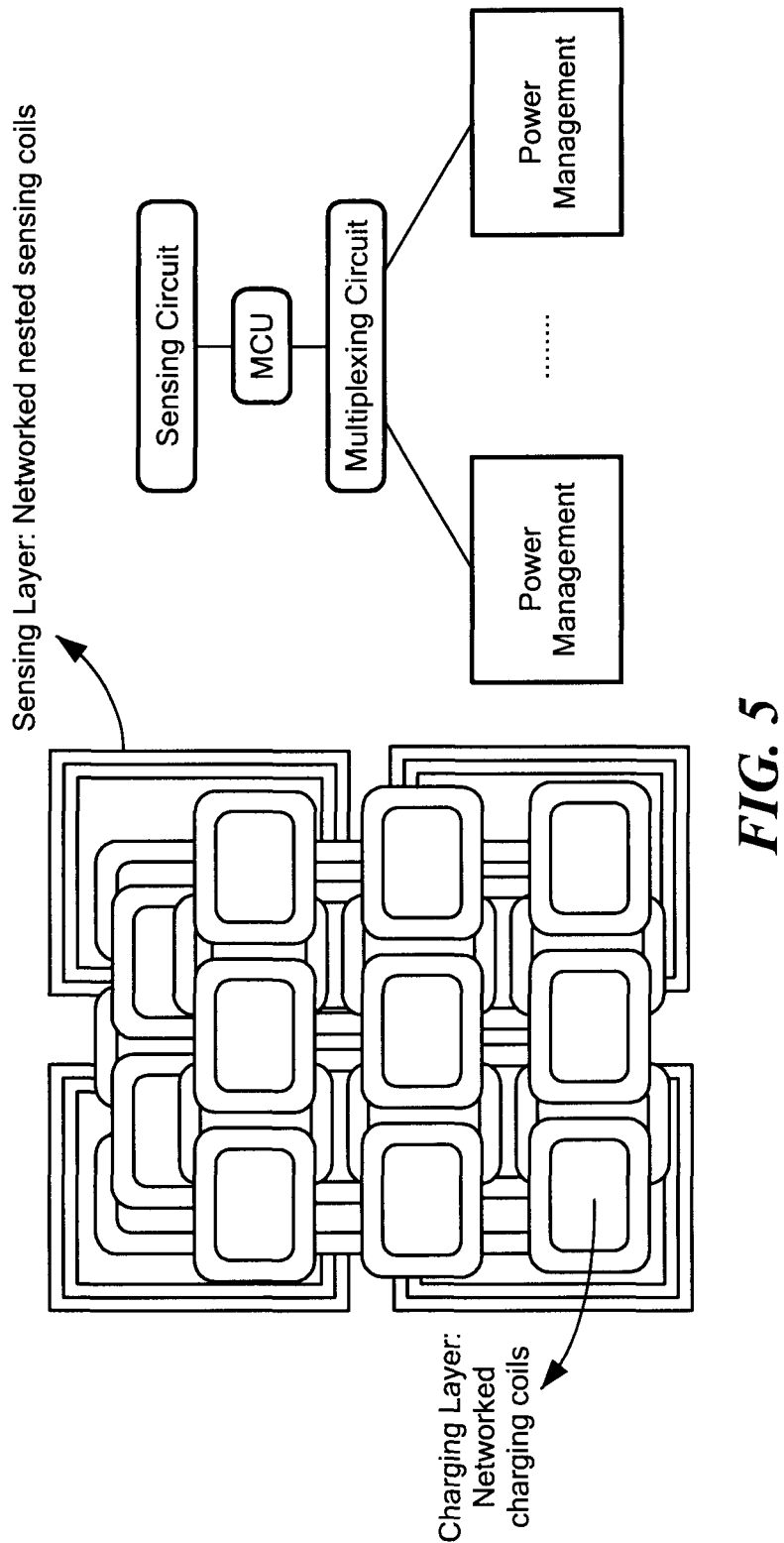
FIG. 5 illustrates a cognitive inductive charging network with layers of nested sensing coils, charging coils, and coils multiplexing.

As shown in FIG. 5, inductive charging coils can be used. For example, an additional layer of networked charging coils 110 may operate on top of networked nested sensing coils 100 and together create a cognitive inductive charging network 112. This system 112 may multiplex one or more wireless charging power managements to one or more charging coils within the networked charging coils layer, based on the location and type of the detected device/s that would be identified at the network controller (based on collaborative and networked sensing coils measurement). It will be appreciated that there can be no coupling between networked charging coils 110; for example, the charging coils can just turn on and off.

Figure 6A:
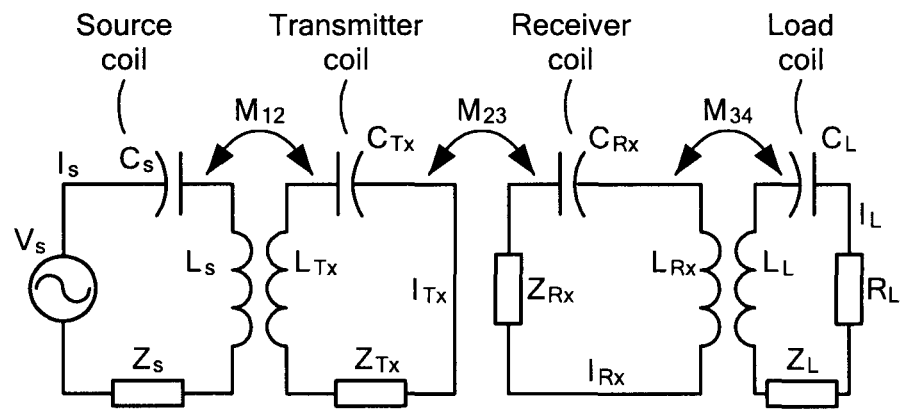
FIG. 6 illustrates circuit schematics of (a) strongly coupled resonant wireless power transfer, (b) dual-coil circuit design, and (c) dual-coil architecture with active inner and passive outer coils.
Figure 6B:
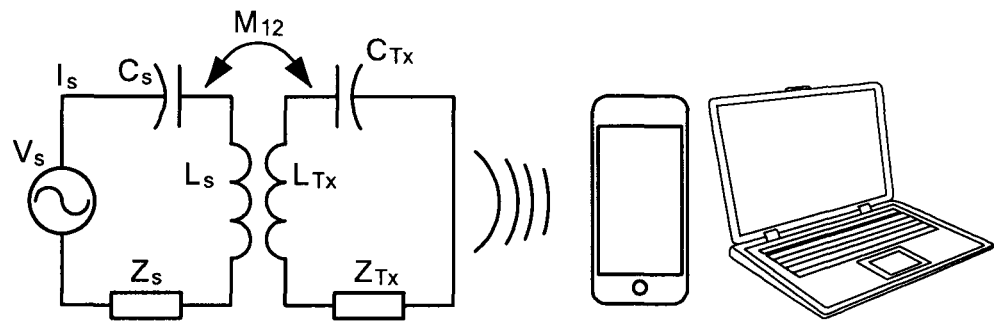
Figure 6C:
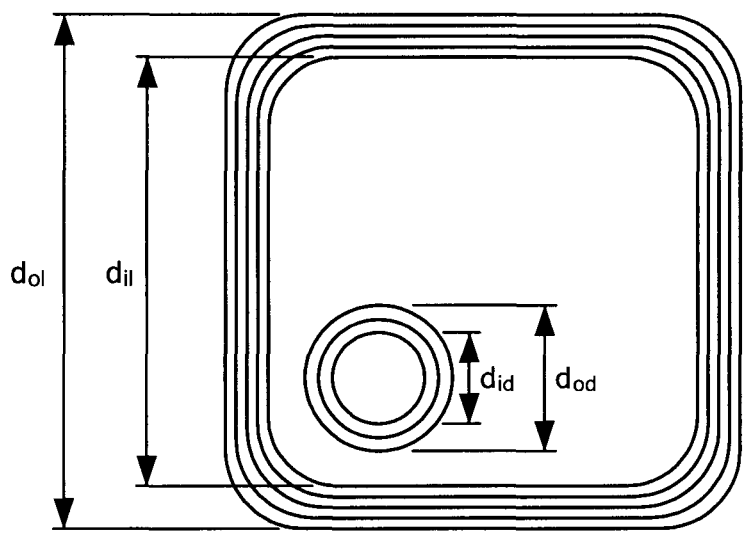

As a background on the theoretical analysis, FIG. 6a shows the circuits 10 for strongly coupled magnetic resonance power transfer, where the source coil connects to the AC power source and generates the magnetic field. The oscillating magnetic flux resonates in the transmitter coil. On the other side, the magnetic flux from the transmitter is converted into the current at the receiver coil. This current creates a secondary magnetic flux within the load coil. This flux is converted into the current as well and consumed by the device represented as R FIG. 6b shows the circuit schematic of for an example of nested sensing with dual-architecture design (dual-coil) and FIG. 6c shows its architecture. Some exemplary values here might be $d_{ol}=12$ cm, $d_{il}=10$ cm, $d_{od}=5$ cm, $d_{id}=3$ cm are outer coil length, inner coil length, outer coil diameter, and inner coil diameter, respectively. Different from wireless power transfer, in the contact-less sensing system, the objects/devices do not need to have a receiver coil inside.

Various devices with relatively high conductive materials such as cell phone, laptop, and mouse change the magnetic field distribution at the transmitter outer coil. This change can be measured in voltage change of the coil and the amount of change depends on multiple variables, such as size, shape, materials, magnetic permeability, electrical conductivity, and the overlapping area between device and transmitter coil. Some additional non-limiting examples of configurable variables can include frequency, peak-to-peak voltage, or output power.

The software controller can be configured to selectively control transmitters to refrain from transmitting power, the transmitters not being a part of a transmission path from the set of transmission paths.

Table (I) summarizes the circuit parameters that will be used to formulate the voltage gradient in the outer coil theoretically for an example configuration of a dual-coil sensing coil that includes one inner coil and one outer coil.

TABLE I

| Symbol | Description |
|---|---|
| $V_s$ | Input AC signal voltage at source coil |
| $I_s$ | Current amplitude at source coil |
| $C_s$ | Capacitance at source coil |
| $L_s$ | Self inductance at source coil |
| $M_{12}$ | Mutual inductance between source and Tx |
| $Z_s$ | Resistance of input AC signal at source coil circuit |
| $I_{Tx}$ | Current amplitude at Tx coil |
| $L_{Tx}$ | Self inductance at Tx coil |
| $C_{Tx}$ | Capacitance at Tx coil |
| $Z_{Tx}$ | Impedance of Tx circuit |
| $M_{23}$ | Mutual inductance between Tx and Rx |
| $I_{Rx}$ | Current amplitude at Rx coil |
| $L_{Rx}$ | Self inductance at Rx coil |
| $C_{Rx}$ | Capacitance at Rx coil |
| $Z_{Rx}$ | Impedance of Rx circuit |
| $M_{34}$ | Mutual inductance between Rx and load |
| $I_L$ | Current amplitude at load coil |
| $L_L$ | Self inductance at load coil |
| $C_L$ | Capacitance at load coil |
| $R_L$ | Resistance of load coil |
| $Z_{LTx}$ | Impedance of Tx coil |
| $Z_{CTx}$ | Impedance of capacitor at Tx circuit |
| $\omega$ | Angular Frequency of AC source |

The self-inductance, impedance, mutual inductance, resistance, and angular frequency of input AC signal are given, as they depend on characteristics of the hardware and coils. Accordingly, the circuit equations for the dual-coil system can be explained by the following equations:

$$V_s = I_s\left(j\omega L_s + \frac{1}{j\omega C_s} + Z_s\right) - j\omega M_{12}I_{Tx}$$

$$I_{Tx}\left(j\omega L_{Tx} + \frac{1}{j\omega C_{Tx}} + Z_{Tx}\right) + j\omega M_{12}I_s = 0$$

$$Z_{Tx} = Z_{LTx} + Z_{CTx}$$

Here, the change of current amplitude at the transmitter outer coil is negligible because the AC power of inner source coil is very low (mW). At resonant mode, jωLT x and jωCT x cancel each other. VT x is the voltage of outer coil when there is no device and can be calculated as follows:

$$V_{Tx} = j\omega M_{12}I_s$$

$$V_{Tx} = I_{Tx}Z_{Tx} = I_{Tx}(Z_{LTx} + Z_{CTx})$$

Once a device comes within sensing coverage and distance, the impedance of the outer coil Z_LTx changes to Z'_LTx and accordingly the voltage change at the outer coil is calculated as:

$$|\Delta V| = |I_{Tx}(Z'_{LTx} - Z_{LTx})|$$

Collaborative Sensing and Tracking

The technology can be configured to determine proximity of the device to the apparatus based on the plurality of sense voltages. While voltage readings in an individual sensing node might detect the presence of a device, they cannot accurately predict the type of devices. Additionally, an individual sensing node is not capable of tracking a device over an area. For example, devices with different sizes and types but the same overlapping coverage with a sensing node can cause the similar intensity of voltage changes. To address these challenges and also enable device tracking, readings from multiple sensing nodes through collaborative sensing and tracking are taken into consideration.

Figure 7B:
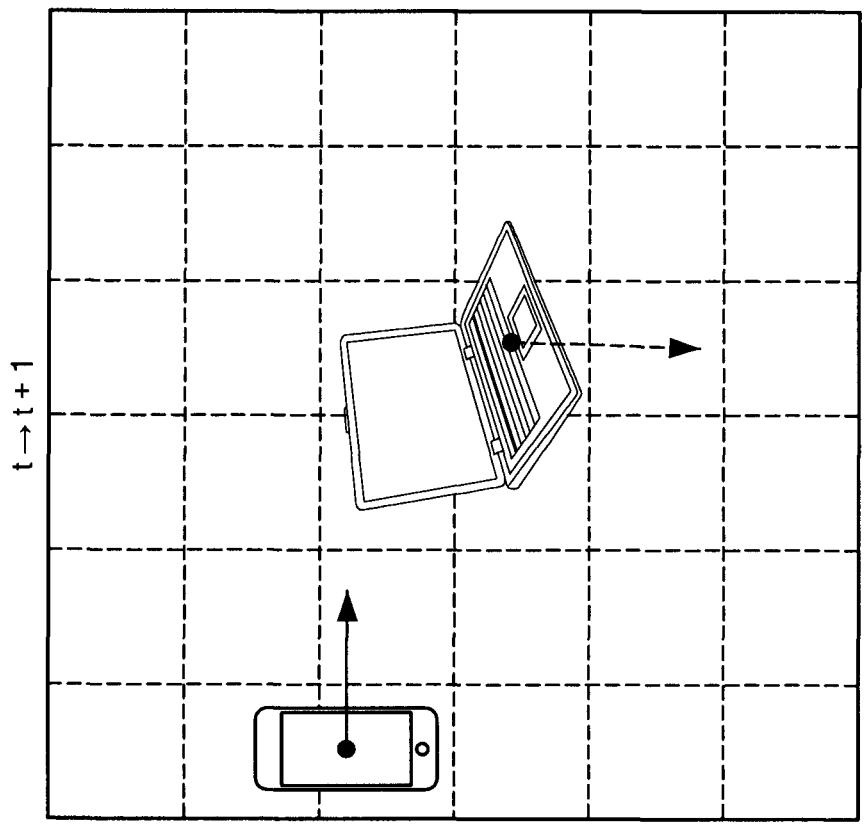
FIG. 7 shows multi-coil network, where each square block denotes a sensing node. Devices transition around the surface (a) from time t−1 to t, and (b) from t to t+1.
Figure 7A:
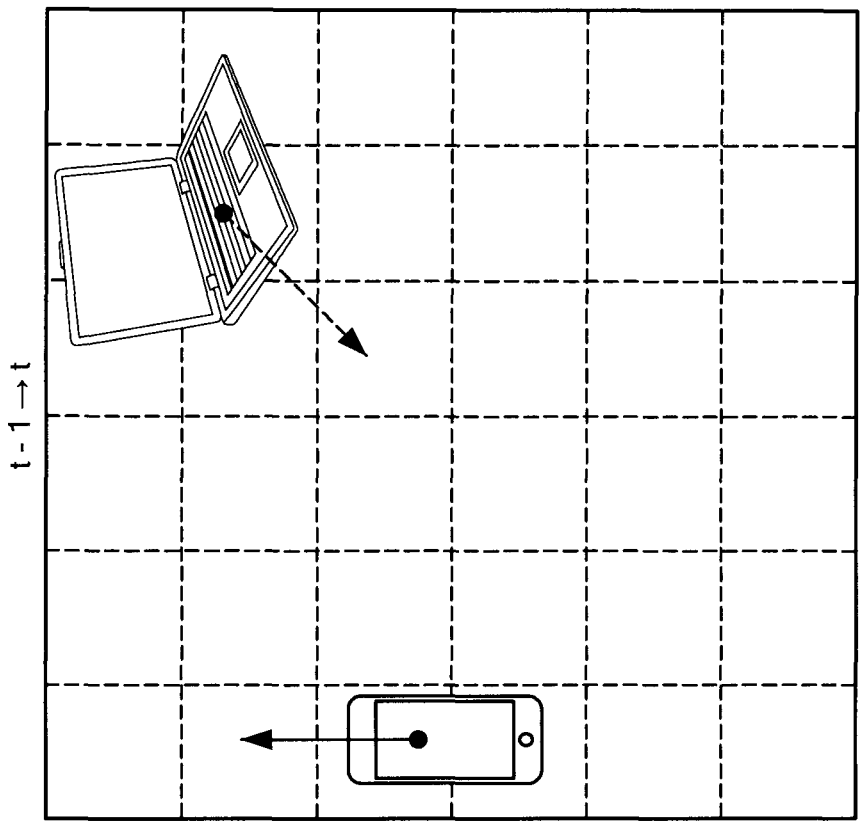

FIGS. 7A-7B show an exemplary multi-coil network 120, where each square block is a sensing node. As shown in FIG. 7A, devices can transition around the surface from time t−1 to time t, or from time t to t+1, as shown in FIG. 7B. This change in location, relative to the sensor array 100, of the can be referred to as (ΔP), which is the change over time between the pattern of the plurality of sense voltages at a sensing time (t) and a corresponding previous pattern of the plurality of sense voltages from an earlier time (t−1). Here, there are m×k nodes that cover a large surface area. To detect the presence of a device, each node senses individually within its sensing coverage and shares voltage with network controller. At time t, m×k voltage time-series and voltage matrix of this network can be computed as follows:

$$V(t) = \begin{bmatrix} V_{11} & V_{12} & \cdots & V_{1k} \\ V_{21} & V_{22} & \cdots & V_{2k} \\ \vdots & \vdots & \ddots & \vdots \\ V_{m1} & V_{m2} & \cdots & V_{mk} \end{bmatrix}$$

where $V_{ij}$ denotes the sensed voltage of the sensing node located at position (i,j). Regardless of the type and size of the device, any sensed voltage higher than a given noise threshold (i.e. empirically determined based on experiments) indicates the presence of a device. Additionally, based on the voltage matrix, the presence can be detected of multiple devices over the sensing network and their positions, when $V_{ij}$ is greater than the noise threshold.

Machine learning based algorithms can be used to detect the type of devices. For example, Support Vector Machine (SVM) classifier can be leveraged, and toward this, the experimental data may be divided into a training and a testing set in a 4:1 ratio, i.e., for each device, out of five experiments, four are used for training and one is used for testing. A feature vector can have (i) range of possible sensed voltages, (ii) number of covered nodes (i.e. connected blocks in FIGS. 7A-7B). First, depending on the overlapping area between a device and sensing coil, the value of voltage change lies within a range as shown in FIGS. 8A-8B, which illustrate positive and negative voltage changes of a moving device along the x and y axes of sensing coil 100, as shown in FIG. 8A, and as a function of a distance from the coil center, as shown in FIG. 8B. Accordingly, sensing data is collected for possible overlapping areas of a device and use the voltage range as SVM feature. A device may cover one or more sensing nodes 100.

A collaborative tracking method can be used first to compute the voltage gradient matrix and then estimate the motion and direction of multiple moving devices through signs of ΔV elements in voltage gradient matrices. This voltage gradient matrix between time t−1 and t is defined as:

$$\Delta V(t-1, t) = \begin{bmatrix} \Delta V^t_{11} & \cdots & \Delta V^t_{1p} & \cdots & \Delta V^t_{1j} & \Delta V^t_{1j+1} & \cdots & \Delta V^t_{mkt} \\ \vdots & \vdots & \vdots & \vdots & \vdots & \vdots & \vdots & \vdots \\ \Delta V^t_{i1} & \cdots & \Delta V^t_{ip} & \cdots & \Delta V^t_{ij} & \Delta V^t_{ij+1} & \cdots & \Delta V^t_{ik} \\ \Delta V^t_{i+11} & \cdots & \Delta V^t_{i+1p} & \cdots & \Delta V^t_{i+1j} & \Delta V^t_{i+1j+1} & \cdots & \Delta V^t_{i+1k} \\ \vdots & \vdots & \vdots & \vdots & \vdots & \vdots & \vdots & \vdots \\ \Delta V^t_{q1} & \cdots & \Delta V^t_{qp} & \cdots & \cdots & \cdots & \cdots & \Delta V^t_{qk} \\ \vdots & \vdots & \vdots & \vdots & \vdots & \vdots & \vdots & \vdots \\ \Delta V^t_{m1} & \cdots & \Delta V^t_{mp} & \cdots & \Delta V^t_{mj} & \Delta V^t_{mj+1} & \cdots & \Delta V^t_{mk} \end{bmatrix}$$

where ΔV t refers to change in voltage at the sensing coil ij located at position (i,j), between time t−1 and t. Furthermore, the negative and positive signs of ΔVt determine the direction of motion. As shown in FIGS. 8A-8B, if a device is moving toward the center of sensing coil, the voltage changes are positive, and negative if it is moving away. This means the direction of motion is always from negative ΔV to positive. To demonstrate this, FIGS. 7A-7B shows two devices (i.e. phone and laptop) moving from time t−1 to t (FIG. 7A) and then to t+1 (FIG. 7B). The corresponding voltage gradient matrix can be calculated as follows, where motion vectors are determined based on the indicated signs, from negative to positive.

$$\Delta V(t-1, t) = \begin{bmatrix} 0 & 0 & 0 & \Delta V^t_{14}(-) & \Delta V^t_{15}(-) & \Delta V^t_{16}(-) \\ \Delta V^t_{21}(+) & 0 & 0 & \Delta V^t_{24}(-) & \Delta V^t_{25}(-) & \Delta V^t_{26}(-) \\ \Delta V^t_{31}(+) & 0 & \Delta V^t_{33}(+) & \Delta V^t_{34}(+) & \Delta V^t_{35}(+) & 0 \\ \Delta V^t_{41}(-) & 0 & \Delta V^t_{43}(+) & \Delta V^t_{44}(+) & \Delta V^t_{45}(+) & 0 \\ 0 & 0 & 0 & 0 & 0 & 0 \\ 0 & 0 & 0 & 0 & 0 & 0 \end{bmatrix}.$$

$$\Delta V(t, t+1) = \begin{bmatrix} 0 & 0 & 0 & 0 & 0 & 0 \\ \Delta V^{t+1}_{21}(-) & \Delta V^{t+1}_{22}(+) & 0 & 0 & 0 & 0 \\ \Delta V^{t+1}_{31}(-) & \Delta V^{t+1}_{32}(+) & \Delta V^{t+1}_{33}(-) & \Delta V^{t+1}_{34}(-) & \Delta V^{t+1}_{35}(-) & 0 \\ 0 & 0 & \Delta V^{t+1}_{43}(-) & \Delta V^{t+1}_{44}(-) & \Delta V^{t+1}_{45}(-) & 0 \\ 0 & 0 & \Delta V^{t+1}_{53}(+) & \Delta V^{t+1}_{54}(+) & \Delta V^{t+1}_{55}(+) & 0 \\ 0 & 0 & \Delta V^{t+1}_{63}(+) & \Delta V^{t+1}_{64}(+) & \Delta V^{t+1}_{65}(+) & 0 \end{bmatrix}$$

A Node

FIGS. 9a-9b show components of an exemplary low-power sensing node with nested sensing coils, referred to as a SoftSense node. Here, the microcontroller unit includes 3 sub-units: a waveform generator, an analog-digital converter (ADC), and a BLE communication module (RN-42 BLE Chip). The waveform generator generates low-power square-wave signal at 200 kHz and applies it to sensing coil. The dual-coil sensing configuration has sub-coils of two different sizes and shapes. The inner coil is connected in serial with a capacitor and then linked to a waveform generator to generate a magnetic field by resonating at 200 kHz. The voltage rectifier converts the AC voltage at the outer coil into functional DC voltage. The presence of a device within the sensing coil coverage causes the voltage drop at the output of voltage rectifier. The analog digital converter in the microcontroller unit converts this voltage drop at the output of voltage rectifier into digital format. FIG. 9a shows the fabricated printed circuit board (PCB) 128 of one exemplary prototype. The PCB board 128 is designed as two layers, one of which serves as a ground plane and fabricate it with FR-4 epoxy glass substrate. A Teensy 3.2 can be used as microcontroller unit. It contains a 32 bit ARM Cortex-M4 72 MHz CPU and 12-bit analog digital converter. This unit performs functions of the waveform generator and analog digital converter. ON Semiconductor GBU8JFS-ND full-bridge rectifier chip is used as the voltage rectifier. Additionally, FIG. 9b shows fabricated dual-coil 130 made of litz wire with 1.15 mm diameter. This is same as the wire used in state-of-the-art standards such as Qi, and the self-inductance of outer 134 and inner coils 132 are 20 uH and 5 uH, respectively.

Figure 10B:
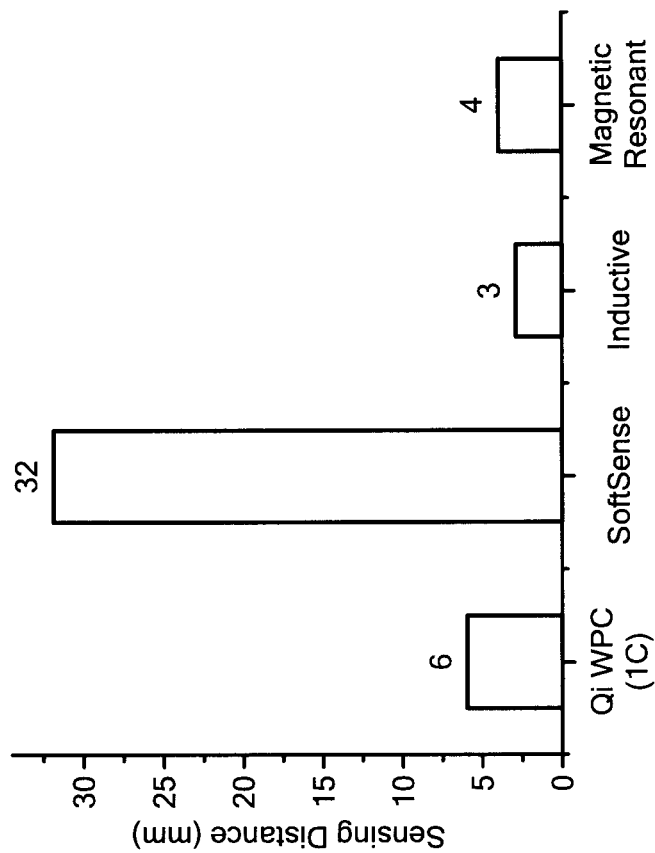
FIG. 10 depicts a sensing performance comparison in terms of (a) power consumption, (b) sensing distance, and (c) sensing coverage.
Figure 10A:
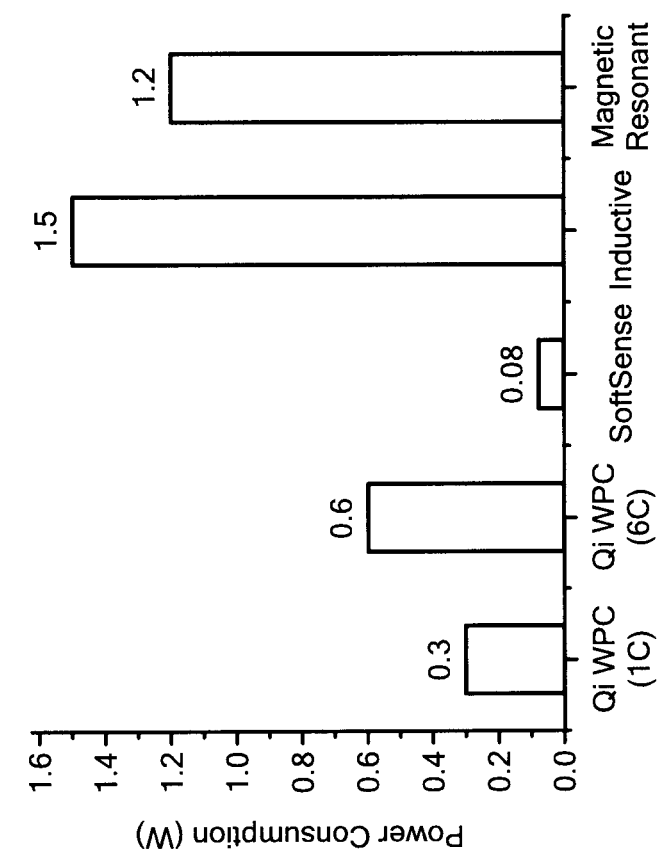
Figure 10C:
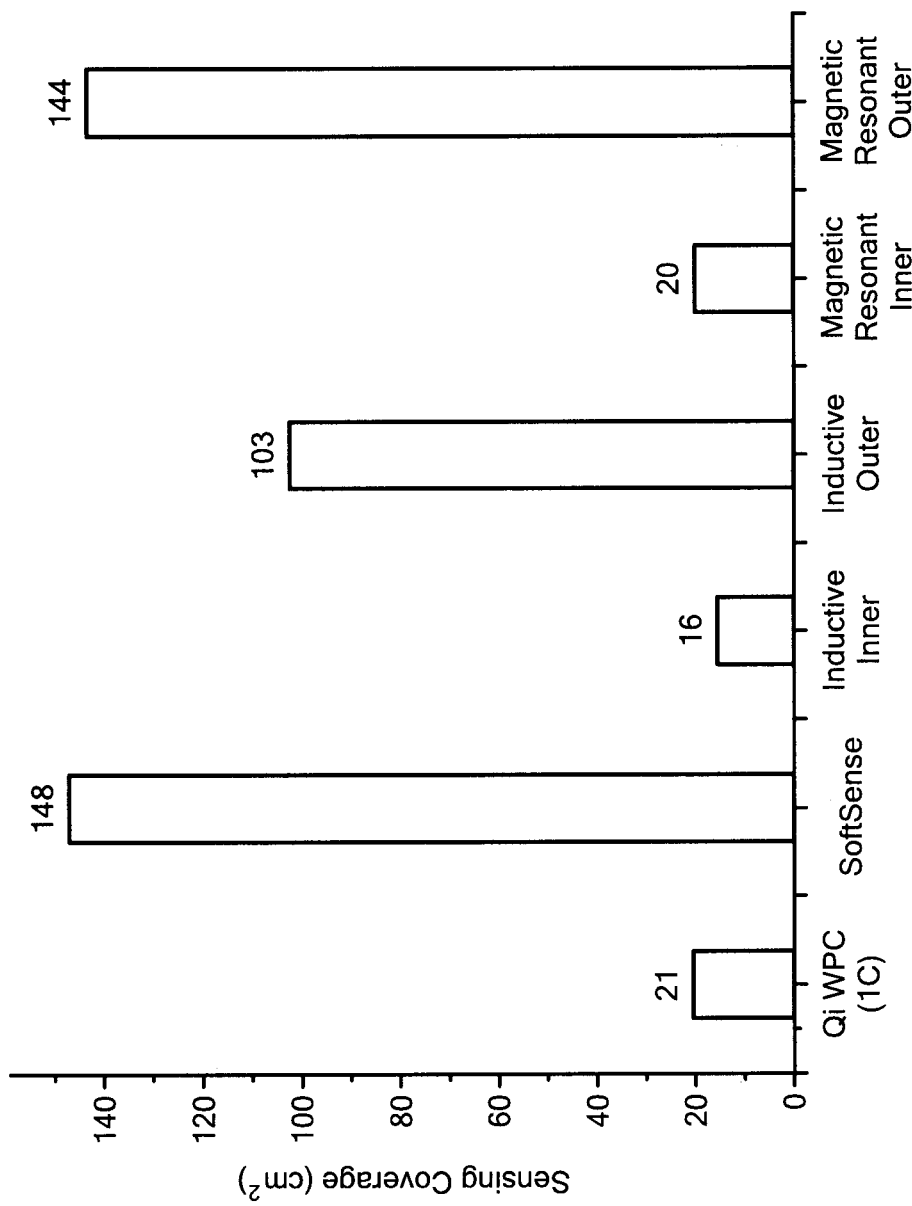

The unit can include a multi-layer printed circuit board, in which the driven coil is disposed on a first set of layers of the multi-layer printed circuit board; and the sense coil is disposed on a second set of layers of the multi-layer printed circuit board. The second set can be selected from one of: (a) a first subset of layers of the multi-layer printed circuit board, which is not co-extensive with the first set of layers; and (b) a second subset of layers of the multi-layer printed circuit board, which does not share any layer with the first set of layers. The node 100 can be devoid of a customized circuit or additional coil for sensing or detection FIG. 10a compares power consumption between "inductive sensing" that includes a coil with the same size of the outer coil as the coil fabricated in FIG. 9 (SoftSense). The coil is connected to the wave generator, and "magnetic resonance sensing" includes one coil with the same coil size and a resonant capacitor connected to wave generator, which is set to sense up to 3 cm. Additionally, the coils are compared with Qi (i.e. WPC standard version 1.2) that uses a combination of digital and analog pings for device sensing. Here, consider two Qi configurations with (1) one sensing coil that results in 12% sensing area of SoftSense, and (ii) six overlapping coils that provide same sensing area as the SoftSense node. It can be observed that SoftSense consumes 18.5× less than the inductive sensing, 15× less than magnetic resonance sensing, 7.5× less than Qi with six coils, and 3.75× less than Qi with one coil. FIG. 10b compares sensing distance between Qi, inductive sensing, magnetic sensing, and SoftSense. Here, sensing distance is set as the maximum distance that a phone can be detected with 95% accuracy. It has been shown that SoftSense significantly outperforms other techniques more than 5×. FIG. 10c depicts the sensing coverage and considers two sensing configurations for each of inductive and magnetic resonance sensing, one with a small as inner SoftSense active coil, and second with the same size as the outer coil. As shown, SoftSense provides the highest sensing coverage compare to other methods.

FIG. 11 evaluates the performance of SoftSense to identify the type of devices based on the measured voltage change. An SVM-based classifier for seven devices with different sizes and shapes, such as phone (iPhone X), laptop (Acer TravelMate X3), mouse (Logitech wireless mouse m275), metal (size 7 cm×7 cm and thickness of 1 mm), game controller (Xbox wireless controller), and power adapter (Belker 70w laptop charger), were trained and tested. One hundred and fifty experiments were conducted for each type of device, and for each experiment, data was collected with a sampling rate 20 ms for the duration of 5s. The nodes are placed on three over-surface materials: a large conference table with wood, a coffee shop table with hybrid wood, and a library table with hard plastic. The sensing nodes are placed at distance 3 cm from each other, ensuring the full sensing coverage of the surface.

Figure 11A:
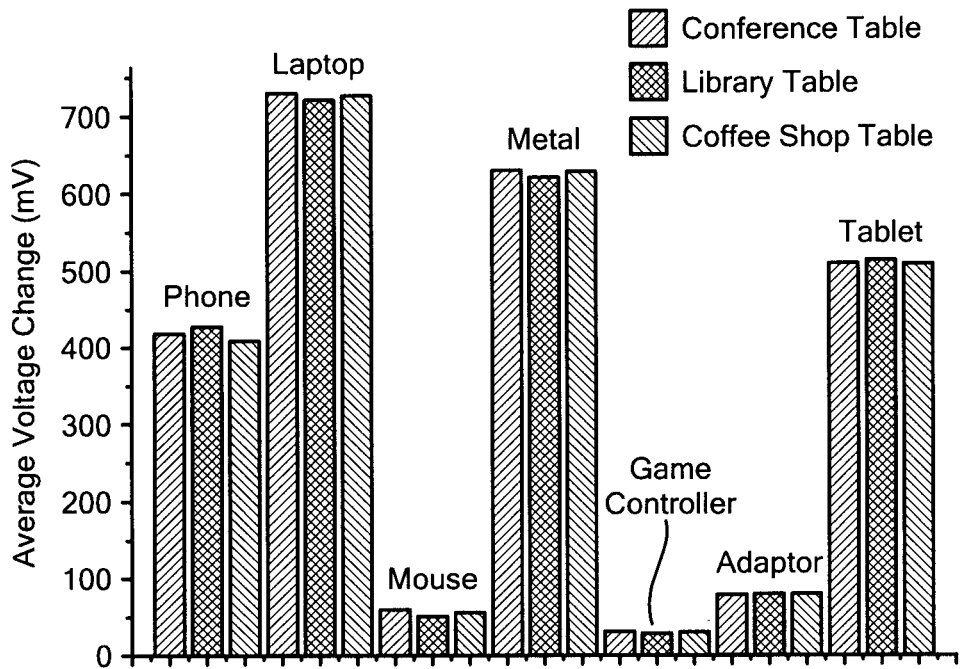
FIG. 11 illustrates (a) average voltage change for different devices and three over-surface materials. Device detection accuracy for (b) different types of devices, and (c) different sensing distances.
Figure 11B:
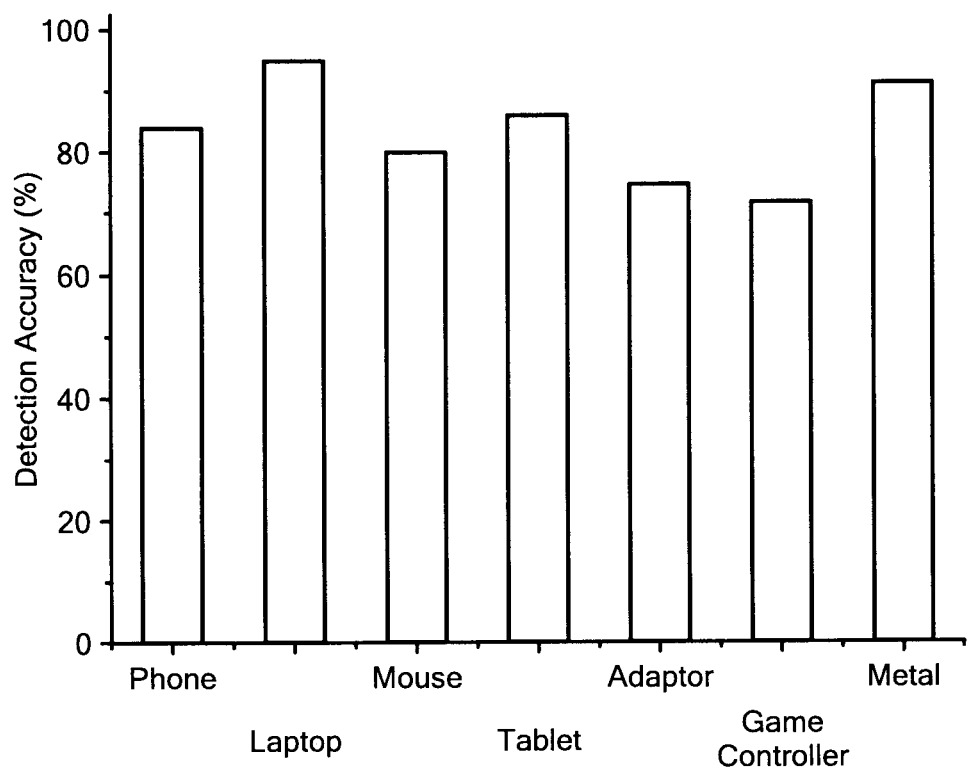
Figure 11C:
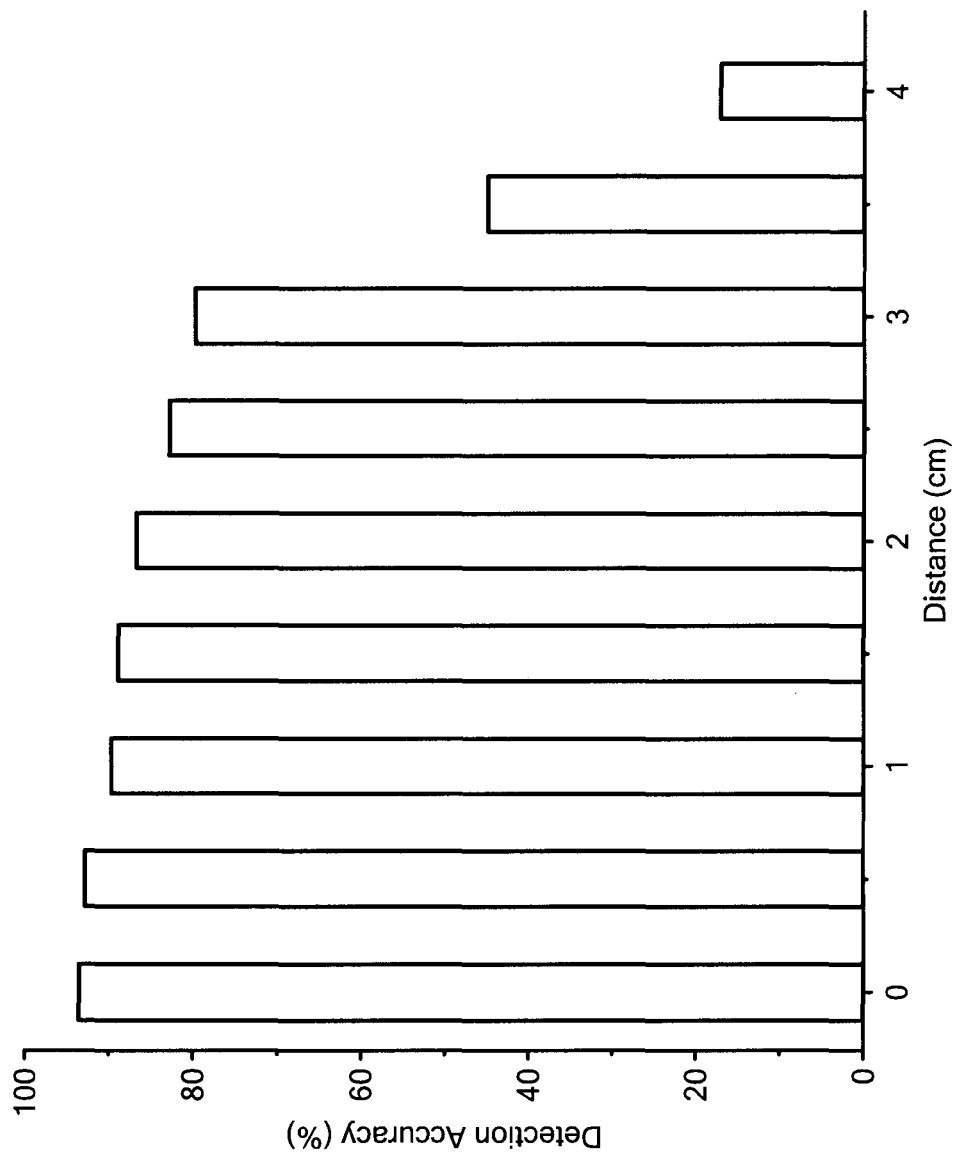

FIG. 11a shows the average measured voltage changes for different device types when it is placed in the center of the coil. It can be observed that regardless of surface materials different devices cause distinguishable levels of the voltage change. On the other hand, FIG. 11b depicts the device detection accuracy of different types at the fixed sensing distance 3 cm. In classification evaluations, experiments were conducted for different overlapping areas between sensing coil and device, as one of the SVM input features along with the number of nodes that the device has covered. One of the main reasons of misdetection error here is the hardware impairments due to ADC errors such as analog-signal source resistance, analog-input signal noise, and ADC dynamic range change, on the sensing signal. FIG. 11c shows the results for detection accuracy at different sensing distances for the device "phone". It indicates that 3 cm as the effective sensing distance that is similar for other device types.

Figure 12:
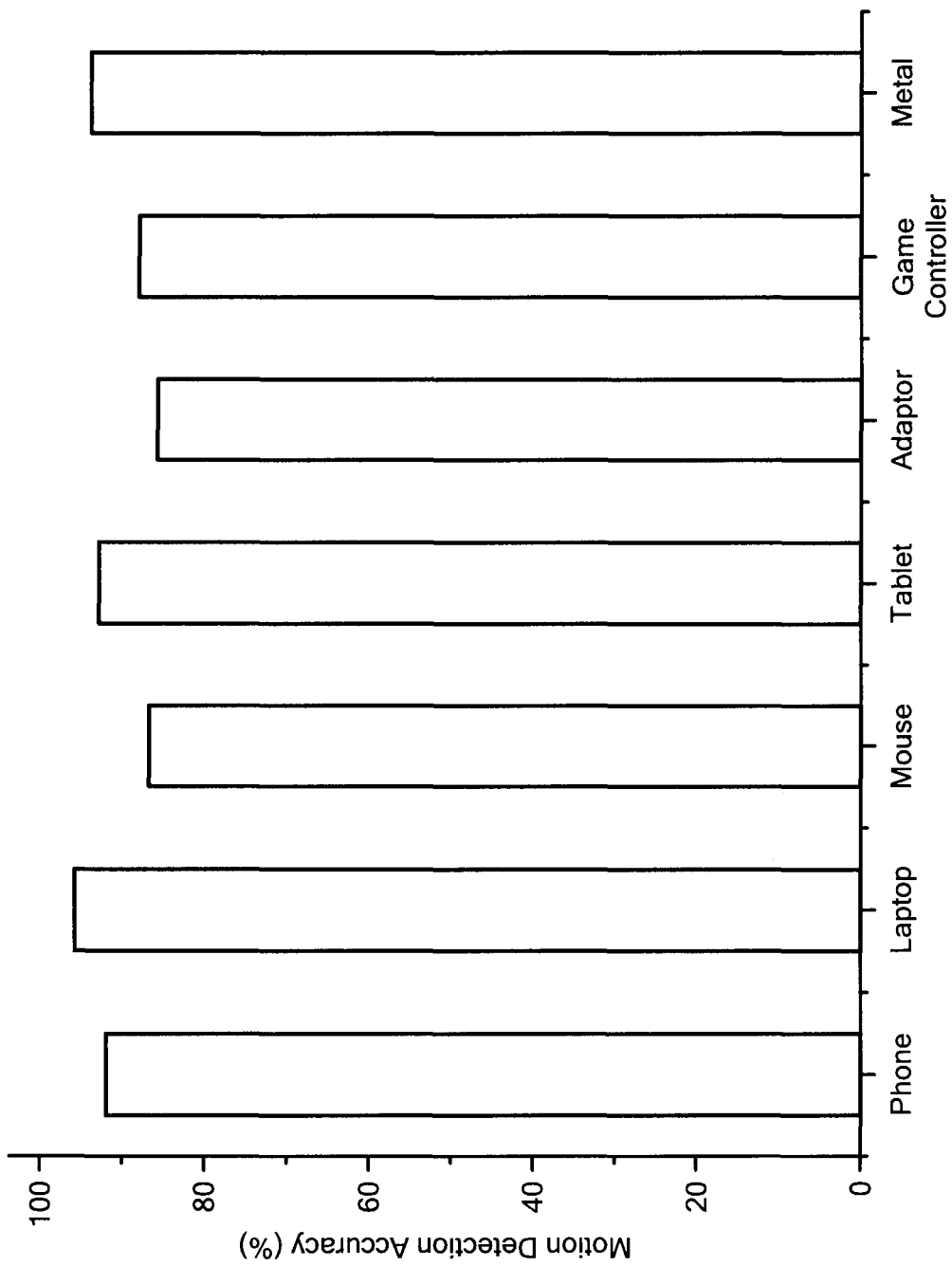
FIG. 12 illustrates results for tracking accuracy for different types of objects.

FIG. 12 presents the results for motion detection accuracy of different types. ADC errors that result in more than 100 mV voltage change could be enough to swap the signs of estimations in the voltage gradient from positive to negative or negative to positive and lead to motion misdetections. Despite such errors, FIG. 10 indicates the high accuracy of SoftSense device tracking.

Software-Defined Wireless Charging Network

Figure 13:
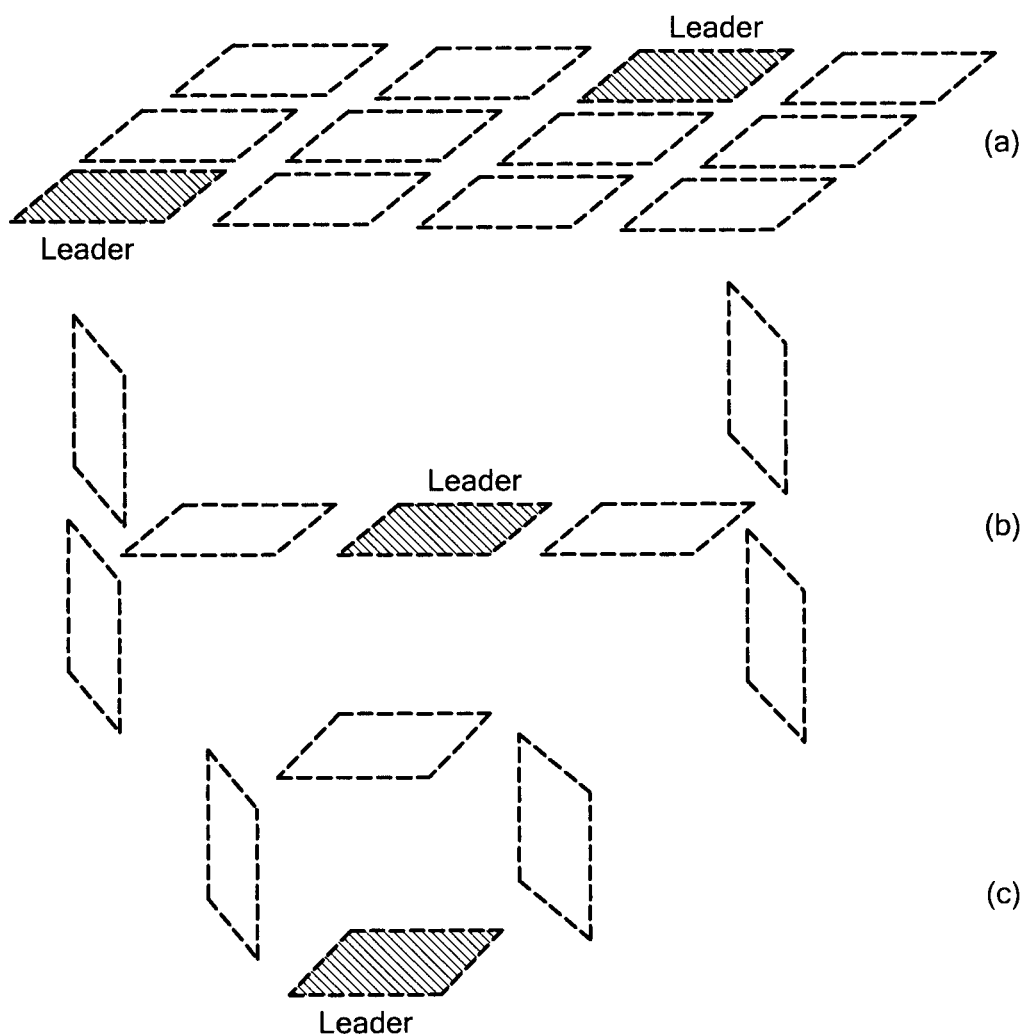
FIG. 13 illustrates arbitrary and customizable 2D and 3D wireless charging areas can be created through cognitive energy tiles and a software-defined wireless charging network.
Figure 14:
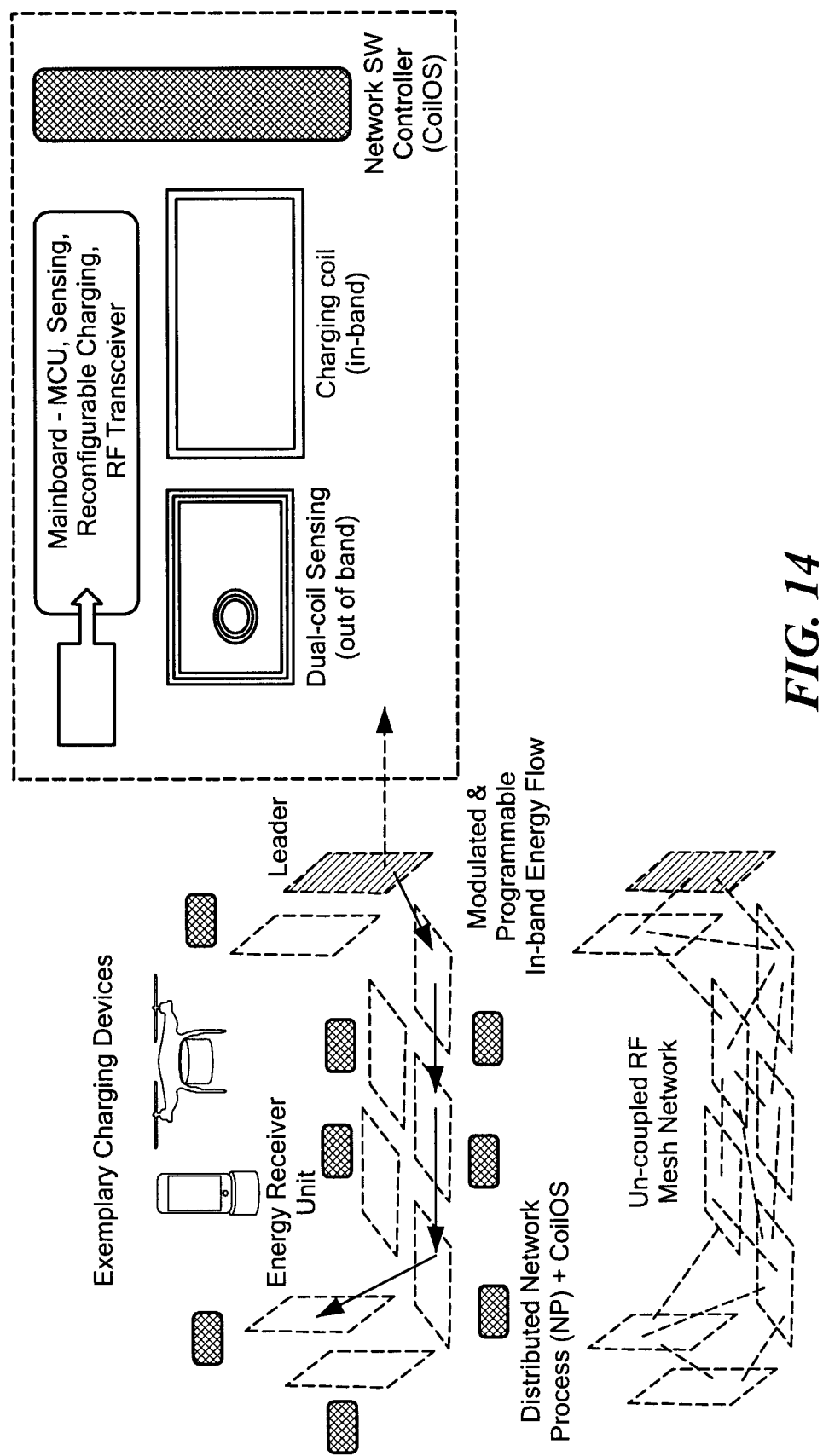
FIG. 14 shows an overview of software-defined wireless charging network and cognitive energy tile nodes.

A "software-defined wireless charging network" can be provided as a network of inter-connected and multi-hop cognitive charging transmitters (call cognitive energy tiles), that creates arbitrary and customizable 2D and 3D over-distance wireless charging areas, and capable of charging multiple heterogenous types of devices. As shown in FIGS. 13 and 14, a magnetic resonance charging may include:

I. A distributed network process running within a microcontroller of each energy tile 138 (at least one memory component encoded with computer executable modules) operable to run various operations such as distributed resonance sensing, reconfigurable energy hopping, and data/control communication, and switch between different operational states;

II. A plurality of hardware components within each energy tile 138 for out-of-band KHz resonance sensing, coupled to the at least one dual-coil sensing architecture coil;

III. At least one cognitive energy tile master or leader 138 that includes:
   a. A reconfigurable amplifier module 140 that can create frequency, phase, and amplitude modulated energy signals,
   b. At least one charging coil 142,
   c. At least one microcontroller and memory component encoded with computer executable modules including one or more modules of the software controller, and
   d. A plurality of hardware components for reconfiguring the impedance and resonance of the charging coil;

IV. Programmable in-band and modulated energy flows via multi-hop network of cognitive energy tiles through strongly coupled MHz magnetic resonance energy hopping. Modulated energy flows may carry overlaid data or control information through their modulations between two or more energy tiles as well as energy tiles and the energy receiver unit/s 146.

V. Out-of-band un-coupled radio frequency modules 147 within each energy tile that create a mesh network for data and control message exchanges between energy tiles as well as between energy tiles and the energy receiver unit/s VI. Network software controller 148 that based on the various sensing inputs from energy tiles 138 and energy receivers, manages and adjusts at least one of (not limited): software-defined charging network, energy tiles, energy flows, charging capacity and load of the system, charging QoS, charging policy, device localization, authentication, profiling, and tracking, as well as mobile device charging management, safety analysis, and hardware diagnosis analysis.

VII. At least one energy receiver unit 146, comprising:
   a. At least one charging coil 142,
   b. A plurality of hardware components to harvest resonance energy at MHz and enable/disable coil in energy reception chain,
   c. May have a microcontroller and a memory component encoded with computer executable modules to enable a set of active coils as well as measure and monitor the connected receiver device load, and harvested power voltages. The controller can use the array of sensing tiles to detect the presence of at least one device adjacent to the transmitter array, each such device being a detected device. Execution of the instructions by the controller can determine, for each device of a set of devices proximate to the transmitter array, a device location relative to the transmitter array; and selectively cause a subset of transmitters to transmit power, the subset comprising fewer than all of the plurality of transmitters of the transmitter array, the subset including, for each detected device, transmitters at the device location.

Programmable and Modulated Coupled Power Routing

A software-defined and networked wireless charging architecture can be provided based on "programmable and modulated coupled power routing (PMCPR)" concept and magnetic-resonance energy transfer for charging electronic devices over area and distance. This enables shaping the energy fields in a multi-hop inter-connected network of coils by collaboratively and in real-time reconfiguring the resonance coupling between distributed coils through a software controller and create optimal energy flows from one or more energy sources toward multiple destinations.

Magnetic resonance-based energy transfer can be combined with "modulated power routing and coupling" across energy tiles, where the magnetic fields are carefully shaped on the fly.

The system and method can include multiple cognitive and software-defined energy tiles with two roles leader and energy relay, a distributed operating system 150 acts as software controller for managing the energy tiles resources, sensing and localizing the devices, enabling communications, message exchange, and shaping the power, one or more user-supplied or commercially obtained devices, reconfigurable multi-layer energy receivers that are interfaced with the devices to convert magnetic energy into electrical, and one or more remote energy edge node that may monitor, and manage energy tiles as remote part of software controller.

The energy tile leader may modulate the generated energy signals in terms of frequency, amplitude, and phase. This can enable overlaid data or control information over the energy flows, and may be used for implementation of integrated data communication and energy transfer between energy tiles and between tiles and the energy receivers.

Programmable power coupling can make the charging architecture highly flexible over any customizable area as all energy tiles can be reconfigured quickly and adaptively. It can decouple the power routing (power coupling) function of each energy tile from the wireless charger hardware, and manage the networked cognitive energy tiles in the software controller 150.

Customizable energy shapes can be created in 2D/surface and 3D through collaborative operation of cognitive energy tiles that charge at the same time one or multiple numbers and types of electronic devices equipped with energy receivers and within system charging and sensing ranges without need to change of wireless charging hardware.

The software controller 150 can configure the drive signals of each tile of the plurality of tiles, the drive signals being configured with respect to one or more of shape, duty-cycle, or power. configures the drive signals of each tile of the plurality of tiles, the drive signals being configured with respect to one or more of shape, duty-cycle, or power.

Modularity of cognitive energy tiles can enable charging coverage extension vertically and horizontally to power devices located over large surface and space simply by adding more energy relays, and plug and play system upgrade.

Each energy tile may include cubic shape architecture with re-configurable multi-layer vertical and horizontal coils at each tile's edge. Such design can enable the software controller to select, for each edge of an energy tile, the active coil layers, which in turns determines the distance, coverage, and amount of power coupling between two or more tiles.

The cognitive energy tiles can be placed in different vertical and horizontal arrangement such as horizontally under an existing surface (large or small), vertical and horizontally inside a box, desk drawer, shelfs, cabinet, etc.

Software Controller (Operating System)

Figure 15:
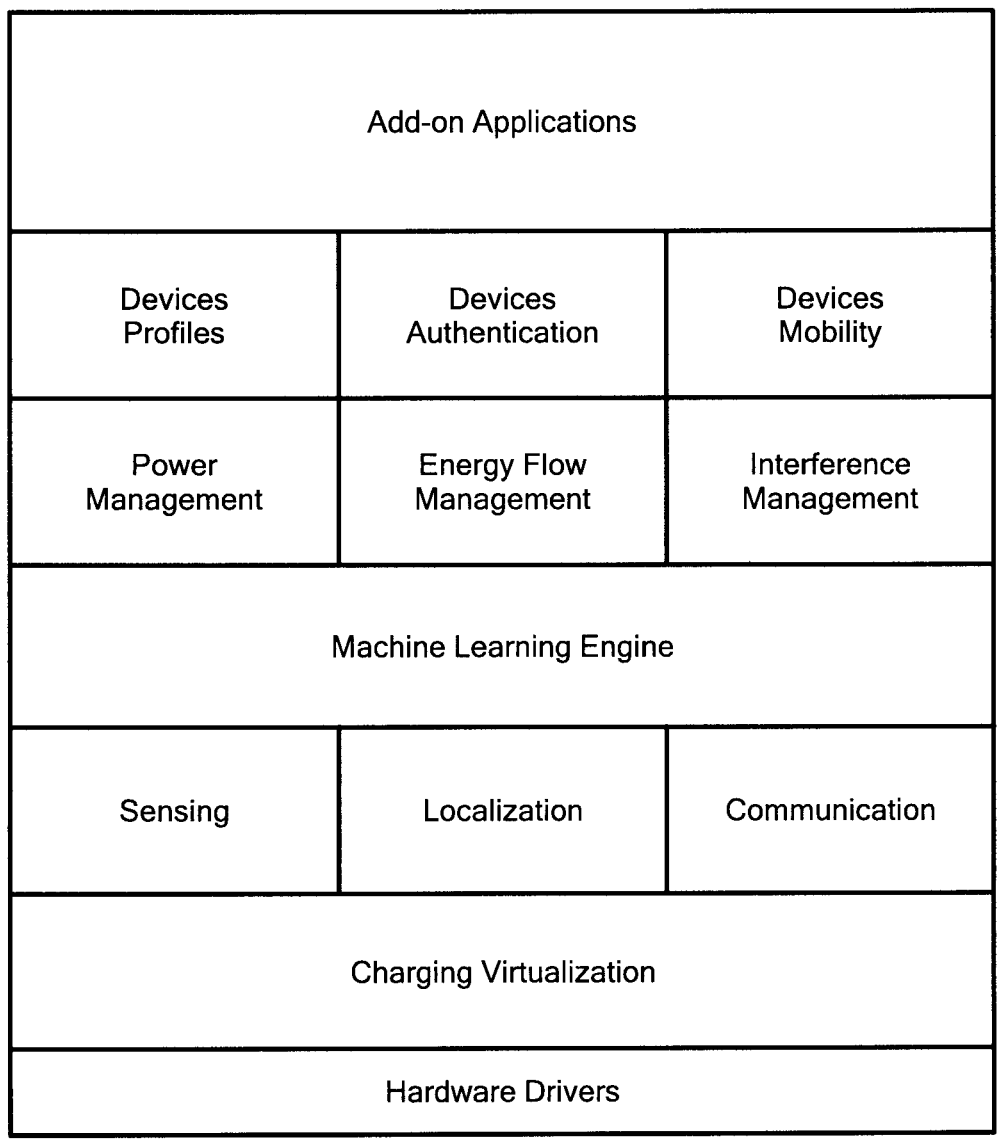
FIG. 15 depicts an overview of main modules of the proposed software-defined and networked wireless charging architecture.

FIG. 15 depicts the modules of the software controller 150, or operating system, which are from bottom to top as: hardware drives 152, charging virtualization 154, sensing 156, localization 158, communication 160, machine learning engine 162, power management 164, interference management 166, energy flow management 168, devices profiles 170, devices authentication 172, devices mobility 174, and applications 176 such as diagnosis analysis, real-time safety check, dashboard and notifications, usages profiling, etc.

Figure 16:
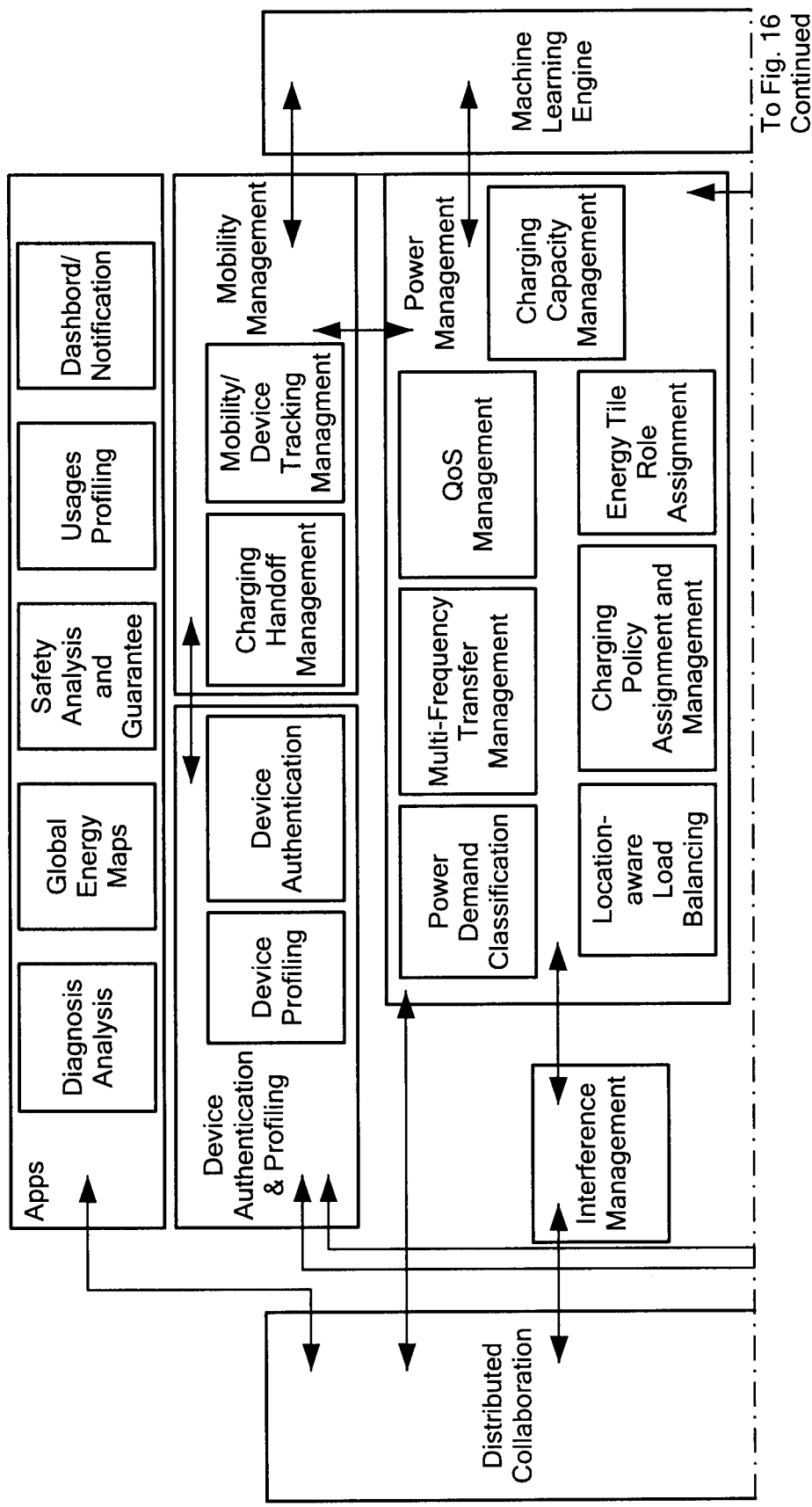
FIG. 16 shows an overview of the functional and architectural blocks for software-defined wireless charging and their interconnectedness.
Figure 16:
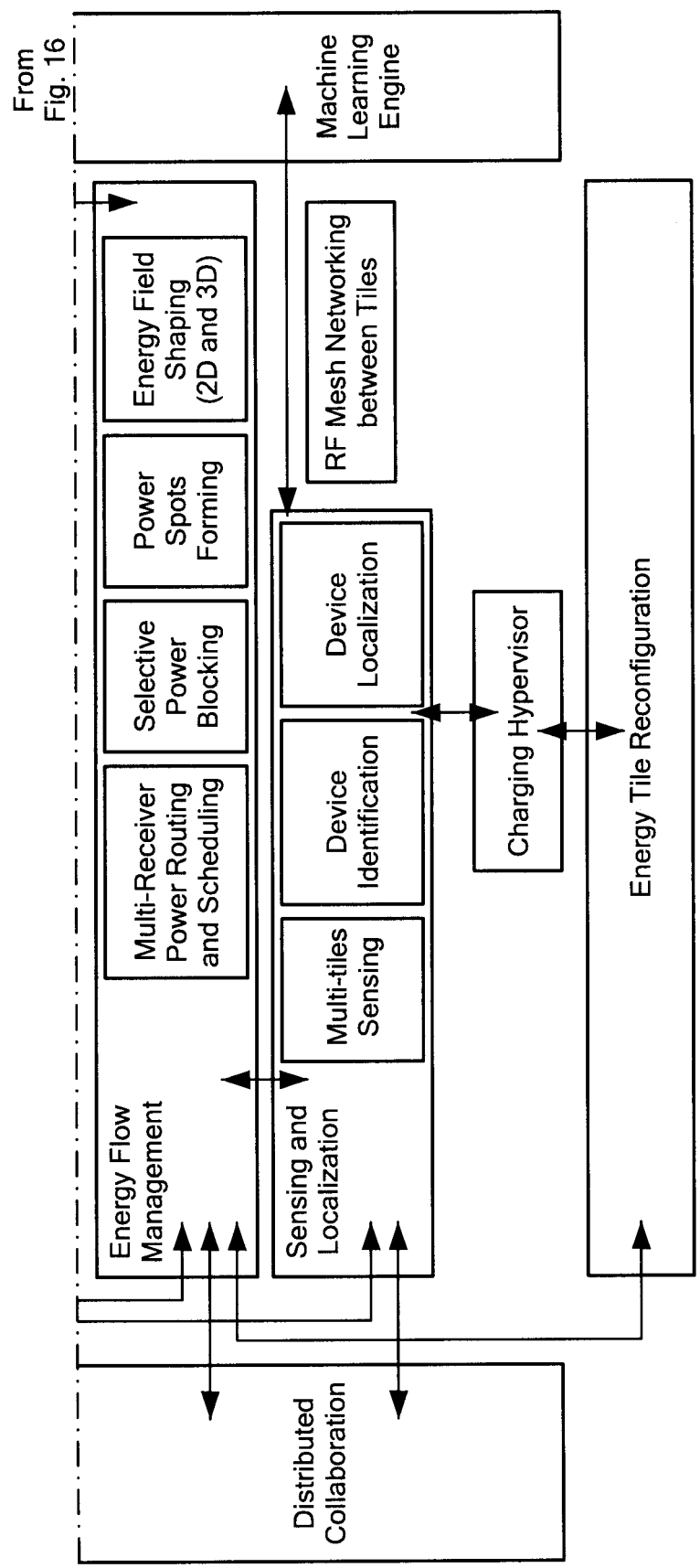

FIG. 16 shows functional and architectural blocks for software-defined wireless charging and their cross-module communication and collaboration. These blocks can include charging hypervisor, multi-tiles sensing, device identification, device localization, multi-receiver power routing and scheduling, selective power blocking, power spots forming, energy field shaping, location-aware load balancing, charging policy assignment and management, energy tile role assignment, QoS management, charging capacity management, multi-frequency transfer management, power demand classification, interference management, device polling, device authentication, charging handoff and management, mobility/device tracking and management, diagnosis analysis, global energy maps, safety analysis and guarantee, usage profiling, and dashboard/notification.

The modules and functionalities of software controller may be deployed fully or selectively on the energy tiles as well as remote energy edge nodes depend on their available resources. For example, the relay energy tiles may deploy partly charging virtualization, sensing and communications modules, while the leader tile/s run the full stack modules of operating system, and delegate some modules such as applications to remote energy edge nodes.

Hybrid models of resource management can be utilized whereby remote energy edge node and energy tile leaders will collaboratively and dynamically change the energy tiles 138 configurations, and run control plane functionalities.

Each energy tile with role leader can have its power connected to an AC socket, while all relay tiles have no connection to AC power. Here, the only sources of power are power amplifiers connected to leader tiles, and the rest of tiles forward the power through software-defined coupling and power routing.

The technology can create a distributed multi-hop charging architecture, dynamic energy network, and support diverse types of devices with different power requirement rates.

The cognitive energy tiles can collaboratively detect and localize all electronic devices within their sensing coverage area, shape the energy field, and route the power toward determined receiver devices, which when used in conjunction with power receivers to charge the electrical devices.

The cognitive energy tiles 138 can create a wireless mesh network with other energy tiles to exchange the control messages, and updates in a broadcast or multihop manner.

Cognitive energy tiles 138 can be reprogrammed on-the-fly by dynamically associating with different configurations, network resources, and charging algorithms.

The energy may be shaped and routed through introduction of software-defined wireless charging network architecture through introduction of software-defined power routing and energy flows, where a software controller/distributed operating system defines the configuration, behavior, and charging operation including power routing and shape of energy field of the system.

The leader tile may execute energy flow path finding algorithm through software controller that decides the intermediate relay tiles that should participate in the energy routing path. The energy path connects the tiles over which the charging devices exist.

The "energy flow management" module 166 may identify the tiles that should block all energy flow over it, and communicated over the control plane by the main leader to all the relay tiles.

The "sensing" module 156 in the software controller 150 can implement the distributed multi-tiles resonance sensing approach. A dual-coil sensing architecture per energy tile can be utilized to detect and sense the devices without any direct feedback. Here, there are two nested coils, with AC voltage applied to the inner coil and variations in the induced voltage are then measured across the load in the outer coil.

The technology can account for the tradeoff in sensing coverage with power consumption. This is because larger coils cover more of the area, but incur higher power consumption. Smaller coils consume less power, but many more of them must be used for similar sensing coverage. The sensing goal is to detect an object over distance.

In the dual-coil architecture for contactless sensing, the outer coil can act a resonator relay that sets up a magnetic flux generated by the induced voltage in it, with very little loss compared to directly applying the AC signal to it. When a target object (such as cell phone, laptop, tablet, or UAV) comes close to the surface, the induced voltage in the outer coil changes. These objects, owing to the different levels of component conductive materials, unique alter the induced voltage.

The "localization" module 158 in the software controller 150 may implement "distributed and collaborative multi-tiles device localization" to determine the location of detected devices. Toward this, it may integrate multiple streams of real-time sensing information obtained from "sensing" module. Here, the software controller 150 can combine all per tile sensing information and create a real-time global sensing map to detect the devices, their sizes, shapes, locations, and to track them over all charging area.

The energy shaping algorithm may execute by the software controller and shapes the energy over the charging area that is covered by energy fields of all combined energy tiles, through real-time tile configuration adjustments such as impedance.

The energy shaping algorithm may find optimal energy flow paths (call active energy paths) that deliver power to the devices detected within the charging range, as well as selective energy blocking over all energy tiles that are not on the active energy flows.

The energy flows may create power spots over a large area to charge multiple electronic devices and null energy at other selected areas.

One or more energy flows may deliver power to multiple devices over their energy paths.

A multi-layer reconfigurable energy receiver design can be utilized where energy receiver has multi-layer of coils and based on receiver load, amount of required power, and location of device the specific number of active coils would be determined.

Interoperability can be enabled through support of multiple charging standards through software-defined reconfigurable hardware without need to change hardware, and cognitive energy tiles resources can be allocated based on type, number, and location of devices.

The software-defined wireless charging architecture can enable support of new changes, standards, charging improvements through software upgrades.

Cognitive energy tiles may be equipped with multiple hardware frontends, e.g., different coils in one layer or at multiple layers, different amplifiers, different RF transceivers, to simultaneously support diverse charging standards and technologies, diverse sensing ranges and accuracies, and different control communication technologies. This can enable on-demand allocation of charging algorithms/protocols and resources in one or more energy tiles based on the types, location, and number of devices, and greatly facilitates the wireless charging interoperability, performance, and capacity. This called charging virtualization, and can be implemented in "virtualization" module of operation system/software controller.

The "charging virtualization" module 154 in the software controller 150 can enable running different charging algorithms/protocols, and sensing and communication schemes on the cognitive energy tiles and dynamically and remotely change depend on the receiver type and power needs without change of hardware.

The "charging virtualization" 154 can enable creation of multiple virtual power routing/charging networks, e.g., magnetic resonance laptop charging, magnetic resonance UAV charging, NFC wireless charging, resonance charging as-a service network, to share the same physical wireless chargers/energy tiles infrastructure. This may result in unequal resources allocation for multiple charging networks so that they can simultaneously share the same hardware.

The addition or removal of a charging service can be deployed on demand and dynamically allocated.

The "charging virtualization" 154 manages functionalities and software stack on running multiple charging standards as well as charging multiple types of devices with different power requirements using same reconfigurable and cognitive energy tiles hardware. This may result in creation of multiple energy flows at different frequencies or change of charging configurations over the time.

"Energy flow management" 166 may maximize total delivered power to devices as well as system charging capacity with optimal resource allocations. It may collaboratively determine the optimal active energy flows and the virtual charging networks with utilizing other modules in software controller including "power management", "interference management" 168 and "charging virtualization" 154. It can aim to satisfy the power requirements for all detected devices, given the number of devices, their locations, supported charging protocol/standard per device's energy receiver while minimizing the resource blocks (e.g. total transmitted power, and duration of charging), in the system.

Real-time detection of device type along charging standard, and power requirements classification of devices can enable the categorization of the energy flows into different QoS classes and facilitate differentiated resource provisioning, service-based pricing, and infrastructure as service implementation.

The "energy flow management" module 166 allocates a QoS class to each active energy flow based (i) detected devices profiles including current locations, types, and numbers of devices as well as historical learned device charging patterns that may be obtained from the "devices profiles" 170 and the "machine learning engine" 162 modules.

The software-defined architecture can enable separate wireless charging functionalities from hardware infrastructure.

The software-defined architecture can enable real-time remote management and monitoring of charging operation over surface and 3D area, and improve resource utilization.

The wireless charging and sensing operations, configurations, and algorithms can be implemented in software and thus can be dynamically changed accordingly to the number, type, and location of devices.

The software-defined wireless charging architecture simplifies system management, can reduce deployment cost, and enable real-time and fast system adaptation to any changes in terms of location of devices, number of devices, and environment.

The technology can operate at multi-frequency power transfer mode, where more than one energy tile 138 acts as leader and each leader operates at a different frequency resulting in increase on (i) total charging power capacity, (ii) number of parallel charging devices, and (ii) efficiency of interference management.

Charging frequencies can be re-used to increase system charging capacity.

Software-defined wireless charging architecture can include multiple features such as on-demand reconfigurability, charging virtualization that can enable support of multi-standards, large area charging capability, and multiple-device charging support can realize deployment of wireless chargers as a service on different infrastructures such as furniture (tables, desks), walls, and objects, rather than just a hardware.

The technology may tend to maximize the charging capacity for large area and multi-device charging. The software controller 150 has the collective information from all networked coils that sense and cover the charging area. By considering this network-wide information the energy shaping and power routing algorithms may consider all possible power routing decisions over the large area and greatly maximize the multi-device charging capacity and minimize the power interference. Additionally, the software controller 150 can jointly allocate resources such as frequency, algorithm, and energy tiles configurations to achieve optimal network-wide large-area system performance. In addition, this network-wide information enables fast failure recovery, real-time power re-routing, and seamless mobility management.

The "machine learning engine" module 162 in the software controller 150 can enable applying/running machine learning powered algorithms for different objectives such as device sensing, detection, localization, and tracking as well as charging resource management including finding optimal energy paths, power management and balancing, interference management, and device authentication. The machine learning engine module 162 can be trained to determine the location of the device, and a corresponding device type of the device from a plurality of device types based on the plurality of sense voltages.

The software controller can reduce power transmission by at least one transmitter in at least one path by tuning the impedance of such transmitter. Power transmission by at least one transmitter in at least one path can be canceled by configuring at least one transmitter of the array of transmitters to reflect a power signal from the master transmitter back along said at least one power path. The controller can also establish a revised path in response to a change of device position of a device from an initial device position to a subsequent device position.

The "machine learning engine" 162 module can enable modeling and learning of device and user charging behaviors and patterns such that those learnings may optimize the energy consumption of the system, improve the sensing and localization accuracy along the responsiveness (reduce delay) of device detection and charging.

"Energy flow management" module 166 in the software controller 150 can manage resource-efficient creation of energy flows to charge multiple devices over the sensing/charging areas. The functionalities of this module include efficient and optimal power routing, selective power blocking, and creating energy spots.

The "power management" module 164 in the software controller 150 can maximize the charging capacity in terms of allocating charging frequencies, budgeting the required power and other QoS performance metrics for each detected device and per energy flow, classifying the power demands requirement, and implements device and location-aware load balancing between energy tiles.

The "interference management" module 168 in the software controller 150 can minimize different types of interference "between energy tiles", "energy tiles and devices that being charged", "energy tiles and humans". This module may operate closely with the "power management" module 164.

The "devices profiles" 170 module in the software controller 150 may create and manage specific profiles for each detected device with diverse fields such as device type, size, ID, required power, charging patterns/history, and current and previous locations of devices within the sensing area that are obtained from the "localization" module 158, and provide them to the "devices mobility" 174 and the "devices authentication" modules 172.

The "devices authentication" module 172 in the software controller 150 may mange the initial negotiation and authentication of a detected device on the sensing area before any charging starts, and accordingly initiate/update a charging policy for each device. This can enable to define different permission policies, limits and constraints, and QoS per device. Additionally, this can facilitate deployment and use of software-defined charging as a service in private and public infrastructures.

The "devices mobility" module 174 can have functionalities such as: (i) tracking active energy flows that charge each device, and (ii) re-route the energy flows when a device moves from one location to other location within in the sensing/charging area. This module may work with the "localization" module 158 to get the current and previous locations of detected devices, and the "energy flow management" module 166 to get the active energy flows, and facilitate the re-routing energy flows. Additionally, this module may utilize and combine cross-layer information from the "machine learning engine" 162, the "devices profiles" 170, the "devices authentication" 172, and the "sensing" modules 156 to improve accuracy and responsiveness of tracking.

The "devices mobility" module 174 in the software controller 150 can provide the mobility pattern, new location and predicted locations of a mobile device to the "energy flow management" module 166, and accordingly the active energy flows and energy paths might change by re-configuring the energy tiles.

The "devices mobility" module 174 may utilize the global information in software controller to achieve global re-routing optimization over all devices within charging area when one or more devices move from one location to other locations. It may optimize re-routing of energy flows to achieve per-energy flow QoS guarantees along seamless and continues charging of each device.

Additionally, the predictive devices usages obtained from the "devices profiles" 170 along mobility predictions may be helpful for re-routing optimization.

The software controller 150 may have applications layer in form of add-on software that enable additional monitoring, management, maintenance, and optimization tools, based on use case scenarios. These add-ons software 176 may install on edge energy node or on other remote monitoring/management interfaces such as mobile, tablet, or web.

The add-on application 176 may include "diagnosis analysis" to record, monitor, and analysis issues such as operational faults, over heat, high initialization delays, control and communication messages lost, low charging speeds, and localization errors.

The software controller add-on application 176 may include"real time safety check" that continuously analyzes location of devices, active energy flows, and makes sure the intensity of magnetic and electric fields are not passing the safety regulations, and may suggest specific energy blocking areas to "energy flow management" module 166.

The software controller add-on application 176 may include "dashboard and notifications" that present real-time system statistics in terms of charging performance, active energy flows, active energy map, as well as statistics of detected devices. Additionally, this module can be used as an inference for user interactions to configure and manage system parameters, and give feedback.

The software controller add-on application 176 may include "usages profiling" that record and learn the usage patterns including common detected locations of charging, common charging requirements and types of devices, and common mobility patterns.

Figure 17:
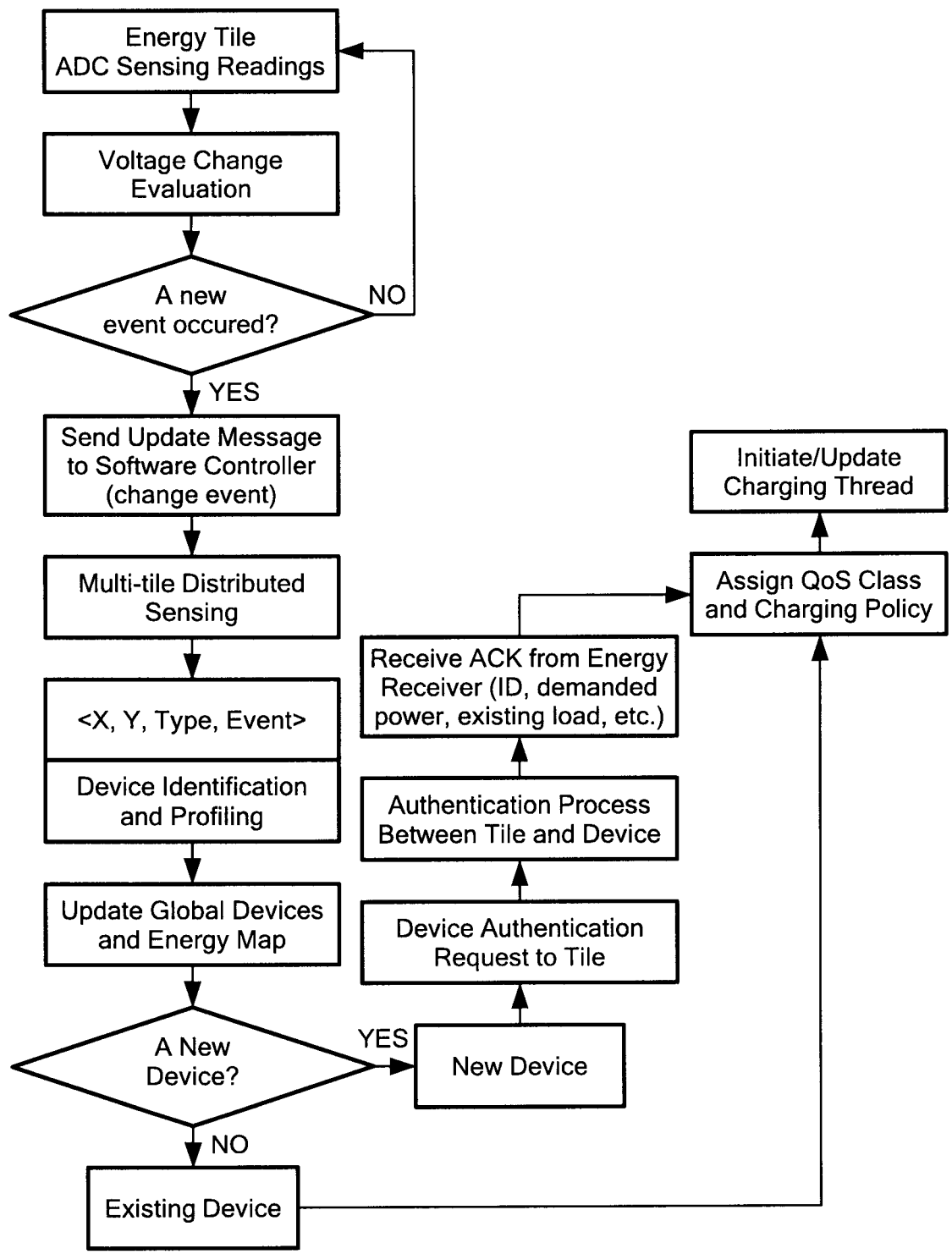
FIG. 17 illustrates wireless charging thread initialization and re-configuration process.
Figure 18:
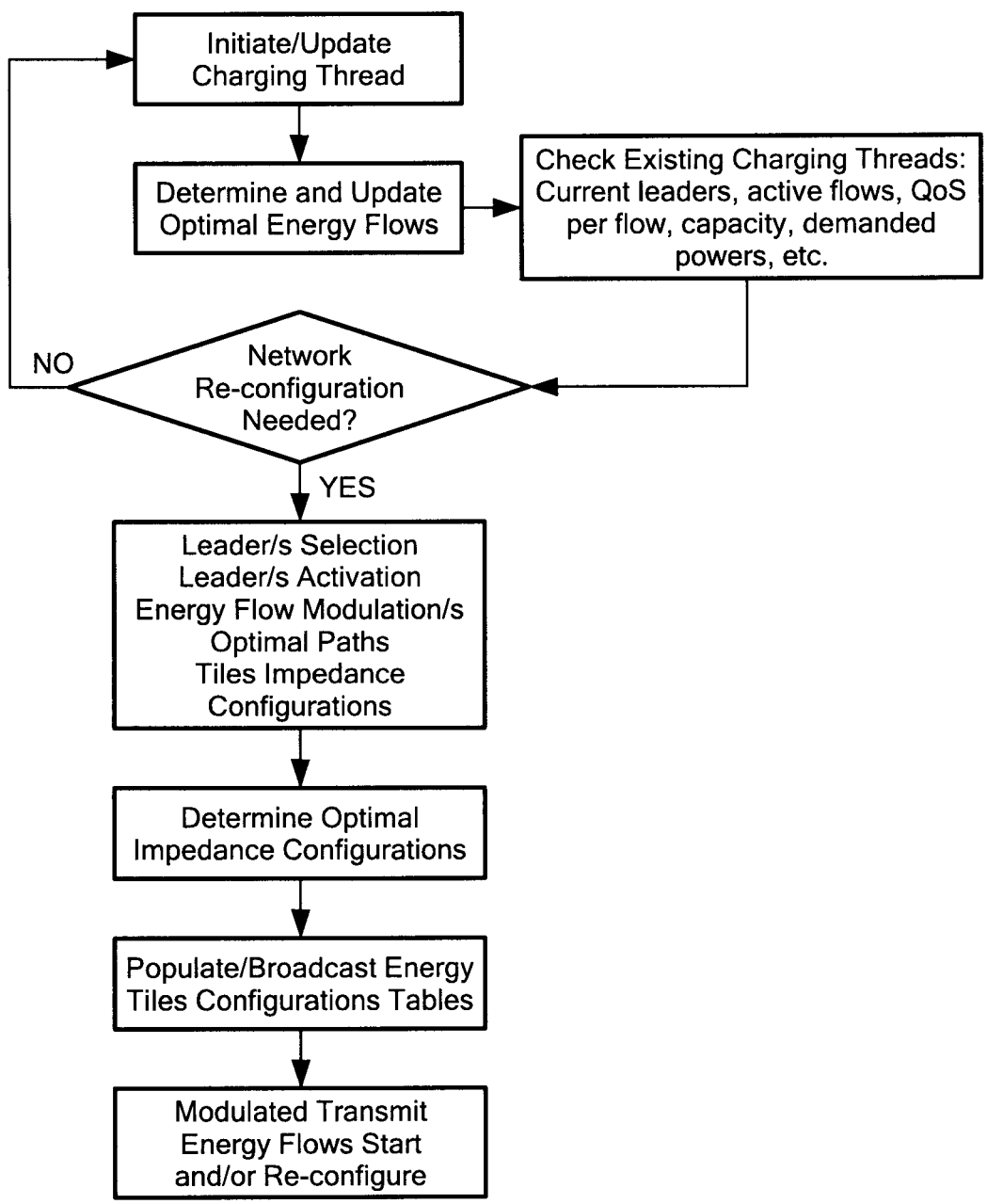
FIG. 18 illustrates software-defined energy flows re-configuration process.

As shown in FIG. 17 and FIG. 18, the method for software-defined wireless charging can include: (i) The leader energy tile initiates the setup control messages to create a mesh network and the relay energy tiles may join this network. In the case of multiple leaders one leader can be selected through the leader selection algorithm to create the mesh network, and track/manage other tiles. (ii) Each energy tile can continuously sense any device/object in its sensing range through a low-power out-of-band resonance sensing approach, and upon detection of a new device, detection of device moving, and removal of an existing device send the update messages through software controller. The global information of all cognitive energy tiles together can enable software controller to perform area sensing, device localization, device identification, and device tracking accurately and with low-power. (iii) Upon any changes in each tile's sensing area such as addition, removal, movement of a new device software controller can determine one or multi optimal energy flows based on power requirement and location of devices, to maximize the capacity and efficiency of wireless charging. (iv) Based on determined energy flows software controller can find the configurations of all active energy tiles and configure them remotely though update control messages, to shape energy field and route the power toward the devices. (v) The reconfigurable multi-layer energy receiver attached to device may monitor the load of the device and select energy receiver coil layers to adjust the received power on real-time to the load, protect from over-voltage, and avoid the impedance mismatch.

Figure 19:
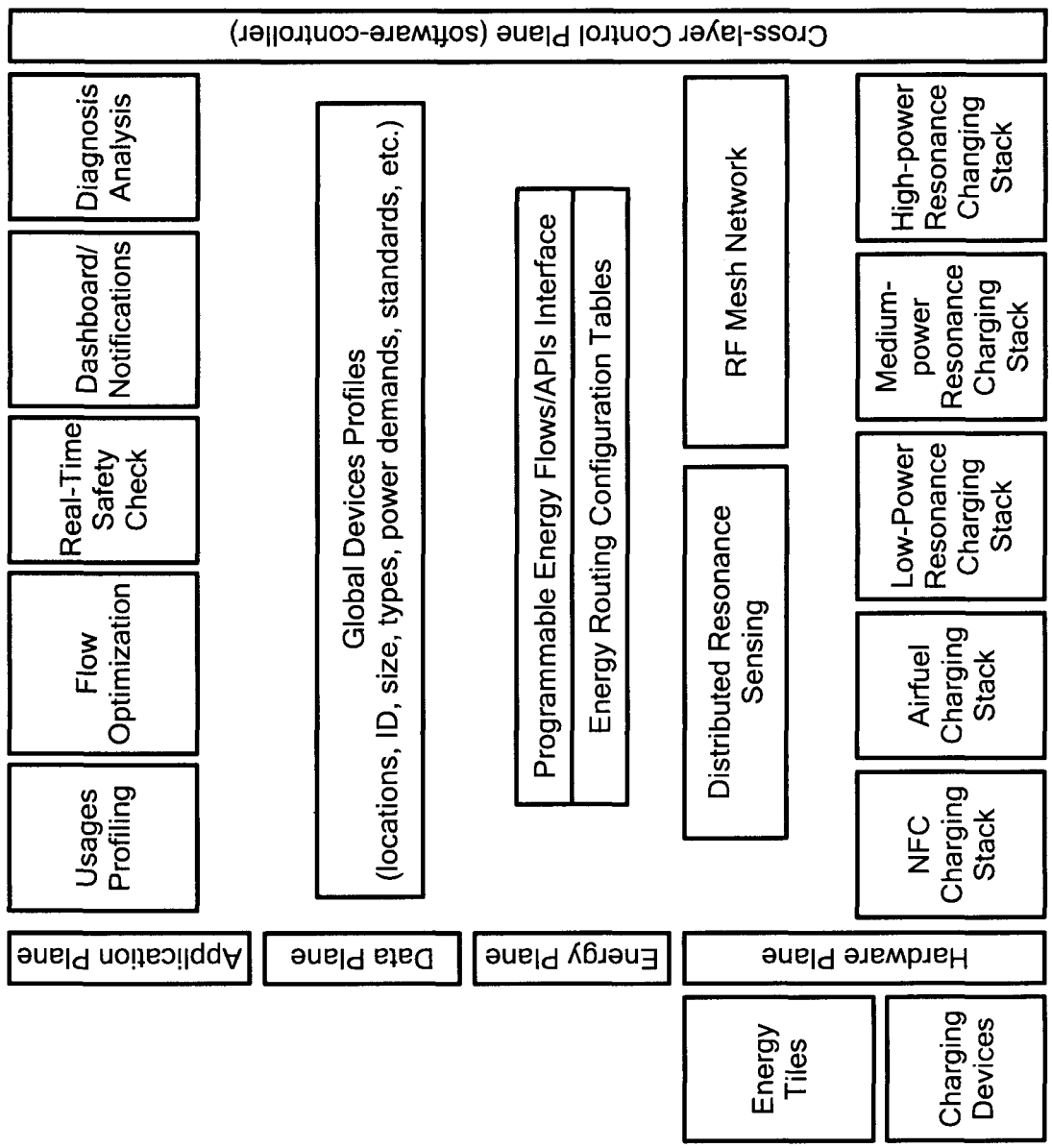
FIG. 19 shows overview of five operational planes and their components for the proposed system.

FIG. 19 shows the architectural planes 180 which include: application plane 182, energy plane 184, data plane 186, control plane 188, and hardware plane 190.

The energy plane can include "programmable energy flows" that could charge devices and be customized, forwarded, shaped through software controller.

The data plane can include an "energy tile configuration table" 192 that may contain configurations such as current impedance of the tile, active charging protocol of the tile, location of detected devices, and required power per device.

The control plane can include "communication and control channels" as well as "distributed operating system (software controller)" with functionalities such as networked coils management, charging virtualization in forms of "software charging" that may implement different wireless charging protocols/standards, power management, and energy load optimization tools.

The hardware plane can include all hardware components that include sensing coils, charging coils, amplifier, cognitive energy tiles mainboards, and energy receiver hardware.

The separation of energy, data, control, and hardware planes can enable sensing, charging, networking functionalities and algorithms, power management, and new applications to be easily, continuously, and independently upgraded without the need of costly changes of hardware.

The technology can have in-band energy channels, out-band sensing channels, and out-band control channels. In-band energy channels may be utilized for transfer of magnetic resonance-based power, out-band sensing channel may be utilized for sensing and tracking objects/devices over the distance, and out-band control channels may be utilized for exchanging control messages between cognitive energy tiles 138 and between energy tiles 138 and minoring devices.

Cooperativeness through joint control and optimization of cognitive energy tiles can be enabled to enhance the charging effectiveness and capacity.

Each energy tile hardware can include a mainboard, dual active-passive sensing coils, and a charging coil. The mainboard of relay can include microcontroller, sensing/charging hypervisor, radio communication module, impedance adjustment circuit module, sensing circuit module, backscatter communication module, and mainboard of leader can have all components as relay with addition of an amplifier. Each individual energy tile can sense objects, route, block, shape, and share power, and communicate with other devices.

The software controller 150 can have the global information of location, types, number, and energy demands of all devices within the sensing range of the system. Utilizing this information, the software controller 150 can determine the most power-efficient energy flows in such a way that system charging capacity is maximized. This may result in maximizing the end-to-end transfer efficiency among all energy flows, minimizing the energy interference in the system, while satisfying per-energy flow QoS performance and delivering the required power per device.

In the following detailed description, reference is made to the accompanying drawings, which form a part hereof. The drawings are not to scale or to proportion and the illustrations described in the detailed description and claims are not meant to be limiting. Other aspects and features may be used and/or other changes may be made without departing from the spirit or scope of the technology.

Charging Surface

Figure 20:
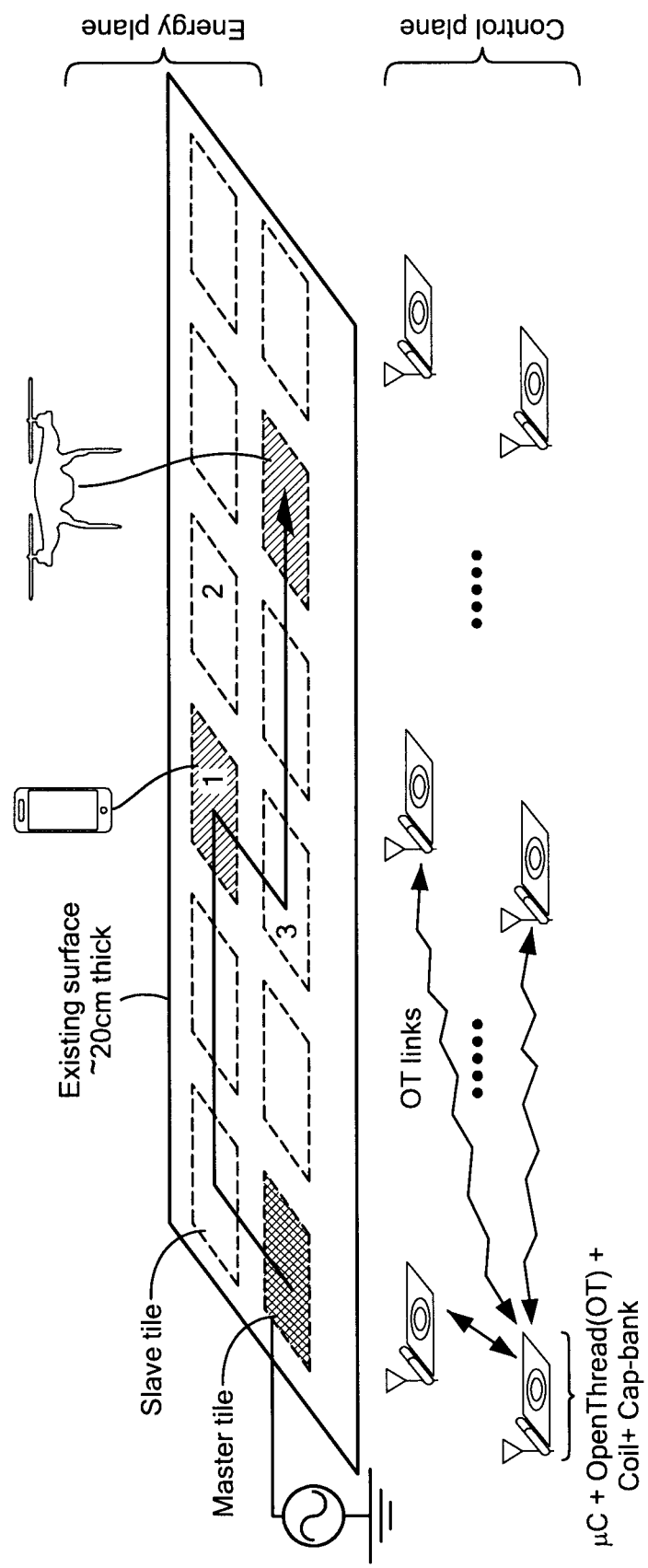
FIG. 20 illustrates a 2D example for energy tiles on the under-side of a given surface. Multiple number and types of devices, from UAVs to phones, can be charged through contact-less energy-on-demand device localization and adaptive energy hopping across tiles.

FIG. 20 shows an example of 2D energy tiles 138 that can be attached on the under-side of a given surface. Multiple number and types of devices, from UAVs to phones, can be charged through contact-less energy-on-demand device localization and adaptive energy routing across tiles. The technology can use magnetic resonance but limits the range of a given coil by placing a large number of them in two dimensions. A single coil, a wireless network interface connected to a low-power micro-controller, and a dual capacitor bank together compose a so-called energy tile. Only the leader or master tile has its own power amplifier and connected to an AC socket, while all other slave tiles have no connection to AC power. Reconfigurable energy tiles attach to the underside of the table surface, and form a wireless mesh network control plane. This allows the tiles to perform coordinated sensing and deliver energy in a cooperative manner anywhere around the table surface in the energy plane. The software defined framework that executes in the leader tile allows localization of the object to the closest tile, detect the type of object, and then deliver energy to that specific tile (or multiple tiles in case of more than one object) through the concept of energy hopping/routing over tiles. Since all relay tiles are passive in the sense that they lack power amplifiers, this modular design and energy distribution method is easily extensible to any surface area.

Two Coil Architecture

Figure 21B:
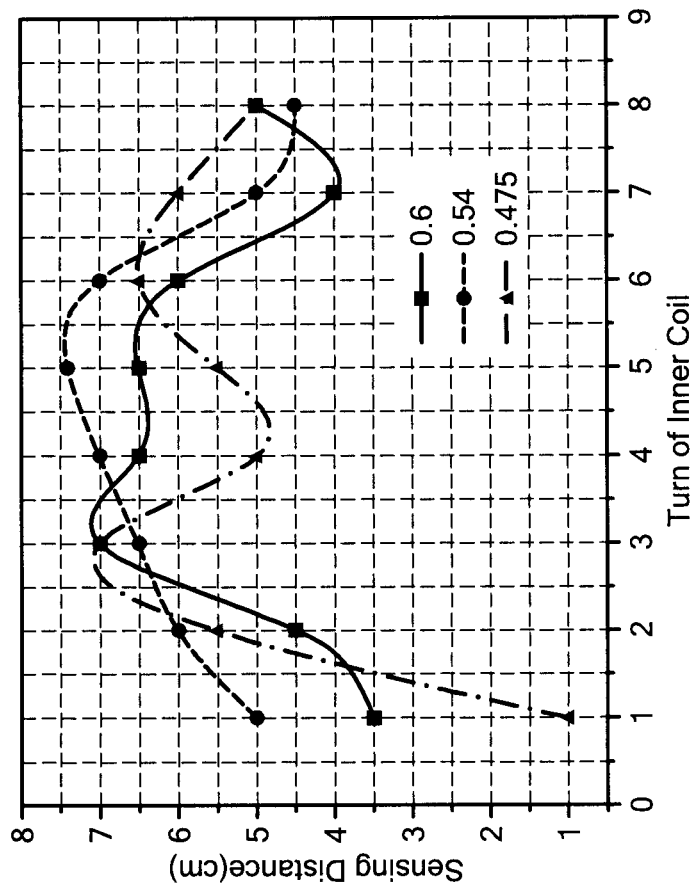
FIG. 21 shows (a) the layout of a nested dual-coil magnetic resonance sensing architecture, and (b) the results of sensing an iPhone 8 with different turns and ratios between outer and inner coils.
Figure 21A:
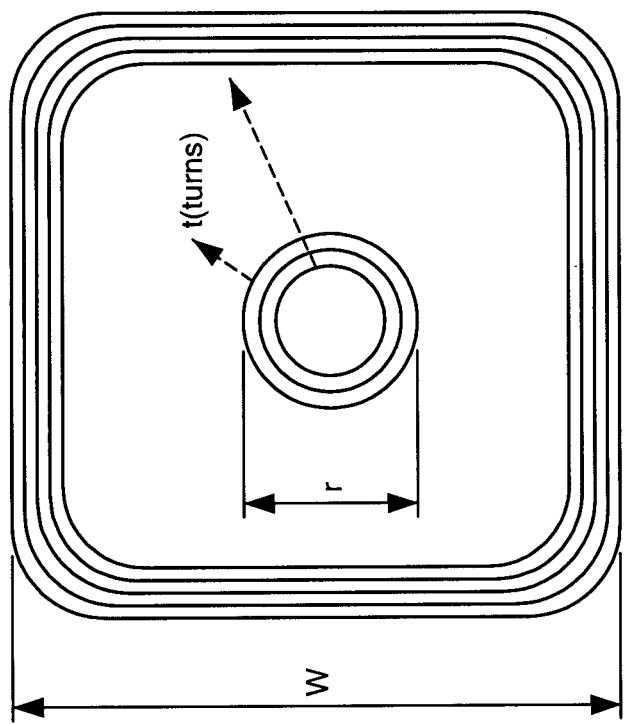

FIG. 21a depicts the layout of a proposed nested magnetic resonance sensing architecture, where W is the width of outer coil 104, r is the radius of the inner coil 102, and t gives the number of turns for the inner coil 102. The main idea here is to use two coils, with AC voltage applied to the inner coil 102 and variations in the induced voltage are then measured across the load in the outer coil 104. The design accounts for the tradeoff in sensing coverage with power consumption. This is because larger coils cover more of the surface, but incur higher power consumption. Smaller coils consume less power, but many more of them must be used for similar sensing coverage. The sensing goal is to detect an object and its type up to a range of several above the surface.

This sensing method uses an AC voltage signal applied to the inner coil 102 in the KHz range (out-of-band sensing). There are two reasons for this: First, the detecting signal variations in the passive outer coil is much simpler, as compared to variations in a MHz-band signal (energy transfer band). The results indicated 65% accuracy improvement using the similar coil dimensions with 16-bit ADCs as a result of this design choice. Another reason for using KHz range sensing is to overcome the skin effect. In this dual-coil arrangement, the outer coil 104 acts a resonator relay, that sets up a magnetic flux generated by the induced voltage within the outer coil 104, with very little loss compared to directly applying the AC signal to the coil. When a target object (such as cell phone, laptop, tablet, and UAV) comes close to the surface, the induced voltage in the outer coil changes. These objects, owing to the different levels of component conductive materials, unique alter the induced voltage. This change, |ΔV|, is measured at the outer coil 104. At this stage, the signal is noisy and depends on multiple properties of the object, such as size, shape, materials, magnetic permeability, electrical conductivity. It also depends on the overlapping area and the distance between the object and the outer coil.

The layout and material of sensing coil 100 impact the performance of sensing, both in terms of sensitivity and range. Consider the sensing range as the threshold point at which the induced voltage JAVI falls below 50 mV. FIG. 21*b* depicts the results of sensing an iPhone 8 with different turns and ratios between outer and inner coils, marked as 0.6, 0.54, 0.475. For e.g., it can be experimentally observed that the phone average sensing range is 7 cm a function of the number of turns of inner coil. The three lines in the plot correspond to different k=r/w ratios. From these measurements, 6 turns can be selected for the inner coil as it shows a peak for multiple k values. Note 3 turns is also an acceptable value, although the instantaneous variations are much higher than the more stable results at 6 turns.

Tile Interaction

Figure 22:
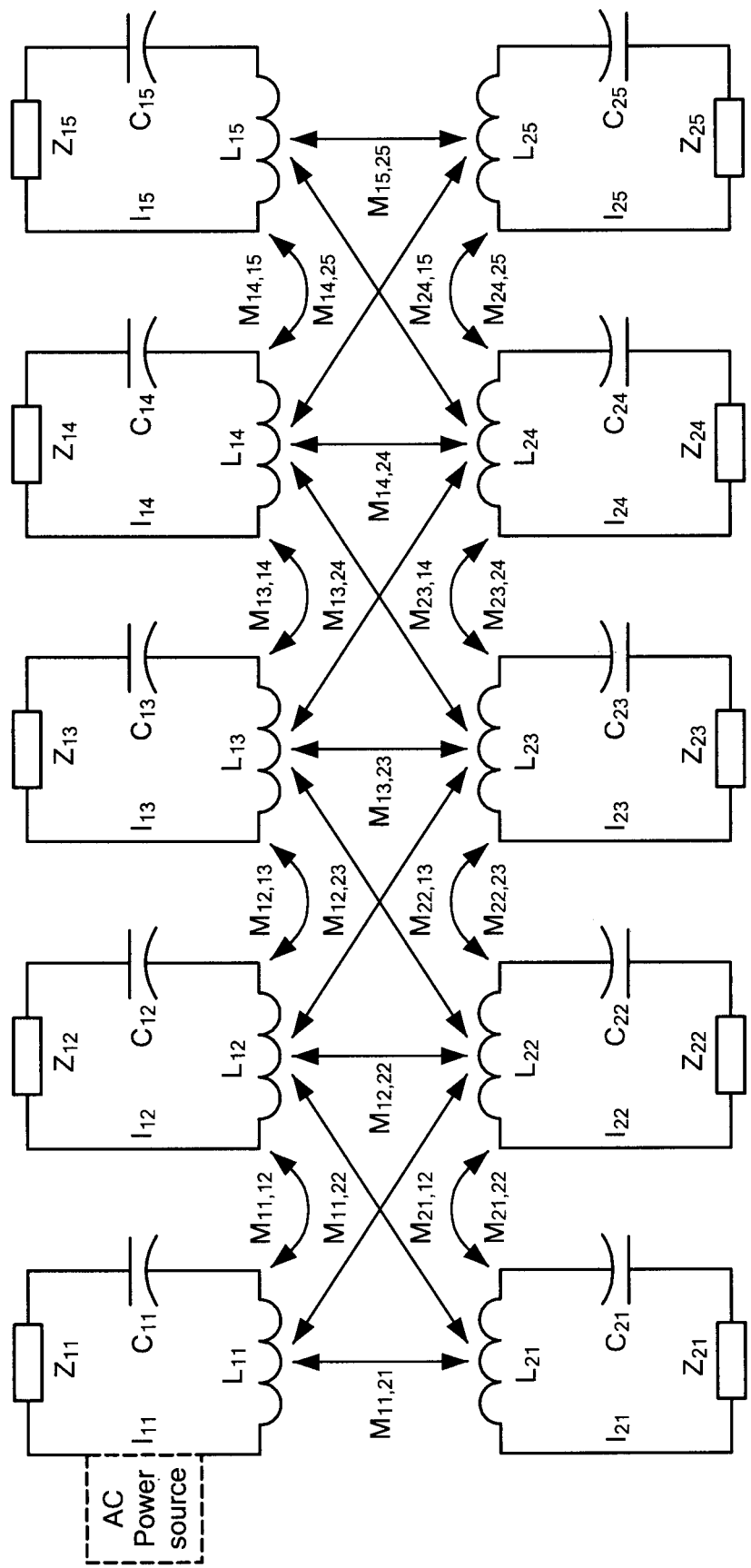
FIG. 22 illustrates an example of circuit diagram for a set of energy tiles placed over a 2D surface.

FIG. 22 shows an example of circuit diagram for a set of energy tiles placed over a 2D surface. As shown, each energy tile may have four strong mutual couplings with its neighboring tiles, and coupling between diagonal tiles may be close to zero due to weak magnetic field overlap among them. L, C, Z, and I with subscription i'k' denote the inductance, capacitance, impedance and current of tile located at i'th row k'th column. M with different subscription represents the mutual inductance between two tiles, and all the M would be same in the paper with assumption that all tile is same in the 2-D surface or the tile chain. M represents four mutual inductances between a generic tile and its two vertical neighbors and two horizontal neighbors. Leader tile only has vertical neighbor and one horizontal neighbor mutual inductance $M_{11,12}$ and $M_{11,21}$. The leader tile in FIG. 22 that is connected to AC power source Vs has the following relationships:

$$V_S = I_{11}\left(j\omega L_{11} + \frac{1}{j\omega C_{11}} + Z_{11}\right) - j\omega M_{11,21}I_{21} - j\omega M_{11,12}I_{12}$$

where w is angular frequency, and for the rest of the resonant relay tiles (i',j') in the 2-D surface, 1<=i'<=i and 1<=k'<=k:

$$I_{i'j'}\left(j\omega L_{i'j'} + \frac{1}{j\omega C_{i'j'}} + Z_{i'j'}\right) + j\omega M_{i'j'} = 0$$

where M at tile (i',j') has:

$$M = M_{ij',i'-1j'}I_{i'-1j'} + M_{ij',ij'-1}I_{ij'-1} + M_{ij',ij'+1}I_{ij'} + M_{ij',i'+1j'}I_{i'+1j'}$$

The technology tends to optimize the wireless power transfer to multiple devices on/over the 2-D surface by selectively providing received power at the detected devices while limiting the total transmitted power of the system and mitigating total hopping power loss.

The total transmit power of the amplifier in the leader tiles can be adjusted based on total load of receivers and the number of active tiles. Accordingly, the total transmit power minimization may reduce to minimizing the number of active energy tiles. The active energy tiles can be controlled by choosing the shortest paths, in terms of number of paths and total hops, from source to detected receivers as well as by blocking the energy over tiles that are not part of the active paths.

Some of the challenges regarding the charging capacity and QoS optimization can be deconstructed as (i) how to find optimal energy paths, called active paths, from source to multiple destinations, (ii) how to remove the reflections within each energy flow path to maximize the received power, and (iii) how to block power for energy tiles on other paths that are not part of active paths.

The problem of optimal energy paths (one or more) determination may be formulated as finding the shortest path from one or more leader tiles to detected receivers.

Given active energy paths, P={P1,P2, . . . } and energy tiles Ta={T1,T2, . . . } in each active path Pa, the received power for case of 2D surface may be maximized for the receivers when the impedance of energy tiles in Pa would be set to Ca=C+ΔCa, where $\Delta Ca = U/(\omega^2)M$.

Proof:

The maximized received power for all receivers located on P can be formulated as:

$$P(\text{Max})_{R-2D} = \frac{\omega^2 M_{RT}^2 |I_{TP}|^2}{R_L}$$

where ITP is current matrix of energy tiles in P that are directly located over the receivers, $R_L$ is a diagonal matrix with entries as the resistance of device receivers, and $M_{RT}$ is the mutual inductance between receivers and energy tiles. Given that the distance between tiles and physical characteristics of coils (thus $M_{RT}$ and ω) would stay the same, the maximization of received power translates into maximizing the currents of the energy tiles. Current distribution either in horizontal or vertical chain of tile is a function of $\rho_T$ and since the reflection coefficient $\rho_T$ is always a negative number, the total current maximization happens when $\rho_T$ for all tiles in the active path becomes zero and thus power reflections on P are eliminated. To be simple $\rho_T$ is used to represent all the reflection of row or column instead of $\rho^h_T$ or $\rho^v_T$ in 2-D surface. The reflection coefficient can be written as a function of impedance change ΔZ as follows:

$$\rho_T(\Delta Z) = \frac{H^2 - (Z + He^{j\gamma d})(Z + \Delta Z)}{(Z + He^{-j\gamma d})(Z + \Delta Z) - H^2}$$

Here H=jωM, d is the distance between neighboring tiles, γ is the propagation constant (equal to 2π/λ and λ is resonating AC power source wavelength). Rearranging the above equation provides:

$$\Delta Z(\rho_T) = \frac{(H^2)(1+\rho_T)}{Z(1+\rho_T)+H(\rho_T e^{-j\gamma d}+e^{j\gamma d})} - Z$$

In a wireless charging system, for each intermediate resonating coil with high quality factor and efficiency, the coil's impedance Z is very small and is approximated as zero (Z=0) and the required impedance change to remove the reflections for $\rho_T$=0 could be found as:

$$\Delta Z(\rho_T) = He^{-j\gamma d} = j\omega M e^{-j\gamma d}$$

Since at resonant state, the working frequency is equal to the resonate frequency of each tile, and with the case that the mutual coupling happens in the sub-wavelength, then $e^{-j\gamma d} = -1$ and $\gamma d = \pi$ that results to the amplitude $\Delta Z(\rho_T)$ equal to $\omega M$ with imaginary phase angle as 90°.

The optimal impedance change and accordingly the capacitance change to maximize the current of an energy tile and maximize the received power would be derived as:

$$\Delta Z(\rho_T) = -j\omega M = \frac{1}{j\omega \Delta C_a}$$

$$\Delta C_a = \frac{1}{\omega^2 M}$$

Given active energy paths P={P1,P2, ... } and set A_T consists of all energy tiles in P, the received power would be blocked on each tile q, set as $T_q$={$T_1$, $T_2$, ... } that are in surface and not member of A_T, if its capacitance is set to $C_q = C + \Delta C_q$ for each tile in order to block the transmitted power at this tile, where:

$$\Delta C_q \geq \left| \frac{|I_q|^2 - \epsilon Z_q}{j\omega} \right|$$

Here tile p and tile q are the any pair of four neighbor tiles with strong coupling, so in the chain with tiles q and p, by using circuit theory, their current and voltage relationships can be expressed as follows:

$$V_p = I_p\left(j\omega L_p + \frac{1}{j\omega C_p} + Z_p\right) - j\omega M_{pq} I_q$$

$$I_q\left(j\omega L_q + \frac{1}{j\omega C_q} + Z_q\right) + j\omega M_{pq} I_p = 0$$

where $V_p$, $I_p$, $I_q$, $L_p$, $L_q$, $C_p$, $C_q$, $Z_p$, $Z_q$ and $Mp_q$ are the voltage, current, inductance, capacitance, impedance, and the mutual inductance between these two tiles. The power in the tile q with capacitance change $\Delta C_q$ would be:

$$P_q = |I_q|^2 \frac{1}{j\omega L_q + \frac{1}{j\omega C_q} + j\omega \Delta C_q + Z_q}$$

Here, the tile q is considered blocked when its delivered power becomes $\epsilon$, and by substituting $\epsilon$ into $P_q$, the minimum capacitance change required to block power is obtained as:

$$\Delta C_q = \left| \frac{|I_q|^2 - \epsilon Z_q}{j\omega} \right|$$

Any capacitance change that is bigger than $\Delta C_q$ would block the energy hopping through this coil.

Figure 23:
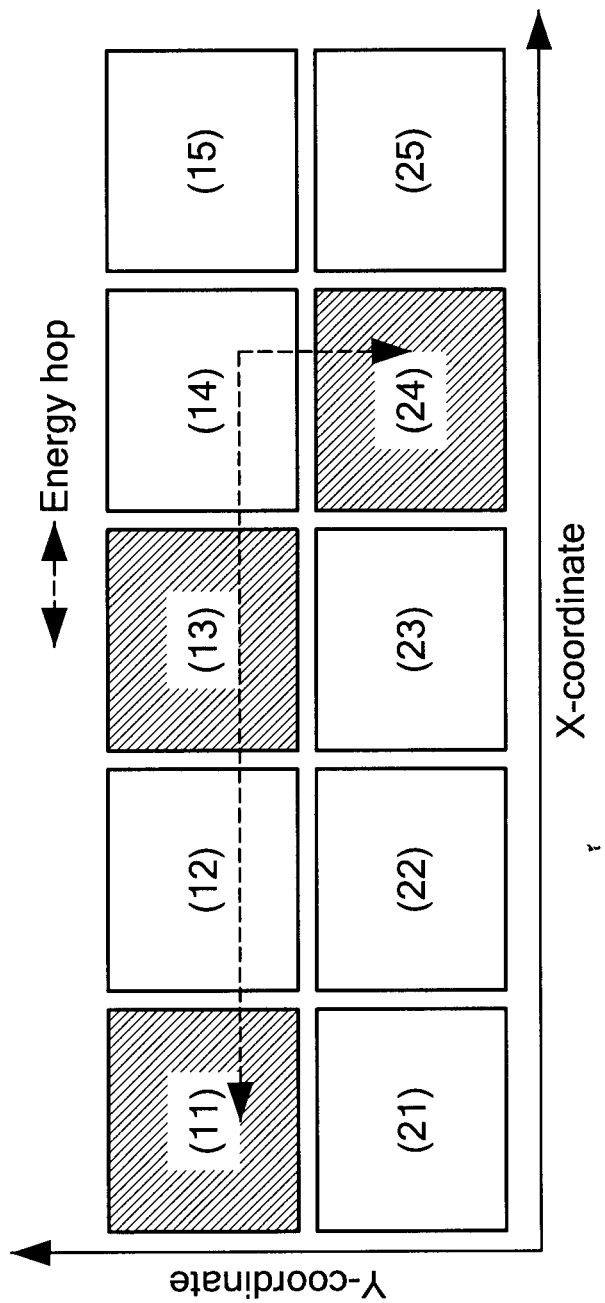
FIG. 23 illustrates an example use case involving programmable energy flows, energy nulling, and power blocking for ten tiles in two rows.

FIG. 23 depicts an overview of a sample use case involving programmable energy flow, energy nulling, and power blocking for ten tiles in two rows, with the tuple (i,j) representing the tile at ith row and kth column, respectively. (1,1) is the tile connected to the AC power source. The tiles in the set {(1,1),(1,2),(1,3),(1,4),(2, 4)} form the energy hopping path, although only {(1,1),(1,3),(2, 4)} can support charging devices placed on them. Of the remaining tiles, the set {(1, 5), (2, 1), (2,2), (2, 3), (2, 5)} are configured such that they do not spend energy by shaping the magnetic field above them, and thus, cannot charge a mobile device. This occurs through (i) MIwave reflection cancellation and (ii) energy blocking. In the case of energy blocking for tile (i,j), by adjusting the impedance of energy tiles the deliverable power over that tile would be below s. For example, energy tiles (1,5), (2,5), (2, 1), (2,2) and (2,3). In the case of wave reflection cancellation, the reflection of energy wave at the last energy tile of an energy flow path creates a negative energy flow that acts as a reflected power traveling on the opposite direction of the main energy flow and can cancel power over tiles within that energy flow path. For example, in FIG. 23, power at (1,2) and (1,4) have been fully canceled by the reflection of energy flow at tile (2,4). Additionally, the wave reflection cancellation may happen in the case of multiple concurrent active and partially overlapping energy flows in same frequency, where multiple reflections come each from reflection of wave at the last energy tile of an energy flow path. The summation of positive/main energy flows and negative energy flows (reflected flows) determine the amount of cancellation per energy tiles.

Multi-Layer Energy Receiver

Figure 24B:
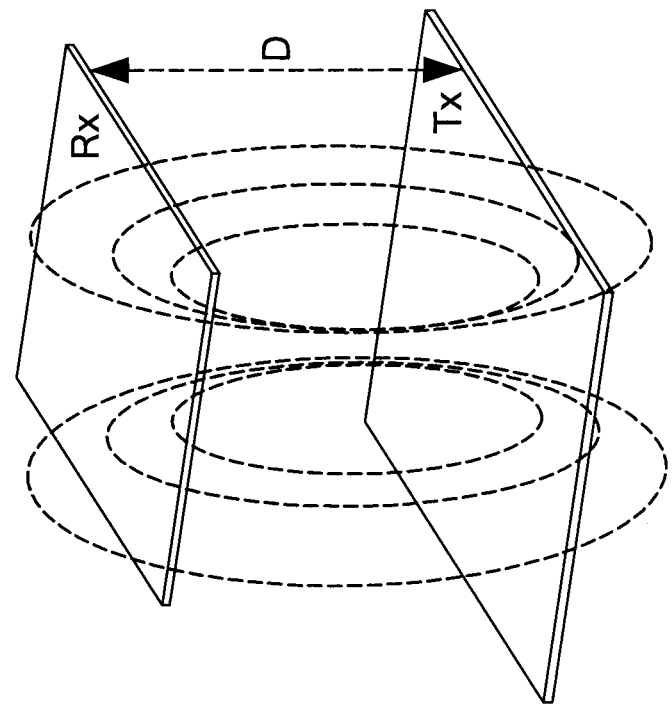
FIG. 24 illustrates (a) architecture of reconfigurable multi-layer energy receiver composed of multiple relay coils R1-R3; and (b) the receiver device (Rx) acts as final receiver load and the coil within the energy tile on the surface acts as power transmitter (Tx).
Figure 24A:
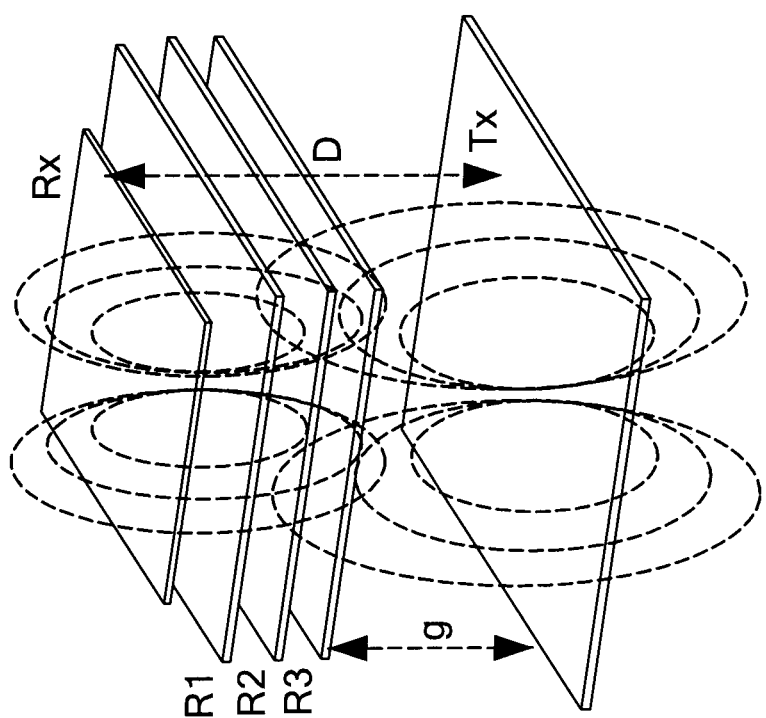

FIG. 24 shows the architecture of a reconfigurable multi-layer energy receiver may be utilized on some of the charging devices such as UAV. This architecture has multiple layers of coils, and specific number of coils may be excited depends upon the height of the receiver from the transmitter energy tile, its current load, and required/demanded power. Additionally, the multi-layer coils receiver is useful for situations where the power delivery should remain within bounds at all times, for e.g., depending on the type of the object/UAV, its battery capacity, and its aerial height, a specific relay coil (R1-R3) is activated. Each transmitter energy tile can have an array of sensing tiles. Each sensing tile can include one or more driven coils to produce magnetic signals in response to drive signals; one or more sense coils disposed to: (a) magnetically couple to the one or more driven coils to receive the magnetic signal produced by the driven coils, and (b) produce a sense voltage as a function of its proximity to the device.

The enhanced receiver design can include a single load receiver coil (Rx) and several multi-relay coils that are placed below it (R1-R3), where three coils are used in the example), as shown in FIG. 12. The separation between any two coils at the receiver side is dx, the direct transmitter coil (Tx) to Rx distance is D, and the Tx to resonate relay layer distance is g. Hence, D=g+dx.

In FIG. 24, the electro-magnetic relationship between the Tx and Rx, with an intermediate relay coil Rr can be expressed as:

$$V_{Tx} = I_{Tx}\left(j\omega L_{Tx} + \frac{1}{j\omega C_{Tx}} + Z_{Tx}\right) - j\omega M_{TxRx} I_{R_R}$$

$$I_{R_R}\left(j\omega L_{R_R} + \frac{1}{j\omega C_{R_R}} + Z_{R_R}\right) + j\omega M_{TxR_R} I_{Tx} + j\omega M_{RxR_R} I_{R_x} = 0$$

$$I_{R_x}\left(j\omega L_{R_x} + \frac{1}{j\omega C_{R_x}} + Z_{R_x} + R_{Load}\right) + j\omega M_{Rx} I_{R_R} = 0$$

where $L_{Tx}$, $C_{Tx}$, and $Z_{Tx}$ represent the voltage, inductance, capacitance, the impedance from energy tile Tx, respectively. $M_T$ $x_{R_R}$ gives the mutual inductance between Tx and a given receiver relay coil (from R1 to R3, in the present example). $L_{RR}$, $C_{R_R}$, and $Z_{R_R}$ are inductance, capacitance, impedance of that chosen relay coil, respectively. Similarly, $L_{R_x}$, $C_{R_x}$, $Z_{R_x}$, and $R_{Load}$ are inductance, capacitance, impedance and load resistance of final receiver coil. At resonance state, the effect of L and C cancel each other. Combining these equations, the power efficiency can be expressed as:

$$\eta = \frac{\left|\frac{j\omega M_{TxRx}}{M_{Rx}}\right|^2}{R_{Load} Z_{Tx}}$$

It can be observed that the power efficiency is only related to the mutual inductance between coils, which is a function of distance between coils. So, for a given receiver-relay coil arrangement, the power efficiency is expressed as $\psi_R = f(g, dx)$.

The size of transmitter and relay coils at the receiver may be the same, but the coil of energy receiver is smaller. This makes the change in $M_{T\,xRx}$ much bigger than the change of $M_{RxR_R}$. This implies that any change in g influences power efficiency to a greater extent than a change in dx.

Figure 25A:
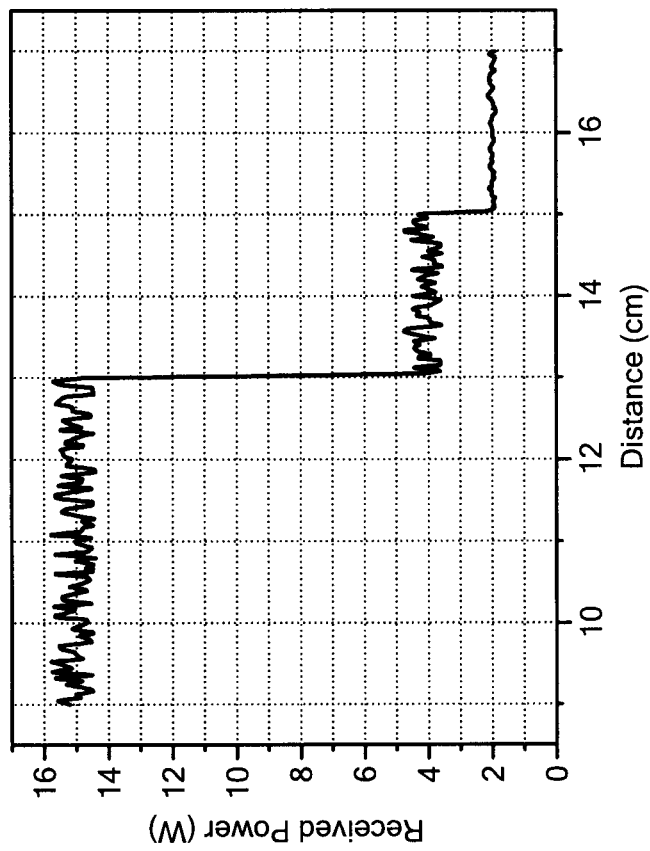
FIG. 25 depicts experimental results for (a) power efficiency and (b) received power for different configurations of multi-layer when, a distance between Tx and relay coil at receiver is varying.
Figure 25B:
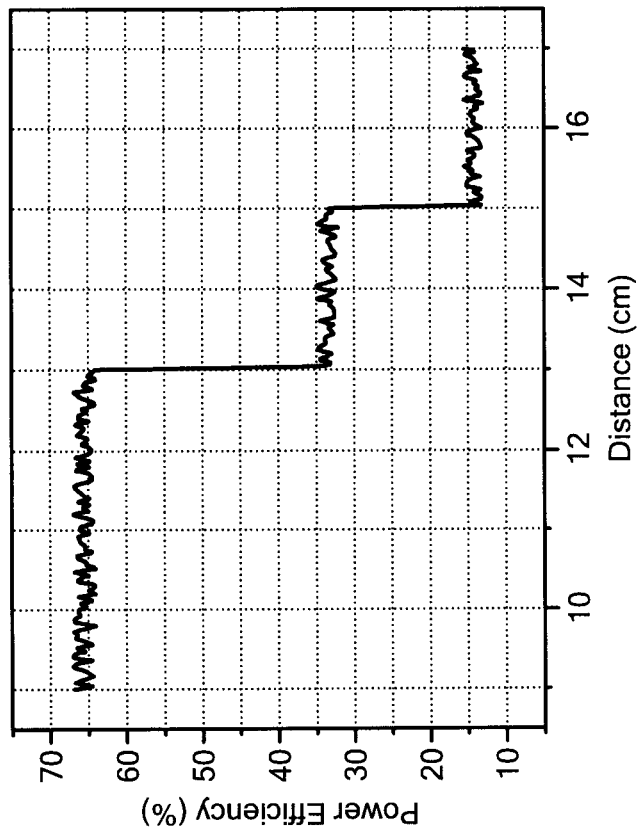
Figure 26B:
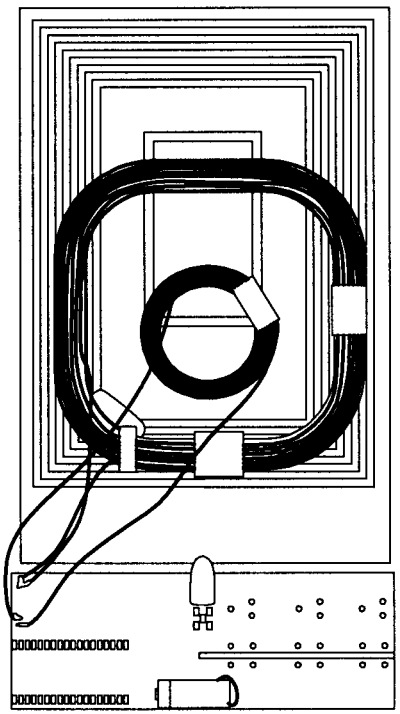
FIG. 26 shows an example implementation of (a) leader energy tile, with PCB integrated with the charging coil and the power amplifier, (b) reverse side of the relay tile, showing the additional sensing coil, (c) top view of the relay energy tile, and (d) magnified view of the custom-designed PCB that integrates with the coils.
Figure 26D:
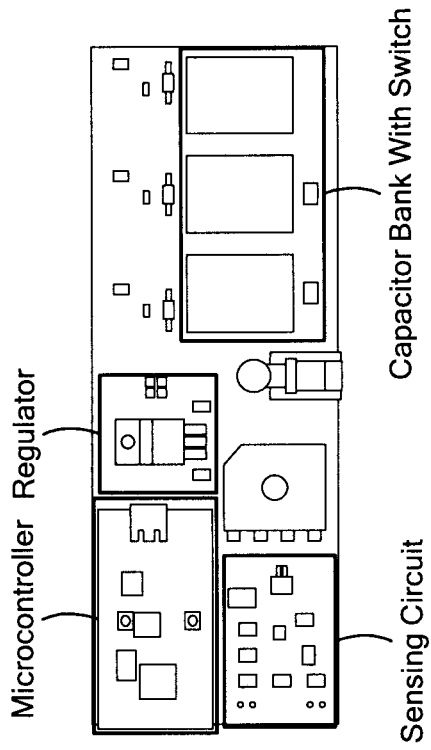
Figure 26A:
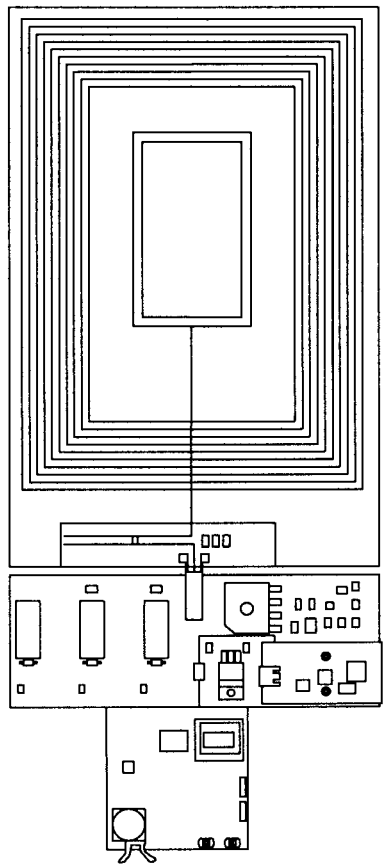
Figure 26C:
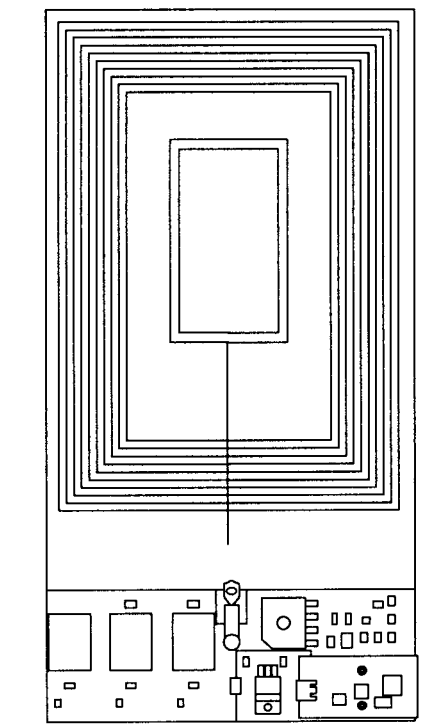

FIG. 25a shows the experimental results how power efficiency when the distance "g" between a single relay coil R3 (coils R1 and R2 are switched off) and the energy tile is changing in an experimental setup. The load receiver coil Rx is kept constant at 20 cm in all cases, with the intermediate relay moved from 9-17 cm. A step-wise efficiency drop is observed, and the goal of the multi-coil relay is to boost the efficiency at these knee points. FIG. 25b shows the actual received power for the same scenarios.

FIG. 26 shows an example implementation with (a) leader energy tile, with PCB integrated with the charging coil and the power amplifier, (b) reverse side of the relay tile, showing the additional sensing coil, (c) top view of the relay energy tile, and (d) magnified view of the custom-designed PCB that integrates with the coils. The example PCB connecting to the coils is magnified in FIG. 26(d), showing the microcontroller, sensing circuit, impedance optimization control part, RF transceiver and the capacitor bank. The large blue areas in (a-c) cover the actual energy transfer coil that resonates at 6.78 MHz, compliant with the frequencies specified by the AirFuel Alliance. In addition, each individual energy tile has an additional 150 KHz resonance coil for sensing, which is applied externally and shown in FIG. 26b. This is the same frequency used in the Qi standard.

An example sensing coils can be built for demonstration purpose with the specifications of AWG 17 (1.15 mm diameter) type 2 litz wire having 105 strands of 0.08 mm diameter, which is same as the wire used in Qi standard transmitter coil.

An example microcontroller that may be used is nRF52840-MDK and contains an ARM-Cortex-M4F processor that is optimized for ultra-low power operation. It performs functions of waveform generation for sensing, analog-to-digital (ADC) converter, builds and maintains a full mesh OpenThread (OT) network, and an impedance controller. The waveform generator outputs a square-wave signal of amplitude 5 V at 150 kHz to excite the circular inner coil. The coil starts to resonate at 150 kHz with the outer, passive coil. The voltage rectifier converts the induced magnetic field signal at the outer coil into functional DC voltage. The presence of a device near the outer coil affects the mean and variance of the magnetic field. The resulting voltage drop at the output of voltage rectifier is converted by the ADC in the microcontroller into digital format, which is used to detect the type of device.

Additional details of an example implementation of energy tile implementation are listed in Table II:

TABLE II

| Component | Value | |
|---|---|---|
| PCB | Size | 15.1 cm × 5.1 cm |
|  | Laminate thickness | 62 mil FR-4 |
|  | Number of Layers | 2-layer |
|  | Copper thickness | 1.7 mil |
|  | Trace width | 1 mm |
|  | Dielectric constant | 4.6 |
|  | Through-hole size | 1 mm |
| µCU | nRF52840-MDK | 32 bit ARM Cortex-M4 72 MHz CPU |
| Rectifier | Full-Bridge | ON Semiconductor GBU8JFS-ND |
| Switch | Solid-state Relay | Omron G3VM-101CR IOR PVAZ172N |
| Resonator Capacitor for Sensing Coils | Ceramic Capacitor | 56 pF |
| Resonator Capacitor for MR Charging Coils | Ceramic Capacitor | 5, 7.5, 10, 15, 20, 330 pF |

Figure 27A:
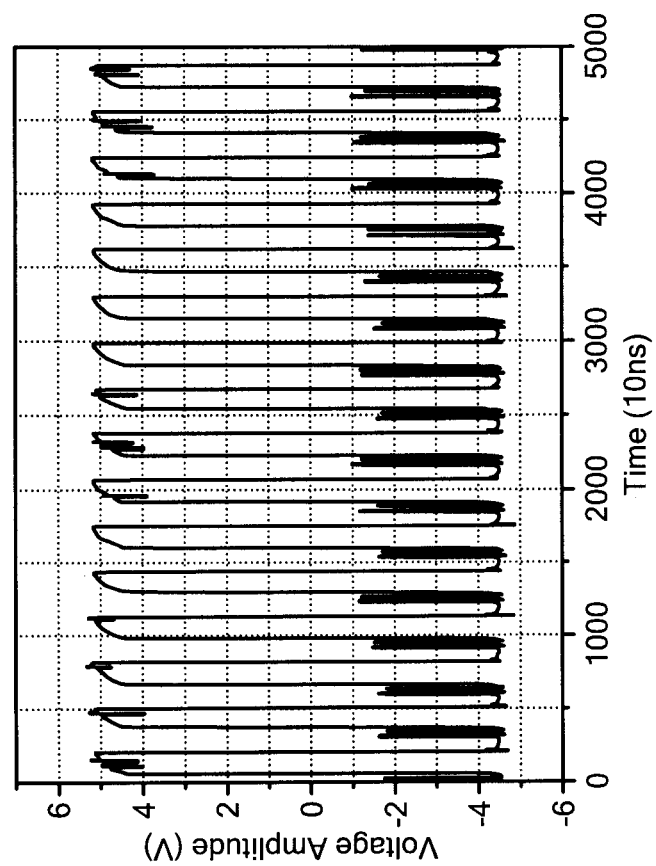
FIG. 27 shows (a) a 150 kHz square wave excitation signal applied to the inner coil; and (b) the resulting induced voltage at the output of the ADC in the outer coil.
Figure 27B:
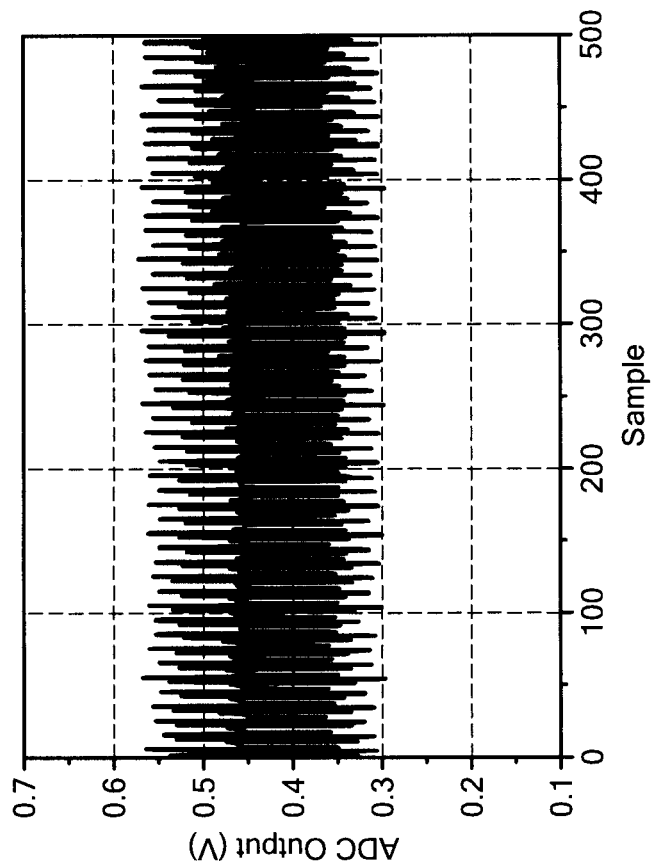

FIG. 27a shows a 150 kHz square wave excitation signal applied to the inner coil and FIG. 27b shows the resulting induced voltage at the output of the ADC in the outer coil. In particular, FIG. 27-a shows an example for the excitation signal applied to the inner sensing coil of an energy tile, which induces a time varying DC voltage at the outer coil. This voltage at the outer coil is converted by the ADC to digital values and analyzed by the microcontroller in real time. With the sampling rate set at 104 samples/s. FIG. 27-b shows the DC voltage output from the ADC. This is the baseline signal on which the technology can attempt to identify variations. It has a clear peak-to peak range, from 0.55 V to 0.3 V. Averages of the measurements per 10 samples may be taken to avoid false alarms due to transient fluctuations.

Figure 28:
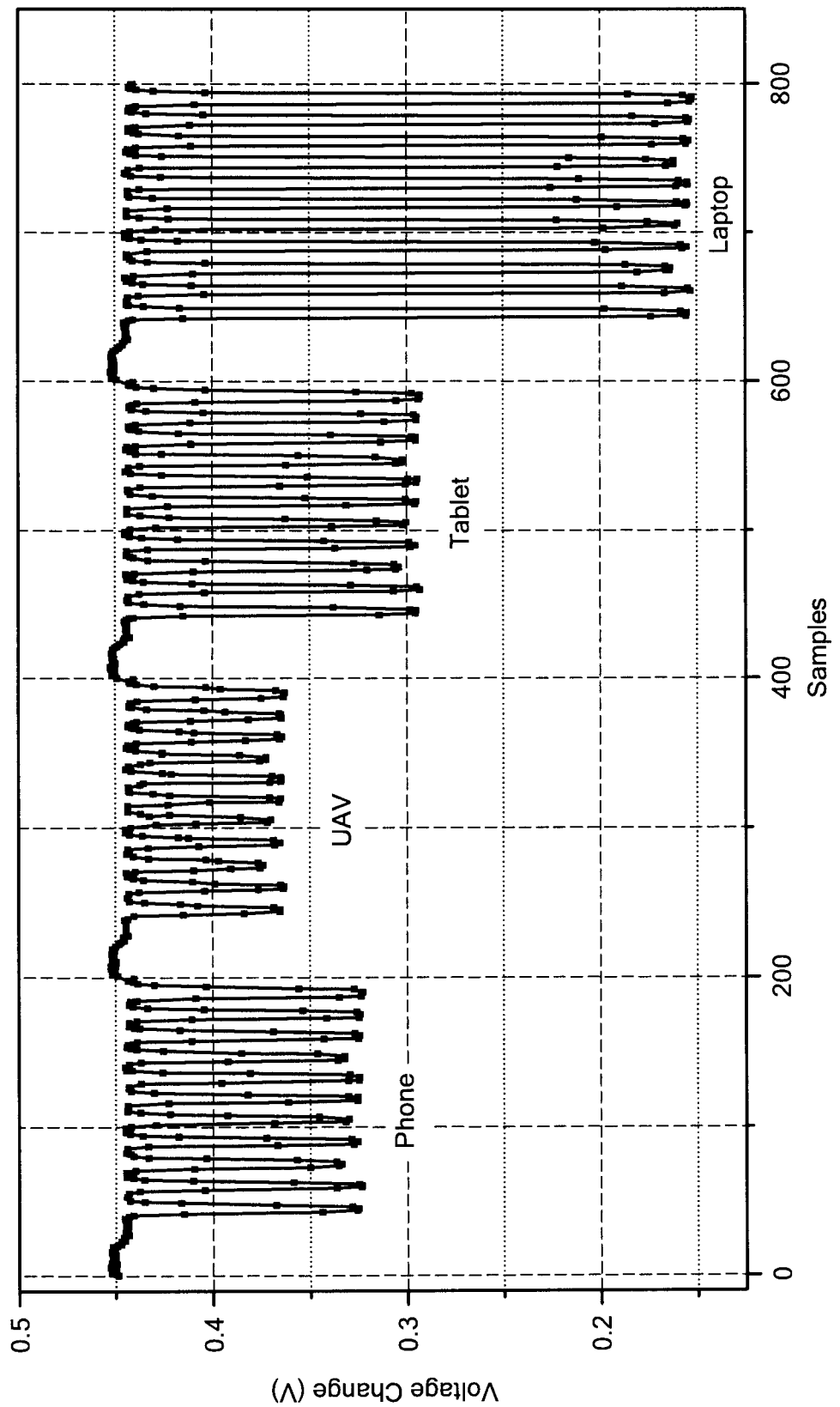
FIG. 28 presents the voltage variations at energy tile sensing outer coil for 4 different devices, iPhone 8, iPad, 13" inch MacBook Pro, and Solo 3DR UAV, located at 4 cm height from the energy tile.

FIG. 28 shows voltage variations at energy tile sensing outer coil for 4 different devices, iPhone 8, iPad, 13" inch MacBook Pro, and Solo 3DR UAV, located at 4 cm height from the energy tile. The laptop tends to show the highest voltage change. The UAV has similar dimensions as the laptop, but it has less coverage with the sensing coil. This gives the smallest voltage change. Similarly, the phone and iPad show corresponding voltage changes proportional to their dimensions.

Figure 29A:
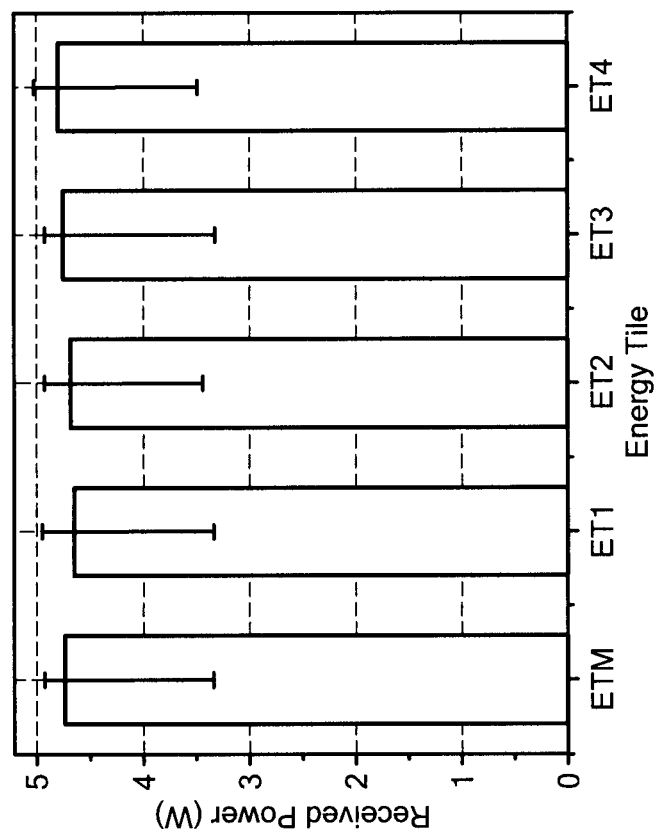
FIG. 29 illustrates ID energy hopping (a) received power distribution for each ET without impedance optimization, and (b) received power distribution from each ET with impedance optimization.
Figure 29B:
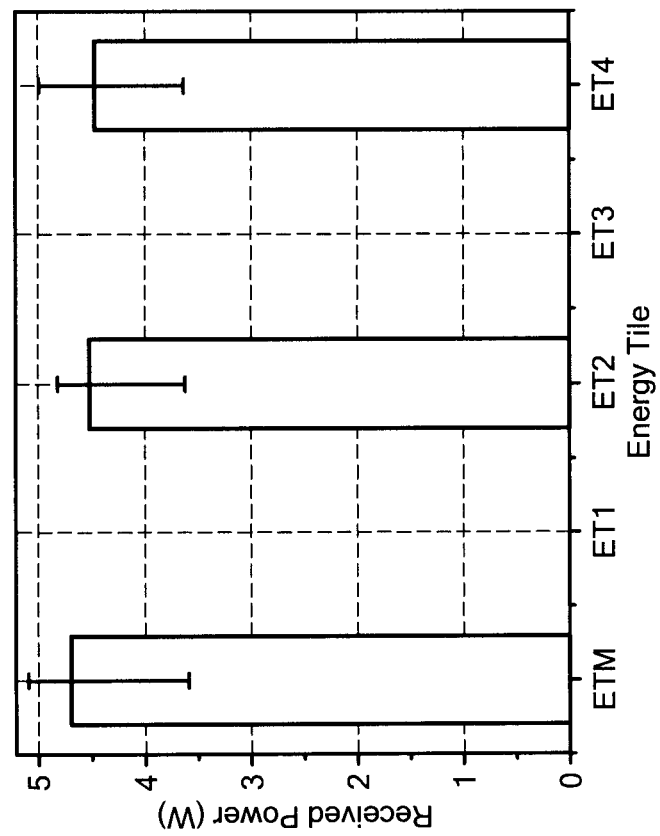

FIGS. 29a-29b demonstrate the performance of power routing in terms of received power for the case of five identical energy tiles arranged as a straight line with 1.5 cm gap between each pair of tiles. In particular, FIG. 29a shows received power distribution from each tile without impedance optimization, and FIG. 29b received power distribution from each tile with impedance optimization. Here, start by connecting each tile in series with a resonant matched capacitor to set the resonant frequency at 6.78 MHz, without any hardware or software changes in the amplifier, transmitter/receiver coils. A phone with an energy receiver attached to it is moved over each tile, at a fixed height of 4 cm. It can be observed that the maximum received power is 5 W for this experiment, although not all energy tiles are able to charge the phone, as shown in FIG. 29-a. Tiles 1, 3 and 5 deliver approximately same power, but the power from tiles 2 and 4 is zero because of the wave reflection from the last tiles in the row, tile 5.

Figure 30B:
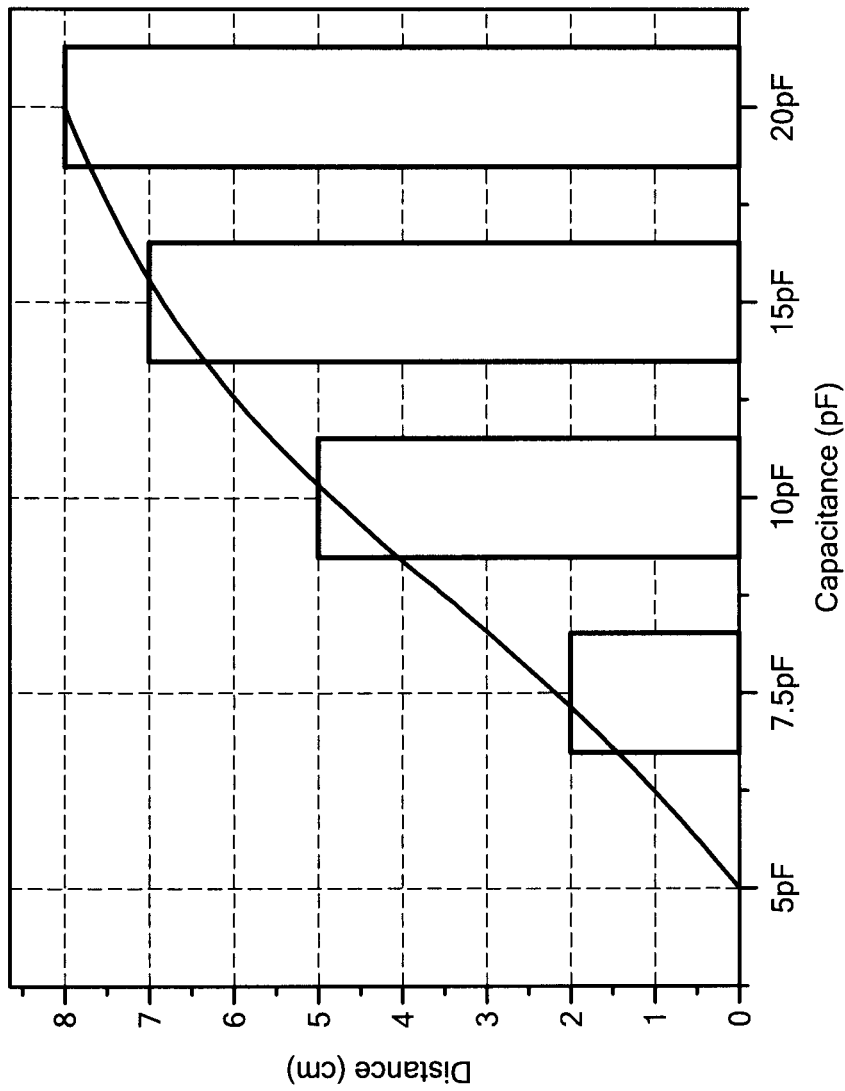
FIG. 30 shows (a) a phone with energy receiver moves from the left edge of second tile to the right edge of it with 1 cm interval, the total length of movement is 8 cm; and (b) impact of one energy tile's impedance on adjusting the charging coverage and eliminating the reflections of energy waves.
Figure 30A:
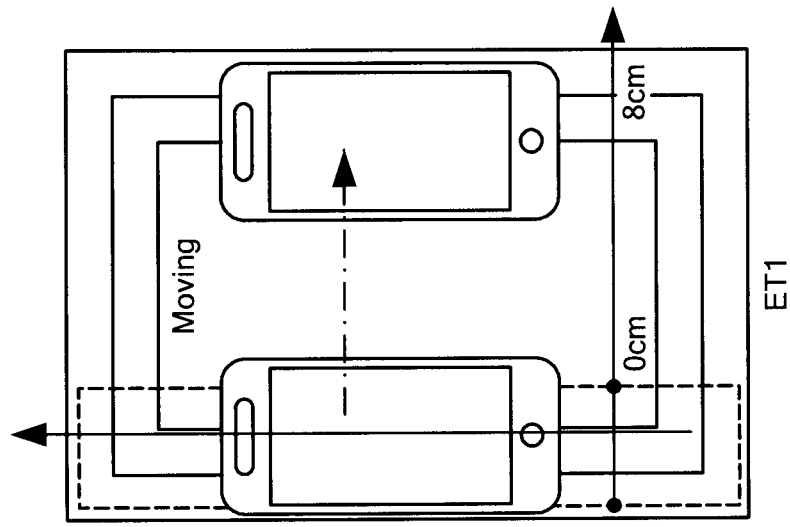

FIG. 30 shows the impact of one energy tile impedance on adjusting the charging coverage and eliminating the reflections of energy waves. As shown, the scenario of three energy tiles that are placed in a row with one, 5 cm gap has been considered, where the impact of changing the impedance of last tile is depicted on the charging coverage of second energy tile. As shown in FIG. 30a, a phone with an energy receiver moves from the left edge of second tile to the right edge of it with 1 cm interval, the total length of movement is 8 cm. When the capacitance change of last tile is 20 pF, the phone can get power at any location of the second tile despite negative wave reflections, but for lower capacitance the charging coverage distance is decreasing as shown in FIG. 30b.

Power Blocking Example

Figure 31B:
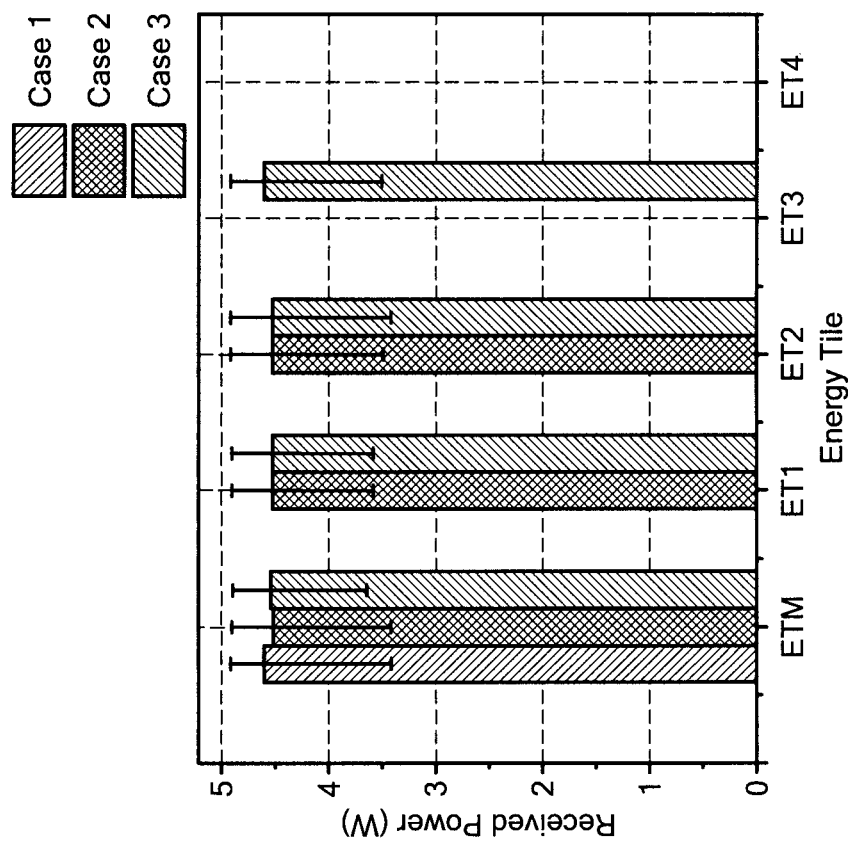
FIG. 31 depicts (a) three power blocking concept cases for five identical energy tiles horizontally arranged as a straight line with 1.5 cm gap between each pair of tiles; and (b) the received power at each energy tile in the row for three cases.
Figure 31A:
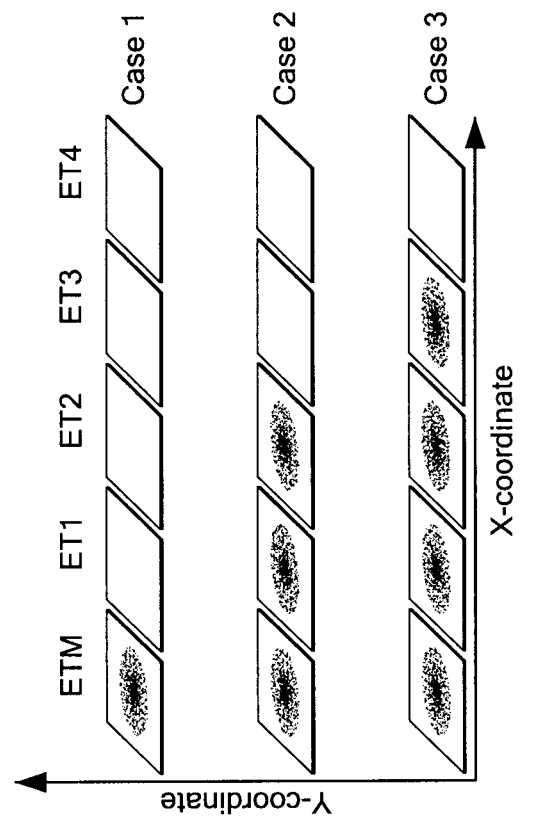

When the chosen capacitance value of an energy tile is far from the value that achieves resonance, the energy tile power relaying and delivery falls drastically, and can be defined as "power blocking". FIG. 31a shows three power blocking concept cases for five identical energy tiles horizontally arranged as a straight line with 1.5 cm gap between each pair of tiles as follow and FIG. 31b shows the received power at each energy tile in the row for these cases.

Case i: Only the leader tile (abbreviated as ETM) can deliver power, and thus the pathway ET1-ET4 should be blocked. Select the 330-pF capacitor at tile 1to achieve this goal.

Case ii: leader tile, tile 1 and tile 2 should deliver power. For this case, the first two select the 20 pF to smooth the power distribution, while tile 3 is connected in serial to a 330 pF capacitor to block power flow further down the chain.

Case iii: tile 4 does not deliver power but the remaining tiles may be able. For this case, tile 2 and tile 4 are connected in serial with a 20 pF and 330 pF capacitor to reduce the power reflection and block power transfer separately.

Figure 32:
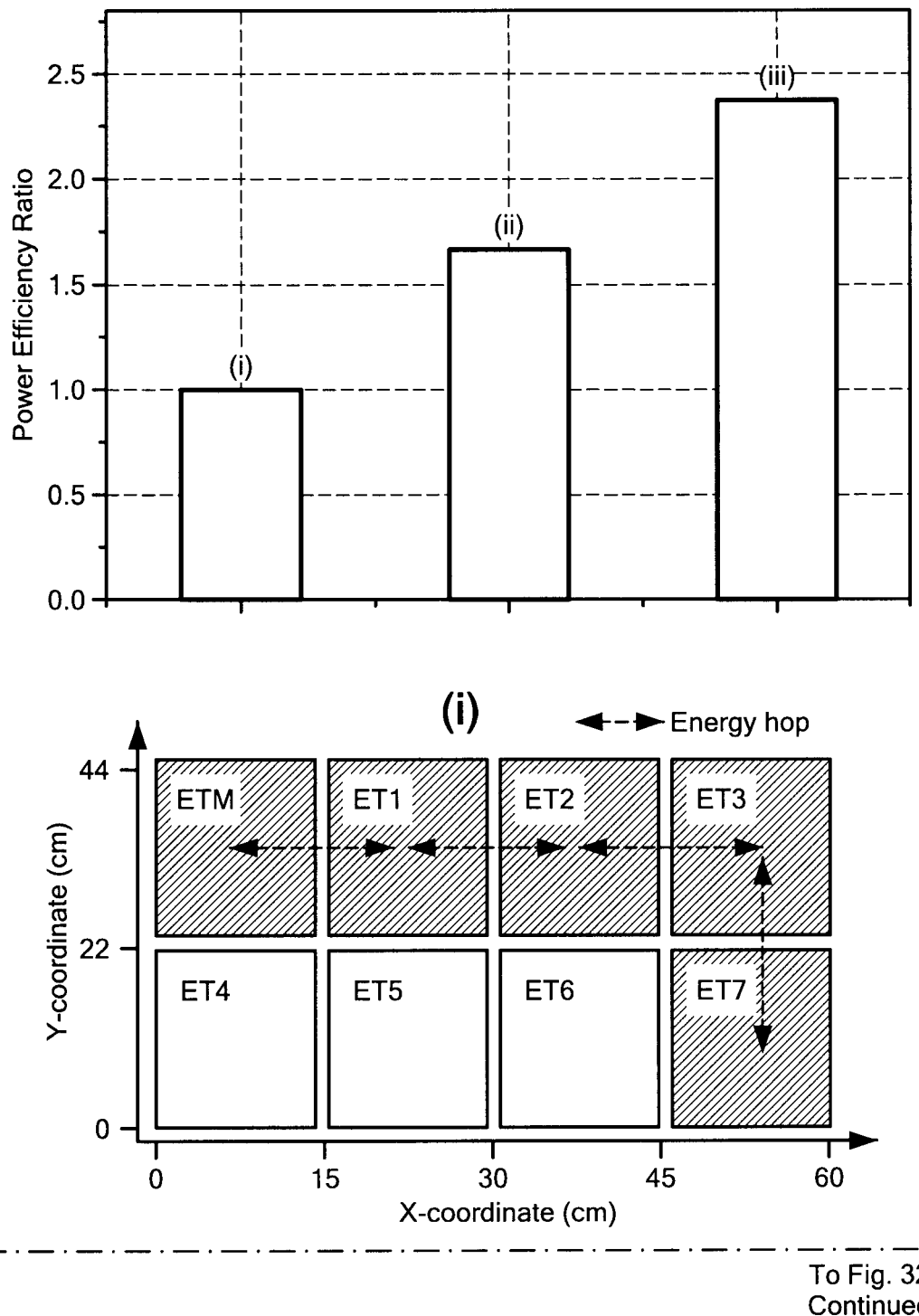
FIG. 32 illustrates exemplary results of power efficiency for three different energy tile configurations for the case that 8 energy tiles arranged in two rows of four tiles each.
Figure 32:
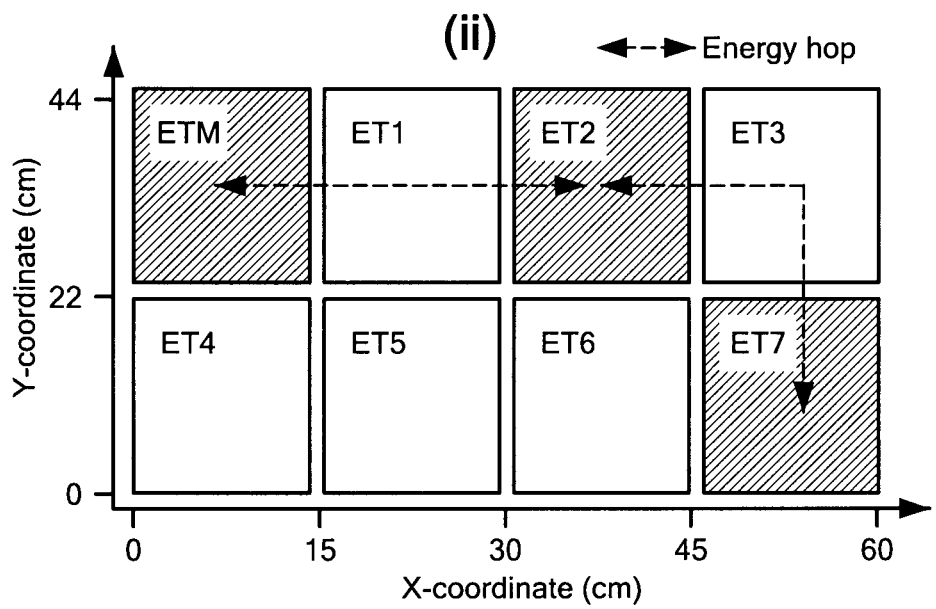
Figure 32:
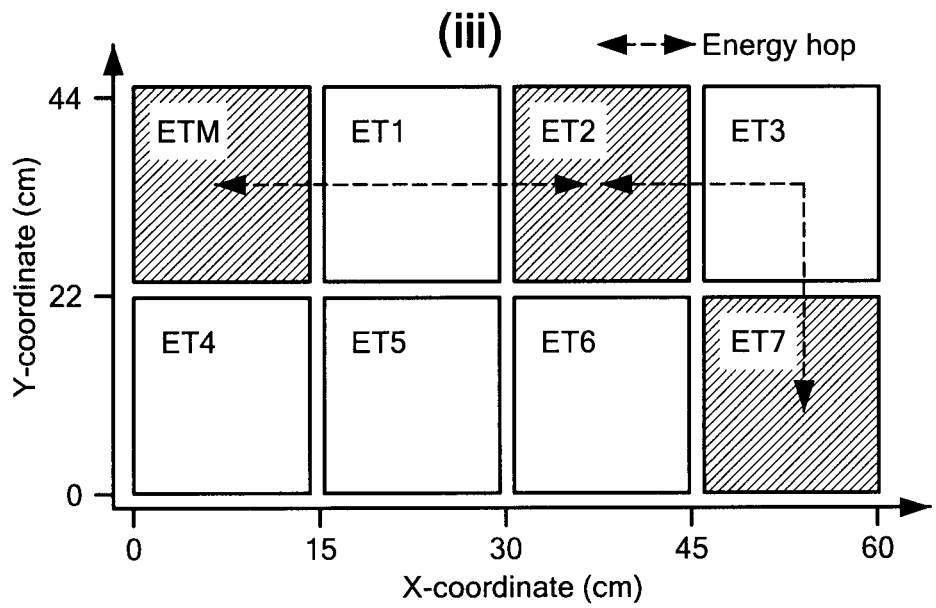

FIG. 32 shows an example results of power efficiency for three different energy tile configurations for the case that 8 energy tiles arranged in two rows of four tiles each. As it is shown, the optimal energy flows from leader tile (ETM) to a device located at energy tile 7 crosses multiple tiles. The software controller 150 can re-configure the energy tiles such that power on selected tiles over an active energy flow path be nulled (guiding energy wave reflections through impedance change) or blocked (through power blocking). The shaded blue tiles in FIG. 32 indicate those tiles that neither been nulled nor blocked. For ease of visualization the power efficiency ratio is normalized. A person skilled in the art will recognize that optimal reconfiguration of energy tiles can improve the power efficiency on this example experiment up-to 2.4 times.

Figure 33A:
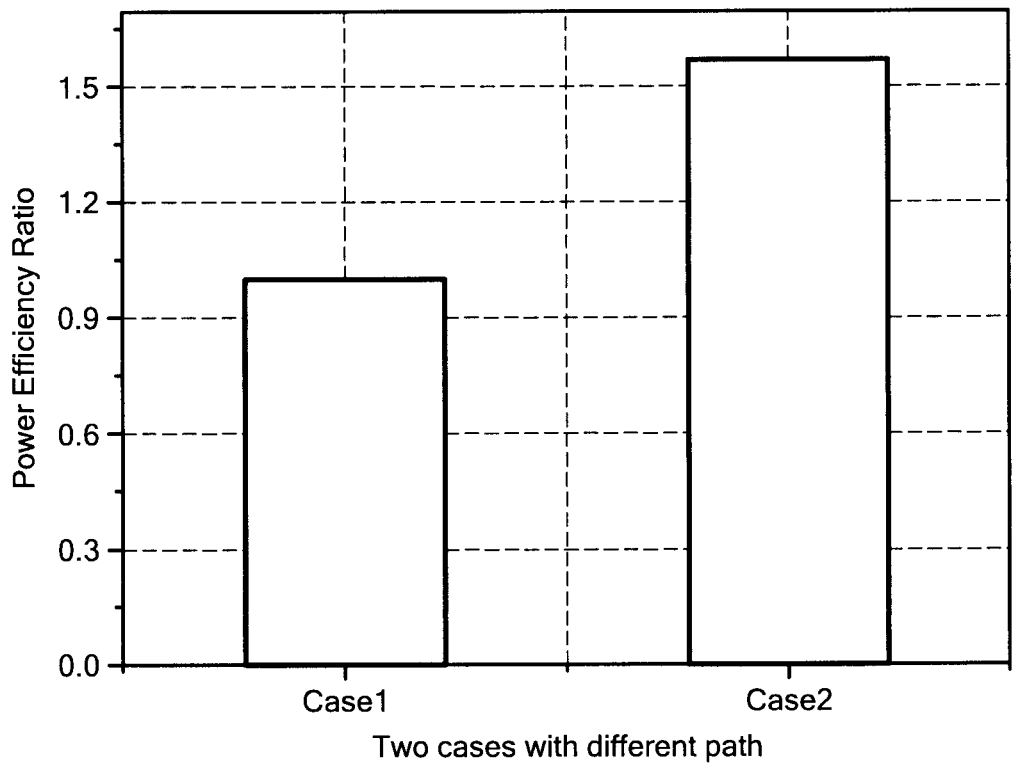
FIG. 33 illustrates two power routing cases when two devices are being charged at the same time over 8 energy tiles that are arranged horizontally in two rows of four tiles each.
Figure 33B:
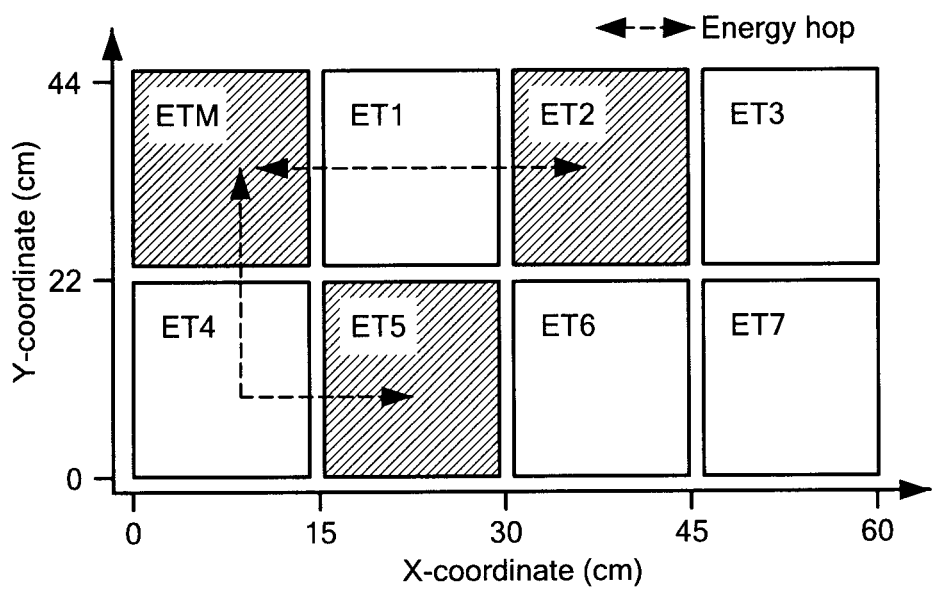
Figure 33C:
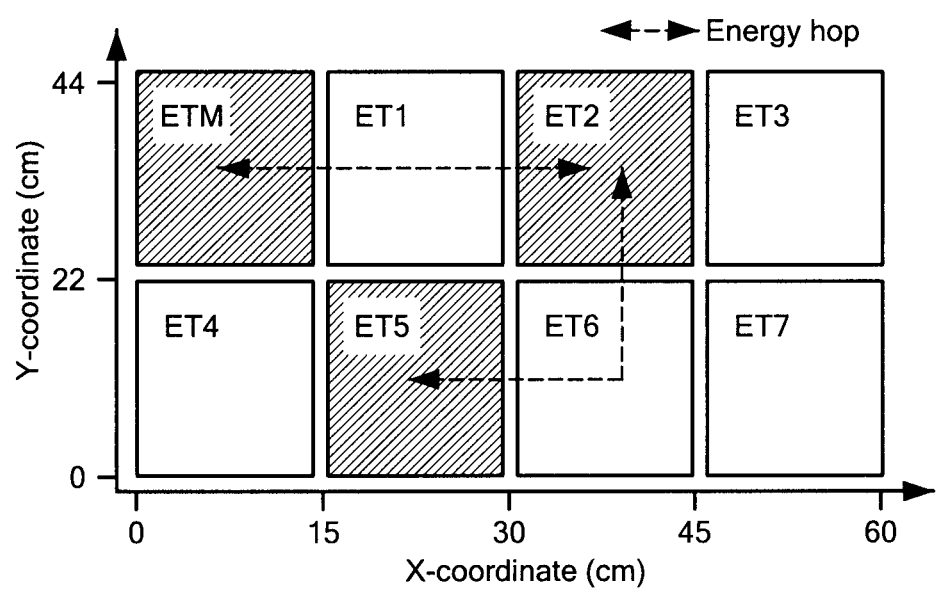

FIG. 33 shows two power routing cases when two devices are being charged over 8 energy tiles that are arranged horizontally in two rows of four tiles each. Here, the devices are located over tile 5 and tile 2 should receive power at the same time. In case one (FIG. 33b), two different paths used to transfer power where energy tile 3, tile 6 and tile 7 are blocked by setting impedance to 330 pF, and tile 3 is nulled. While in case two (FIG. 33c), one path has been used, where tile 3, tile 4, tile 7 are blocked, and tile 1 is nulled. FIG. 33a indicates that case two can deliver 1.6 times more energy efficient than case one, which demonstrates the importance and role of optimal energy flow paths in overall performance.

Figure 34A:
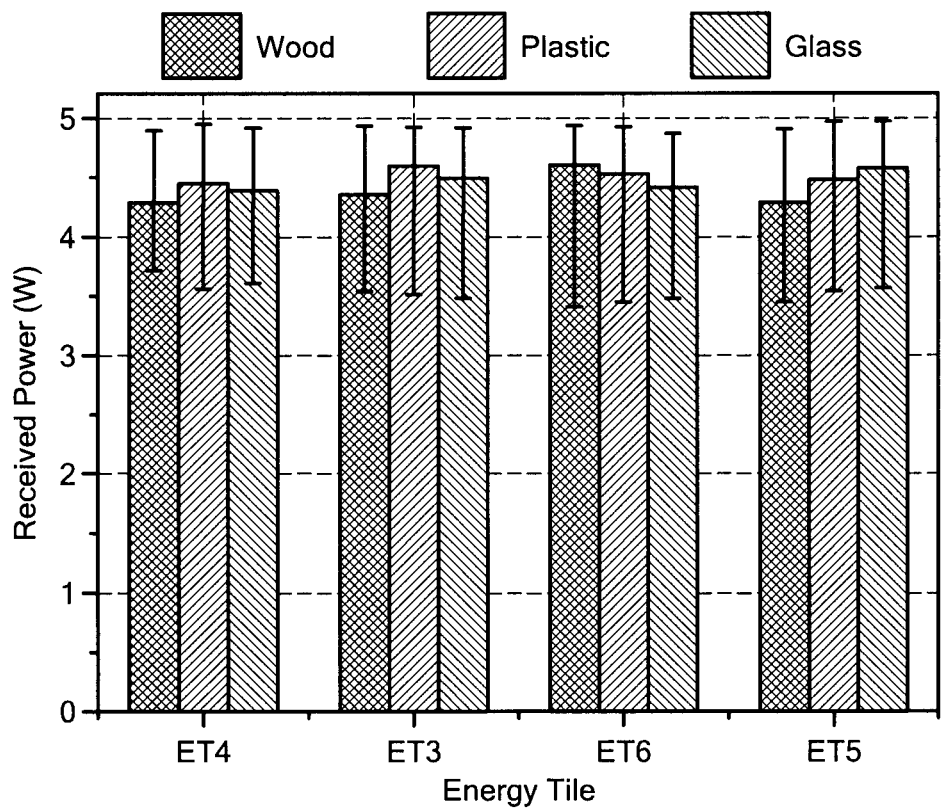
FIG. 34 shows the received power in the case of 2D surface charging for four different positions of phone and different top surface materials such as wood, plastic, and glass, (b) charging time from battery depleted to fully charged state when phone is located at the third energy tile.
Figure 34B:
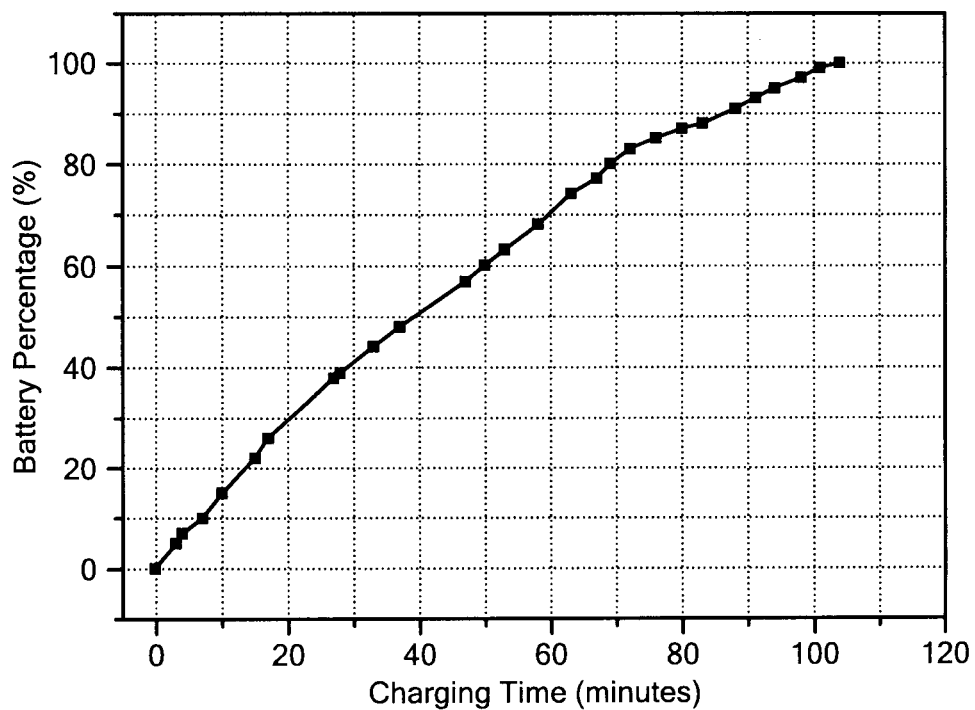

FIG. 34a shows the received power in the case of 2-D setup as described earlier with 8 horizontal energy tiles, with each tile identifiers corresponding to their locations in the coordinate plane. Here, the receiver is a phone placed on tiles 3, 4, 5, and 6 in turn at 4 cm height. Furthermore, FIG. 34a evaluates the received power when surface is switched to different materials including wood, plastic, and glass. FIG. 34b shows the charging graph of the phone from a complete battery depleted to fully charge state when phone is placed at the third energy tile.

Figure 35A:
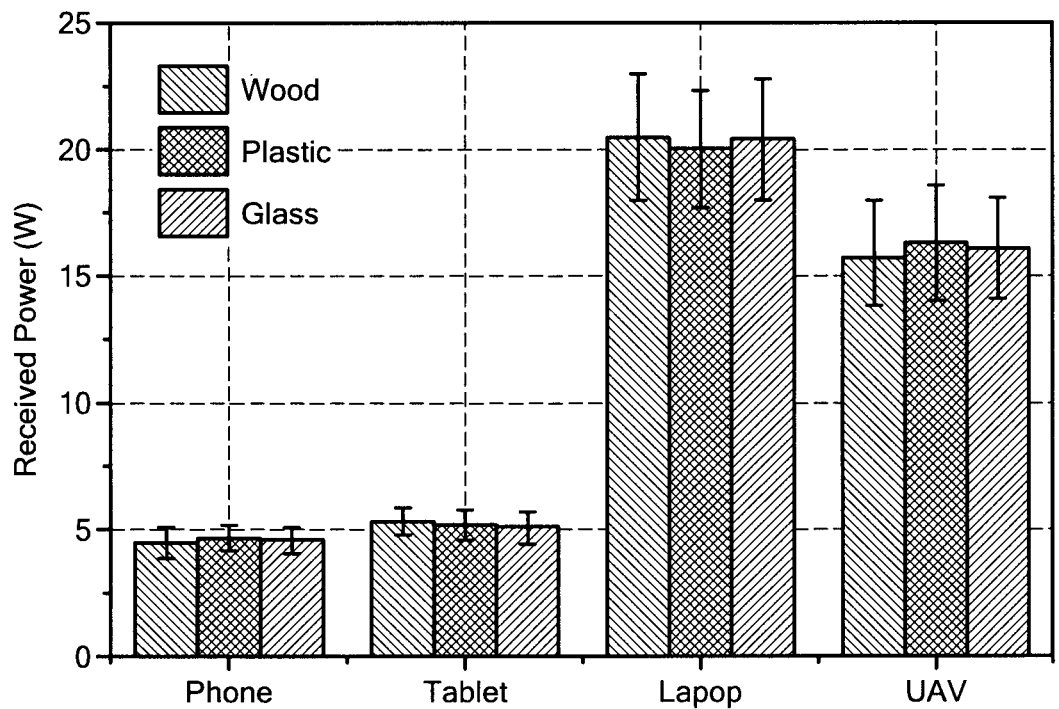
FIG. 35 shows the received power for the case of 8 energy tiles that are arranged in two equal rows and for different receiver devices including phone, tablet, laptop, and UAV, where: (a) receiver located over second energy tile and (b) receiver located over the fifth energy tile.
Figure 35B:
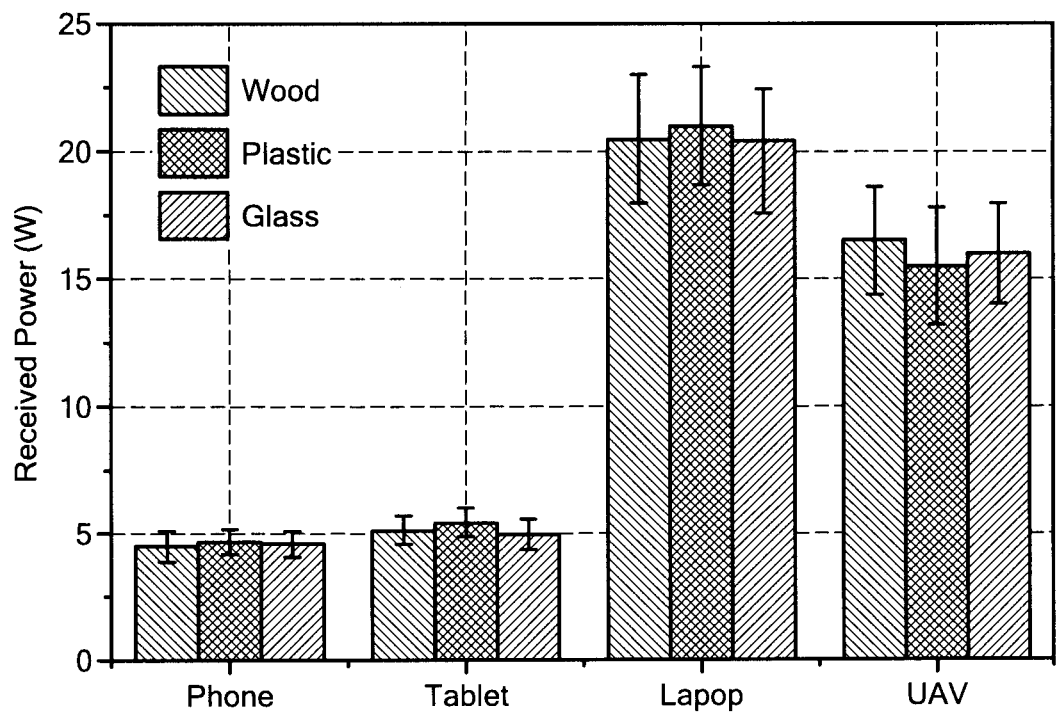
Figure 36A:
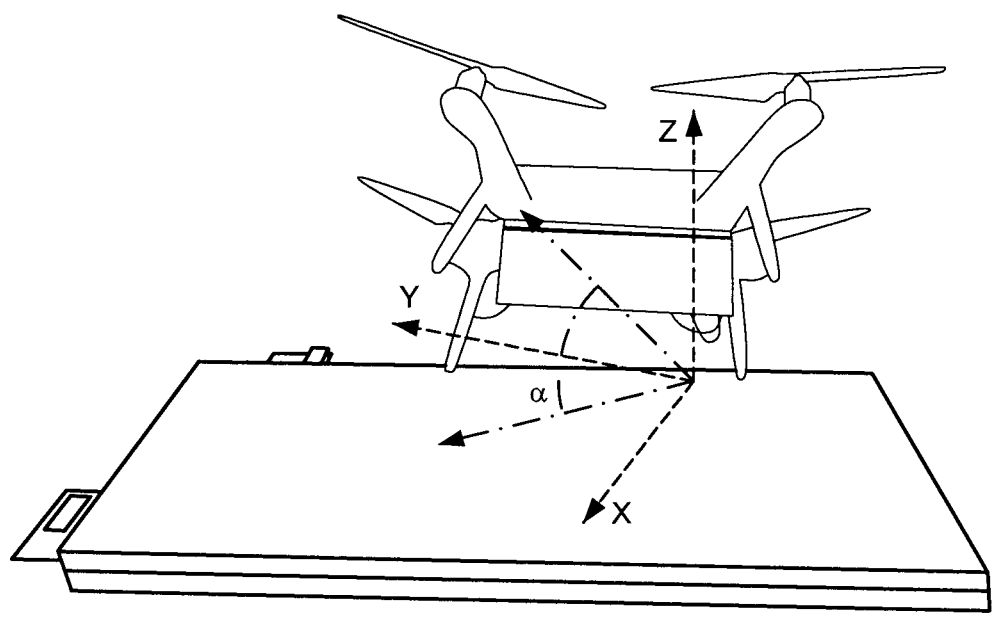
FIG. 36 illustrates charging results for UAV charging case for different multi-layer receiver configurations and different rotate angles.
Figure 36B:
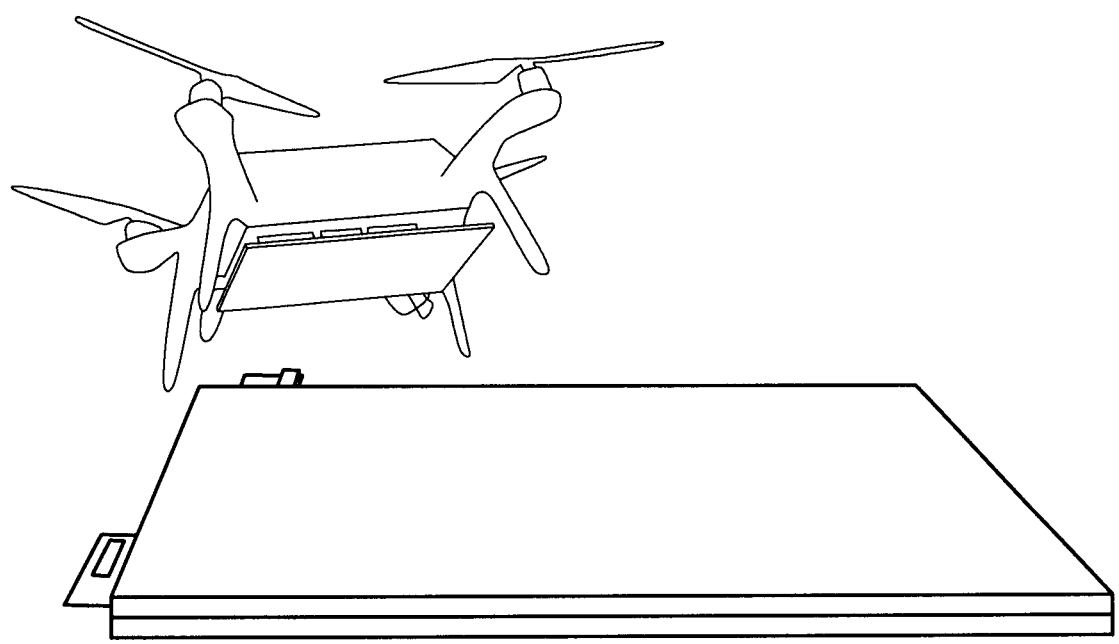
Figure 36C:
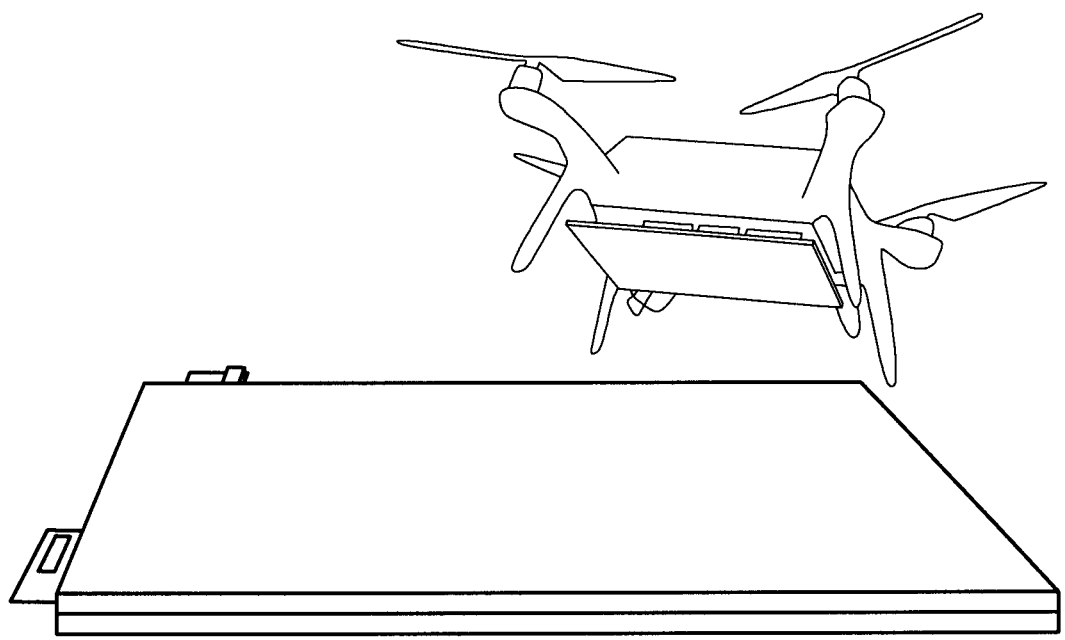
Figure 36D:
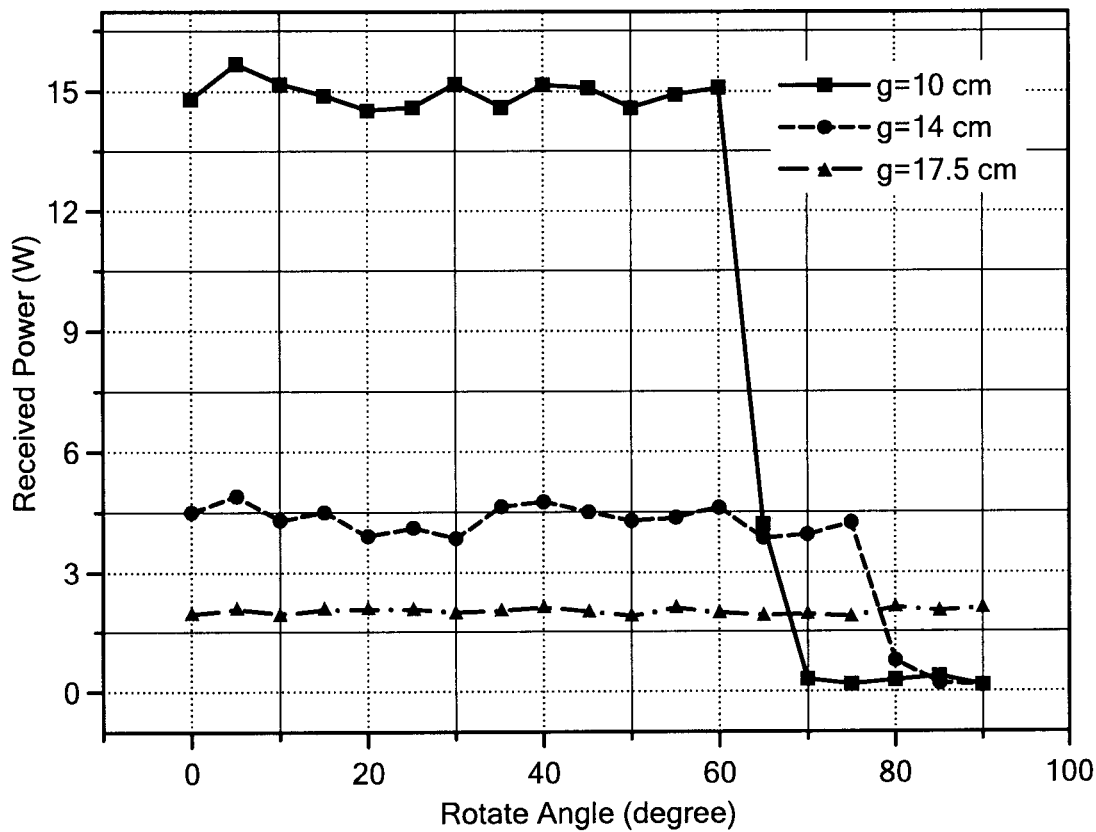

FIG. 35 shows the received power for the case of 8 energy tiles that are arranged in two equal rows and for different receiver devices including phone, tablet, laptop, and UAV, where UAV is located at distance 20 cm from the energy tiles and rest of devices at distance 4 cm. FIG. 35a shows the received power for case of receiver located at energy tile 2 and FIG. 35b for the case of energy tile five. For the phone and tablet a 5V receiver is used and for laptop and UAV, a 19V receiver is used. It can be observed that the surface composition material does not significantly affect the charging performance for wood, plastic, and glass.

FIG. 36 demonstrates in more depth the charging results for UAV charging case with a multi-layer reconfigurable receiver. As described above, "g" was defined as distance between energy tile coil and the resonate relay layer of a multi-layer receiver. Evaluation of the received power for different rotational angles with respect to the horizontal surface of energy tile is shown in FIGS. 36a, 32b, and 32c, as well as different coil configurations of receiver (three different values of g, 10 cm, 14 cm, 17.5 cm). Additionally, FIG. 36d shows the results of how the received power changes different rotational angle a visually seen in FIG. 36a. It can be seen that smaller values of "g" give higher power but have less rotational flexibility as opposed to higher values of "g." For example, when "g" is 17.5 cm, the permissible rotational angle is 25 degrees more than the case when g is 10 cm.

Figure 37:
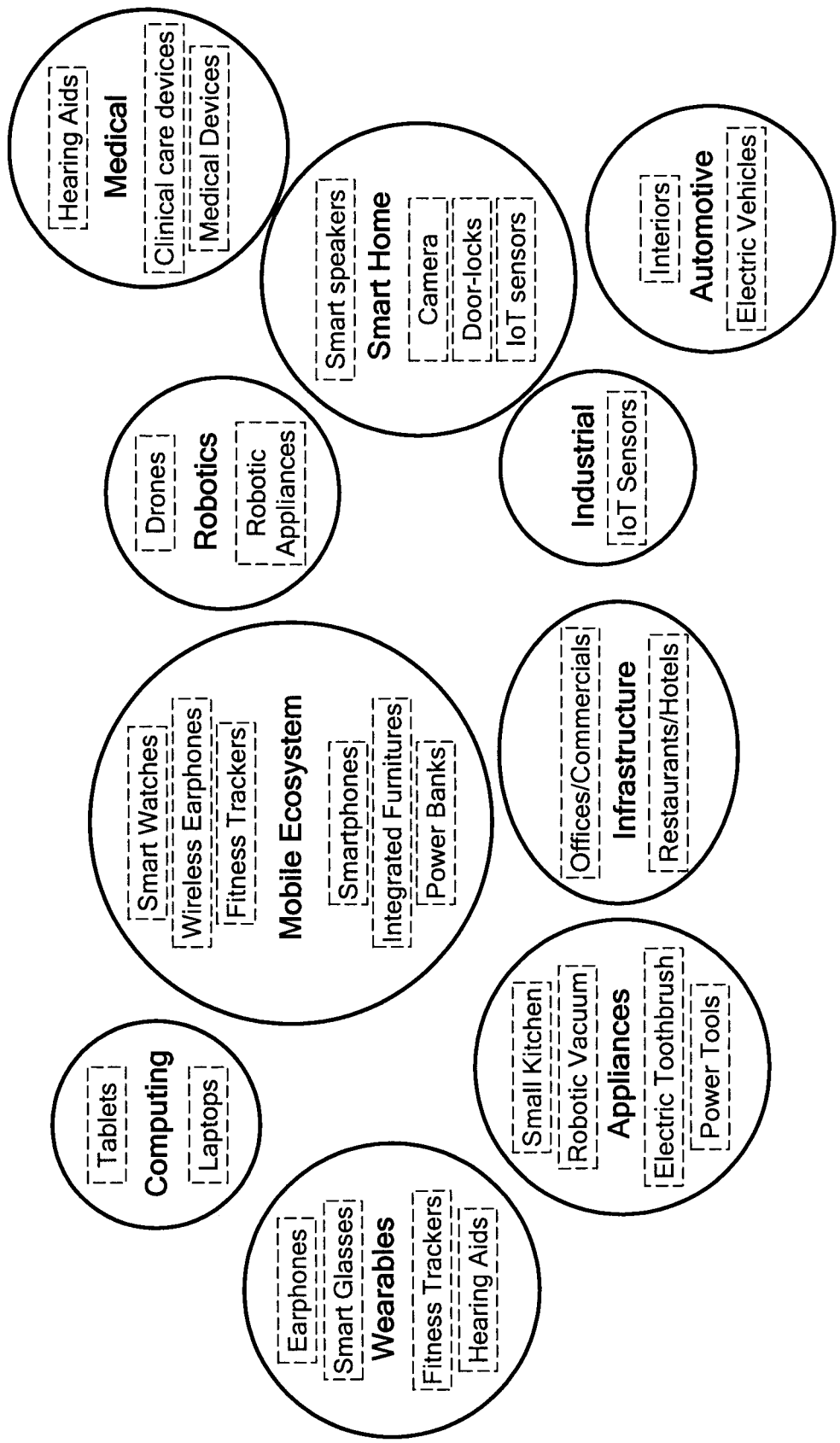
FIG. 37 depicts some exemplary market segments, and potential integration targets that can be transformed in terms of enhanced device wireless charging by utilization of the technology described herein.

FIG. 37 depicts some exemplary market segments, and potential integration targets that can be transformed in terms of enhanced device wireless charging by utilization of the technology described herein. Energy tiles as transmitters can be installed in easy, modular, and plug and play manners on existing surfaces at restaurants, hotels, coffee-shops, offices, commercial buildings, libraries, universities, public places, and homes to enable infrastructure-based charging. Additionally, it can be integrated in forms of charging pads for portable personal charging solution. Furthermore, the receiver can be integrated into tablets and laptops in computing segment, smart watches, wireless earphones, fitness trackers, smartphones, integrated furniture, and power banks in mobile ecosystem segment, drones and robotics applications in robotics segment, smart speakers, camera, doorlocks, and IoT sensors in smart home segment, car interior and electric vehicles in automotive segment, in kitchen appliances, robotic vacuum, electric toothbrush, and power tools for appliances segment, and in smart glasses, earphones, hearing aids for wearables segment.

Various aspects and/or features may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method for sensing a location of a device, the method comprising:
- providing a first AC sensing signal to a first active coil nested in a first passive coil and capturing first information about a first voltage signal from the first passive coil;
- providing a second AC sensing signal to a second active coil nested in a second passive coil and capturing second information about a second voltage signal from the second passive coil; and
- analyzing the first information and the second information to determine the location of the device relative to the first and second active coils.

P2. The method of P1 wherein the first AC sensing signal and the second AC sensing signal have a frequency in a kHz range.

P3. The method of any of P1-P2 wherein the first and second active coils are positioned in a grid comprising at least one other set of nested coils, each in communication with a processor coupled to a non-transitory memory.

P4. The method of any of P1-P3 wherein the analyzing step is performed by the processor coupled to the non-transitory memory.

P5. The method of any of P1-P4 wherein the analyzing step comprises providing the first and second information to a machine learning-based algorithm.

P6. The method of any of P1-P5 wherein the analyzing step further comprising determining the device's type based on the first information and the second information.

P7. The method of any of P1-P6 wherein the analyzing step further comprising determining the device's charging requirements based on the first information and the second information.

P8. The method of any of P1-P7 1 further comprising providing wireless charging power to the device based on its location.

P9. The method of any of P1-P9 wherein the device is selected from the group consisting of a tablet, a laptop computer, a smart watch, wireless earphones, a fitness tracker, a smartphone, integrated furniture, a drones, a robot, a speaker, a camera, a door lock, an IoT sensor, a vehicle, kitchen appliance, a vacuums, an electric toothbrush, and a power tool.

P10. The method of any of P1-P9 herein the location of the device is at least 10 mm from at least one of the first and second sensing coils.

P11. A sensing module comprising:
- at least one nested coil that includes an active coil nested within a larger passive coil;
- circuitry operable to provide an AC sensing signal to the active coil;
- a processor coupled to a non-transitory memory operable to receive a voltage signal from the passive coil.

P12. The sensing module of P1 wherein the processor is further operable to analyze the voltage signal from the passive coil and determine location information of an electronic device relative to the at least one nested coil.

P13. The sensing module of any of P11-P12 wherein the processor is further operable to analyze the voltage signal from the passive coil and determine the electronic device's type.

P14. The sensing module of any of P11-P13 further operable to provide wireless charging power to the electronic device based on the location information.

P15. The sensing module of any of P11-P14 operable to be coupled to one or more additional nested coils in communication with the processor and the circuitry.

P16. A method of providing wireless charging power to a device, the method comprising:
- providing an AC power signal to a coil in a first module of a plurality of modules, wherein each module of the plurality of modules includes a coil mutually inductively coupled to a coil of at least one other module, and circuitry to control a capacitance of a resonant circuit including the coil;
- controlling the capacitance of a first set of one or more of the plurality of modules to block power transmission and controlling the capacitance of a second set of one or more of the plurality of modules to allow transmission of the AC power signal, via coupling by mutual inductance, through the second set of one or more of the plurality of modules to a device located proximate to a module in the second set of one or more of the plurality of modules.

P17. The method of P6 wherein the plurality of modules are arranged in a grid.

P18. The method of any of P16-P17 further providing charging power to a second device through a third set of one or more of the plurality of modules.

P19. The method of any of P16-P18 further comprising determining a path for transmission of the AC power signal through the plurality of modules to one of the plurality of modules proximate to the second device.

P20. The method of any of P16-P19 wherein the one of the plurality of modules proximate to the second device exhibits magnetic induction wave reflection addition.

P21. The method of any of P16-P20 wherein one or more of modules in the first set of one or more of the plurality of modules exhibits magnetic induction wave reflection cancellation and is prevented from providing charging power to a proximate third device.

P22. A charging module comprising:
- a coil magnetically coupleable to at least one other proximate coil;
- first circuitry operable to change a capacitance of a resonant circuit including the coil between a first value and a second value; and
- control circuitry operable to control the first circuitry to change from the first value to the second value in response to a command.

P23. A charging system comprising:
- a plurality of charging modules, each comprising:
  - a coil magnetically coupleable to a coil of at least one other charging module of the plurality of charging modules;
  - first circuitry operable to change a capacitance of a resonant circuit including the coil between a first value and a second value; and control circuitry operable to control the first circuitry to change from the first value to the second value in response to a command;

an amplifier operable to provide an AC power signal to at least a first module of the plurality of charging modules;

a control module, coupled to the control circuitry of each of the plurality of modules, and operable to:
determine a path from the first module to a target module of the plurality of charging modules; and
communicate with the control circuitry of at least one other module of the plurality of modules to block transmission of the AC power signal through the at least one other module by changing the capacitance from the first value to the second value.

The technology can be implemented at least in part in any conventional computer programming language. For example, a procedural programming language (e.g., "C"), or an object-oriented programming language (e.g., "C++"), or Python, R, Java, LISP, or Prolog can be used. The technology can be implemented as preprogrammed hardware elements (e.g., application specific integrated circuits, FPGAs, and digital signal processors), or other related components.

The apparatus and methods can be implemented as a computer program product for use with a computer system. Such implementation can include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). The technology can be implemented as a combination of both software (e.g., a computer program product) and hardware. The technology can be implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The technology described herein is intended to be merely exemplary; numerous variations and modifications will be apparent to those skilled in the art. All such variations and modifications are intended to be within the scope of the present disclosure as defined in any appended claims.

What is claimed is:

1. A dynamically configurable wireless charging system comprising:
one or more master transmitter tiles, each master tile comprising a coil and configured to couple to a power source;
a plurality of slave transmitter tiles respectively comprising coils coupled to configurable impedance-matching circuits and respectively positioned to magnetically couple to at least one other slave transmitter tile of the plurality of slave transmitter tiles, with at least one slave transmitter tile positioned to magnetically couple to one of the master transmitter tiles; and
a controller, communicatively coupled to master and slave transmitter tiles of the plurality of transmitter tiles, and configured to:
select a subset of the plurality of slave transmitter tiles, optionally excluding some of the plurality of slave transmitter tiles, to define a path from the master transmitter tile to a chargeable device in proximity to a cluster of one or more slave transmitter tiles of the plurality of slave transmitter tiles; and
control the power source configurations in each master tile and respective impedance-matching circuits of the subset of slave transmitter tiles to form a chain of wireless magnetic resonance power transmission from the master transmitter tile to the chargeable device.

2. The system of claim 1, wherein each master tile comprises a transmitter coil that is coupled with a reconfigurable amplifier circuit, wherein one or more configurable variables of each reconfigurable amplifier circuit is coupled, and configured with, a microcontroller, and wherein the one or more configurable variables include one or more of frequency, impedance of amplifier, peak-to-peak voltage, load, resistance, or output power.

3. The system of claim 2, wherein the microcontroller of each transmitter tile includes a distributed network process running thereon, the distributed network process being configured to run one or more operations including distributed resonance sensing, reconfigurable energy hopping, data/control communication, switching between different operational states, or a combination thereof.

4. The system of claim 1, wherein, when the control commands are sent to the plurality of transmitter tiles, each transmitter tile has a radio frequency transceiver to receive and send control messages to make a control wireless mesh network.

5. The system of claim 1, wherein each transmitter tile comprises an array of sensing tiles, each sensing tile further comprising:
one or more driven coils to produce magnetic signals in response to drive signals; and
one or more sense coils disposed to:
(a) magnetically couple to the one or more driven coils to receive the magnetic signal produced by the driven coils, and
(b) produce a sense voltage as a function of its proximity to the device.

6. The system of claim 5, wherein, within each transmitter tile, a device location circuit is disposed to detect a set of patterns, each pattern comprising a subset of slave transmitters corresponding to a location of a corresponding device of a set of devices, each such device having a device shape that defines its corresponding pattern.

7. The system of claim 6, wherein:
the array of sensing tiles is in communication with the controller, and
the controller further includes executable instructions, wherein execution of the executable instructions causes the controller to:
use the array of sensing tiles to detect the presence of at least one device adjacent to the transmitter array, each such device being a detected device;
determine, for each detected device of a set of detected devices proximate to the transmitter array, a device location relative to the transmitter array; and
selectively cause a subset of transmitters to transmit power, the subset comprising fewer than all of the plurality of transmitters of the transmitter array, the subset including, for each detected device, transmitters at the device location.

8. The system of claim 5, further comprising:
an artificial intelligence engine in communication with one or more of the sensing array and the sense voltage, the artificial intelligence engine being trained to determine the location of devices and, for each detected device, a corresponding device type from a plurality of device types; and
execution of the instructions further causing the controller, for each detected device, to configure the transmitter tiles according to the detected device types,
wherein of the plurality of device types has a corresponding charging specification, and
execution of the instructions further causing the controller to configure the transmitter tiles according to the detected devices location and types and their charging specifications.

9. The system of claim 5, wherein the controller is configured to at least one of:
create customizable energy shapes in 2D/surface and 3D through collaborative operation of transmitter tiles that charge at the same time;
execute one or more of charging hypervisor, multi-tiles sensing, device identification, device localization, multi-receiver power routing and scheduling, selective power blocking, power spots forming, energy field shaping, location-aware load balancing, charging policy assignment and management, energy tile role assignment, QoS management, charging capacity management, multi-frequency transfer management, power demand classification, interference management, device polling, device authentication, charging handoff and management, mobility/device tracking and management, diagnosis analysis, global energy maps, safety analysis and guarantee, usage profiling, and dashboard/notification; or
run an energy shaping algorithm that finds one or more optimal energy flow paths that deliver power to the devices detected within the charging range.

10. The system of claim 9, wherein the energy flows are configured to at least one of:
create power spots over a large area to charge multiple electronic devices and null energy at other selected areas; or
deliver power to multiple devices over their energy paths.

11. The system of claim 5, wherein the modules of the controller are deployed fully or selectively on the transmitter tiles or on remote energy edge nodes based on the available resources of the transmitter tiles or the remote energy edge nodes.

12. The system of claim 11, wherein the remote energy edge node and the master transmitter tiles dynamically change the transmitter tiles configurations and run control plane functionalities.

13. The system of claim 5, wherein the controller runs an energy shaping algorithm that finds one or more optimal energy flow paths that deliver power to the devices detected within the charging range.

14. The system of claim 5, wherein the controller re-uses the same charging frequencies on each tile of the plurality of tiles to increase system charging capacity, and uses different frequencies on each tile of the plurality of tiles to decrease interferences.

15. The system of claim 5, wherein the controller changes the power by re-configuring the transmitter tiles.

16. The system of claim 1, wherein the controller is configured to at least one of:
reduce power transmission by at least one transmitter in at least one power path by tuning the impedance of such transmitter;
cancel power transmission by at least one transmitter in at least one power path by configuring at least one transmitter of the array of transmitters to reflect a power signal from the master transmitter back along said at least one power path;
selectively control transmitters to refrain from transmitting power, the transmitters not being a part of a transmission path from the set of transmission paths;
establish a revised power path in response to a change of device position of a device from an initial device position to a subsequent device position; or
modulate the power signal of master transmitter tiles over one or more power paths to encode and overlay data and control information, with the modulation being one or more of frequency, amplitude, or phase modulations.

17. The system of claim 1, further comprising at least one energy receiver unit, comprising:
a. at least one charging coil;
b. a plurality of hardware components to harvest resonance magnetic energy and enable/disable coil in energy reception chain, and
c. optionally, a microcontroller and memory component encoded with computer executable modules to enable a set of active coils, and measure and monitor the connected receiver device load or power voltages.

18. The system of claim 1, further comprising a multi-layer reconfigurable energy receiver having a multi-layer of coils, the receiver being configured to activate a specific number of coils based on receiver load, amount of required power, or location of the device.

19. The system of claim 1, wherein the controller further comprises add-on software that enables additional monitoring, management, maintenance, and optimization tools.

20. The system of claim 19, wherein the add-on applications are configured to learn usage patterns including common detected locations of charging, common charging requirements and types of devices, and common mobility patterns.

* * * * *